(12) United States Patent
Austermann, III et al.

(10) Patent No.: US 8,155,012 B2
(45) Date of Patent: Apr. 10, 2012

(54) SYSTEM AND METHOD FOR ADAPTING A PIECE OF TERMINAL EQUIPMENT

(75) Inventors: John F. Austermann, III, Huntington Woods, MI (US); Marshall B. Cummings, Troy, MI (US)

(73) Assignee: ChriMar Systems, Inc., Farmington Hills, MI (US)

( * ) Notice: Subject to any disclaimer, the term of this patent is extended or adjusted under 35 U.S.C. 154(b) by 331 days.

(21) Appl. No.: 12/239,001

(22) Filed: Sep. 26, 2008

(65) Prior Publication Data
US 2009/0022057 A1 Jan. 22, 2009

Related U.S. Application Data

(63) Continuation of application No. 10/668,708, filed on Sep. 23, 2003, now Pat. No. 7,457,250, which is a continuation of application No. 09/370,430, filed on Aug. 9, 1999, now Pat. No. 6,650,622, which is a continuation-in-part of application No. PCT/US99/07846, filed on Apr. 8, 1999.

(60) Provisional application No. 60/081,279, filed on Apr. 10, 1998.

(51) Int. Cl.
H04L 12/12 (2006.01)
G08B 13/14 (2006.01)
(52) U.S. Cl. ........................ 370/241; 370/445; 340/568.1
(58) Field of Classification Search ........................ None
See application file for complete search history.

(56) References Cited

U.S. PATENT DOCUMENTS 202,495 A 4/1878 Watson
(Continued)

FOREIGN PATENT DOCUMENTS

DE 3907652 A1 9/1990
(Continued)

OTHER PUBLICATIONS

Entertainment Services and Technology Association (ESTA)—Recommended Practice for Ethernet Cabling Systems in Entertainment Lighting Applications [44 pages] (1996).
(Continued)

Primary Examiner — Chi Pham
Assistant Examiner — Soon-Dong Hyun
(74) Attorney, Agent, or Firm — Harness, Dickey & Pierce, P.L.C.

(57) ABSTRACT

In accordance with the teachings of the present invention, a communication system (17) is provided for generating and monitoring data over pre-existing conductors (2A-2D) between associated pieces of networked computer equipment (3A-3D). The system includes a communication device (16) attached to the electronic equipment that transmits information to a central module (15) by impressing a low frequency signal on the pre-existing data lines of the remotely located equipment. A receiver (6) in the central module (15) monitors the low frequency data on the data lines to determine the transmitted information of the electronic equipment. The communication device may also be powered by a low current power signal from the central module (15). The power signal to the communication device may also be fluctuated to provide useful information, such as status information, to the communication device. Relocation of the electronic equipment with attached communication device to another location on the network is detected immediately and may be used to update a database. This invention is particularly adapted to be used with an existing Ethernet communications link or equivalents thereof.

148 Claims, 13 Drawing Sheets

U.S. PATENT DOCUMENTS

| | | | |
|---|---|---|---|
| 406,567 A | 7/1889 | Edison | |
| 2,846,509 A | 8/1958 | Dubuar | 379/340 |
| 3,359,379 A | 12/1967 | Pullum et al. | |
| 3,407,400 A | 10/1968 | Lurie | |
| 3,408,643 A | 10/1968 | Sliman | |
| 3,423,521 A | 1/1969 | Friesen et al. | 725/84 |
| 3,425,050 A | 1/1969 | Tellerman et al. | |
| 3,500,132 A | 3/1970 | Garrett | 361/186 |
| 3,535,472 A | 10/1970 | Babbitt, III | 455/14 |
| 3,537,095 A | 10/1970 | Cones | |
| 3,593,274 A | 7/1971 | Krugler, Jr. | 340/458 |
| 3,597,549 A | 8/1971 | Farmer et al. | |
| 3,618,065 A | 11/1971 | Trip et al. | 340/568.3 |
| 3,634,845 A | 1/1972 | Colman | 340/508 |
| 3,659,277 A | 4/1972 | Brown | |
| 3,696,378 A | 10/1972 | Daniel | |
| 3,697,984 A | 10/1972 | Atkinson et al. | |
| 3,731,012 A | 5/1973 | Shaffer | 379/380 |
| 3,758,728 A | 9/1973 | Le Roch et al. | 379/4 |
| 3,768,084 A | 10/1973 | Haynes | 377/12 |
| 3,781,481 A | 12/1973 | Shaffer et al. | 379/299 |
| 3,794,989 A | 2/1974 | Manley et al. | |
| 3,818,179 A | 6/1974 | Mase | 219/267 |
| 3,828,139 A | 8/1974 | Chambers, Jr. | 379/401 |
| 3,832,521 A | 8/1974 | Niendorf | 219/130.32 |
| 3,836,901 A | 9/1974 | Matto et al. | |
| 3,848,179 A | 11/1974 | Kayama | 323/280 |
| 3,863,036 A | 1/1975 | McCrudden | |
| 3,868,484 A | 2/1975 | Bolton et al. | 340/455.2 |
| 3,886,419 A | 5/1975 | Omura et al. | 318/132 |
| 3,932,857 A | 1/1976 | Way et al. | |
| 3,983,338 A | 9/1976 | Mathauser | 379/30 |
| 4,024,359 A | 5/1977 | De Marco et al. | |
| 4,024,360 A | 5/1977 | Biraghi et al. | |
| 4,063,220 A | 12/1977 | Metcalfe et al. | |
| 4,064,431 A | 12/1977 | Cote | 362/4 |
| 4,101,878 A | 7/1978 | Shimizu et al. | 307/140 |
| 4,121,201 A | 10/1978 | Weathers | |
| 4,128,804 A | 12/1978 | Russell | 324/424 |
| 4,131,767 A | 12/1978 | Weinstein | 379/406.06 |
| 4,156,799 A | 5/1979 | Cave | |
| 4,160,884 A | 7/1979 | Bishop | 379/348 |
| 4,161,719 A | 7/1979 | Parikh et al. | 375/365 |
| 4,173,714 A | 11/1979 | Bloch et al. | |
| 4,179,688 A | 12/1979 | Romnet | 340/815.83 |
| 4,186,339 A | 1/1980 | Finger | 324/142 |
| 4,191,971 A | 3/1980 | Dischert et al. | 348/211.11 |
| 4,230,912 A | 10/1980 | Lee et al. | |
| 4,232,199 A | 11/1980 | Boatwright et al. | 379/197 |
| 4,254,305 A | 3/1981 | Treiber | 379/324 |
| 4,260,882 A | 4/1981 | Barnes | 250/205 |
| 4,268,723 A | 5/1981 | Taylor | 379/395.01 |
| 4,273,955 A | 6/1981 | Armstrong | |
| 4,277,740 A | 7/1981 | Parks | 324/540 |
| 4,282,407 A | 8/1981 | Stiefel | 379/377 |
| 4,290,056 A | 9/1981 | Chow | 340/538 |
| 4,293,948 A | 10/1981 | Soderblom | |
| 4,303,073 A | 12/1981 | Archibald | 606/35 |
| 4,313,081 A | 1/1982 | Smith | 323/209 |
| 4,315,107 A | 2/1982 | Ciesielka et al. | 379/400 |
| 4,322,677 A | 3/1982 | Wright | 324/531 |
| 4,340,788 A | 7/1982 | Sbuelz | |
| 4,348,661 A | 9/1982 | Lucchesi | |
| 4,349,703 A | 9/1982 | Chea, Jr. | 379/382 |
| 4,367,455 A | 1/1983 | Fried | 340/310.11 |
| 4,383,315 A | 5/1983 | Torng | |
| 4,388,667 A | 6/1983 | Saurenman | 361/231 |
| 4,397,020 A | 8/1983 | Howson | 350/510 |
| 4,398,066 A | 8/1983 | Sinberg | 379/412 |
| 4,410,982 A | 10/1983 | Fleischfresser et al. | 370/384 |
| 4,413,250 A | 11/1983 | Porter et al. | |
| 4,454,477 A | 6/1984 | Joffe | |
| 4,463,352 A | 7/1984 | Forbes et al. | 370/424 |
| 4,464,658 A | 8/1984 | Thelen | |
| 4,467,314 A | 8/1984 | Weikel et al. | 700/295 |
| 4,475,079 A | 10/1984 | Gale | 324/533 |
| 4,479,228 A | 10/1984 | Crane | |
| 4,482,999 A | 11/1984 | Janson et al. | |
| 4,484,028 A | 11/1984 | Kelley et al. | |
| 4,487,836 A | 12/1984 | Takayanagi et al. | 436/2 |
| 4,494,541 A | 1/1985 | Archibald | 606/35 |
| 4,495,494 A | 1/1985 | McCune | |
| 4,507,568 A | 3/1985 | Ziegler et al. | 307/112 |
| 4,524,349 A | 6/1985 | Hyatt | |
| 4,527,216 A | 7/1985 | Stammely | |
| 4,528,667 A | 7/1985 | Fruhauf | 714/809 |
| 4,532,626 A | 7/1985 | Flores et al. | 370/438 |
| 4,535,401 A | 8/1985 | Penn | 700/3 |
| 4,551,671 A | 11/1985 | Annunziata et al. | |
| 4,564,726 A | 1/1986 | Ibata | 379/166 |
| 4,578,539 A | 3/1986 | Townsing | |
| 4,593,389 A | 6/1986 | Wurzburg et al. | |
| 4,602,364 A | 7/1986 | Herman et al. | |
| 4,617,656 A | 10/1986 | Kobayashi et al. | |
| 4,622,541 A | 11/1986 | Stockdale | 340/566 |
| 4,631,367 A | 12/1986 | Coviello et al. | |
| 4,633,217 A | 12/1986 | Akano | |
| 4,636,771 A | 1/1987 | Ochs | |
| 4,639,714 A | 1/1987 | Crowe | 375/259 |
| 4,647,721 A | 3/1987 | Busam et al. | |
| 4,647,912 A | 3/1987 | Bates et al. | |
| 4,649,548 A | 3/1987 | Crane | |
| 4,654,640 A | 3/1987 | Carll et al. | |
| 4,656,318 A | 4/1987 | Noyes | 379/102.04 |
| 4,658,242 A | 4/1987 | Zeder | |
| 4,661,797 A | 4/1987 | Schmall | 340/561 |
| 4,670,902 A | 6/1987 | Naiwirt | |
| 4,674,084 A | 6/1987 | Suzuki et al. | |
| 4,685,129 A | 8/1987 | Gavrilovich | |
| 4,686,514 A | 8/1987 | Liptak et al. | 340/571 |
| 4,691,344 A | 9/1987 | Brown et al. | |
| 4,692,761 A | 9/1987 | Robinton | 340/825.01 |
| 4,701,630 A | 10/1987 | Annunziata et al. | |
| 4,701,946 A | 10/1987 | Oliva et al. | |
| 4,712,233 A | 12/1987 | Kuo | 379/386 |
| 4,717,896 A | 1/1988 | Graham | |
| 4,719,616 A | 1/1988 | Akano | |
| 4,723,267 A | 2/1988 | Jones et al. | 379/93.05 |
| 4,728,948 A | 3/1988 | Fields | |
| 4,731,810 A | 3/1988 | Watkins | 379/33 |
| 4,731,829 A | 3/1988 | Bonnet et al. | |
| 4,733,223 A | 3/1988 | Gilbert | |
| 4,733,389 A | 3/1988 | Puvogel | |
| 4,736,195 A | 4/1988 | McMurtry et al. | |
| 4,737,787 A | 4/1988 | Ito et al. | |
| 4,751,498 A | 6/1988 | Shalvi et al. | 340/524 |
| 4,755,792 A | 7/1988 | Pezzolo et al. | 340/538 |
| 4,755,922 A | 7/1988 | Puvogel | |
| 4,758,823 A | 7/1988 | Berruyer et al. | |
| 4,760,382 A | 7/1988 | Faulkner | |
| 4,766,386 A | 8/1988 | Oliver et al. | 324/533 |
| 4,779,153 A | 10/1988 | Tsubota | 360/96.51 |
| 4,782,322 A | 11/1988 | Lechner et al. | |
| 4,782,355 A | 11/1988 | Sakai et al. | 396/72 |
| 4,785,812 A | 11/1988 | Pihl et al. | 607/8 |
| 4,799,211 A | 1/1989 | Felker et al. | 370/252 |
| 4,813,066 A | 3/1989 | Holtz et al. | |
| 4,815,106 A | 3/1989 | Propp et al. | 375/257 |
| 4,817,106 A | 3/1989 | Thompson | 372/50.12 |
| 4,821,319 A | 4/1989 | Middleton et al. | 379/167.13 |
| 4,823,600 A | 4/1989 | Biegel et al. | |
| 4,825,349 A | 4/1989 | Marcel | 363/50 |
| 4,839,886 A | 6/1989 | Wu | 370/463 |
| 4,862,158 A | 8/1989 | Keller et al. | |
| 4,864,598 A | 9/1989 | Lynch et al. | |
| 4,866,768 A | 9/1989 | Sinberg | |
| 4,875,223 A | 10/1989 | Curtis | 375/258 |
| 4,882,728 A | 11/1989 | Herman | |
| 4,884,263 A | 11/1989 | Suzuki | 370/225 |
| 4,884,287 A | 11/1989 | Jones et al. | 375/377 |
| 4,885,563 A | 12/1989 | Johnson et al. | 375/259 |
| 4,896,315 A | 1/1990 | Felker et al. | |
| 4,901,003 A | 2/1990 | Clegg | |
| 4,901,217 A | 2/1990 | Wilson | 363/126 |
| 4,903,006 A | 2/1990 | Boomgaard | 307/3 |
| 4,907,261 A | 3/1990 | Chapman | |
| 4,916,621 A | 4/1990 | Bean et al. | 701/117 |

| Patent No. | Date | Inventor | Class |
|---|---|---|---|
| 4,918,688 A | 4/1990 | Krause et al. | |
| 4,922,503 A | 5/1990 | Leone | |
| 4,926,158 A | 5/1990 | Zeigler | 370/294 |
| 4,935,926 A | 6/1990 | Herman | |
| 4,935,959 A | 6/1990 | Markovic et al. | |
| 4,937,811 A | 6/1990 | Harris | 370/200 |
| 4,937,851 A | 6/1990 | Lynch et al. | |
| 4,942,604 A | 7/1990 | Smith et al. | |
| 4,951,309 A | 8/1990 | Gross et al. | 379/102.04 |
| 4,953,055 A | 8/1990 | Douhet et al. | |
| 4,958,371 A | 9/1990 | Damoci et al. | |
| 4,961,222 A | 10/1990 | Johansson et al. | |
| 4,969,179 A | 11/1990 | Kanare et al. | 379/33 |
| 4,973,954 A | 11/1990 | Schwartz | 370/475 |
| 4,980,913 A | 12/1990 | Skret | |
| 4,991,123 A | 2/1991 | Casamassima | |
| 4,992,774 A | 2/1991 | McCullough | 345/204 |
| 4,998,275 A | 3/1991 | Braunstein et al. | |
| 4,998,850 A | 3/1991 | Crowell | 406/48 |
| 5,003,457 A | 3/1991 | Ikei et al. | 700/4 |
| 5,003,579 A | 3/1991 | Jones | |
| 5,007,858 A | 4/1991 | Daly et al. | 439/498 |
| 5,020,100 A | 5/1991 | Gardiner | |
| 5,020,773 A | 6/1991 | Tuft et al. | 251/129.12 |
| 5,021,779 A | 6/1991 | Bisak | 340/825.69 |
| 5,029,201 A | 7/1991 | Bindels | 379/93.25 |
| 5,032,819 A | 7/1991 | Sakuragi et al. | |
| 5,032,833 A | 7/1991 | Laporte | 340/825.02 |
| 5,033,112 A | 7/1991 | Bowling et al. | 398/110 |
| 5,034,723 A | 7/1991 | Maman | |
| 5,034,738 A | 7/1991 | Ishihara et al. | |
| 5,034,978 A | 7/1991 | Nguyen et al. | |
| 5,038,782 A | 8/1991 | Gevins et al. | 600/383 |
| 5,051,723 A | 9/1991 | Long et al. | |
| 5,055,827 A | 10/1991 | Philipp | |
| 5,056,131 A | 10/1991 | Kanare et al. | 379/33 |
| 5,059,782 A | 10/1991 | Fukuyama | 250/214 A |
| 5,059,948 A | 10/1991 | Desmeules | 340/568.4 |
| 5,063,563 A | 11/1991 | Ikeda et al. | |
| 5,063,585 A | 11/1991 | Shapiro | 379/30 |
| 5,066,939 A | 11/1991 | Mansfield, Jr. | 455/402 |
| 5,066,942 A | 11/1991 | Matsuo | 340/568.2 |
| 5,076,763 A | 12/1991 | Anastos | 417/44.11 |
| 5,077,526 A | 12/1991 | Vokey et al. | 324/541 |
| RE33,807 E | 1/1992 | Abel et al. | |
| 5,089,974 A | 2/1992 | Demeyer et al. | |
| 5,093,828 A | 3/1992 | Braun et al. | 370/451 |
| RE33,900 E | 4/1992 | Howson | 370/105 |
| 5,119,398 A | 6/1992 | Webber, Jr. | |
| 5,119,402 A | 6/1992 | Ginzburg et al. | 375/288 |
| 5,121,482 A | 6/1992 | Patton | 710/16 |
| 5,121,500 A | 6/1992 | Arlington et al. | 713/330 |
| 5,124,982 A | 6/1992 | Kaku | |
| 5,131,033 A | 7/1992 | Reum | 379/413 |
| 5,133,005 A | 7/1992 | Kelly et al. | |
| 5,136,580 A | 8/1992 | Videlock et al. | |
| 5,142,269 A | 8/1992 | Mueller | |
| 5,144,544 A | 9/1992 | Jenneve et al. | |
| 5,148,144 A | 9/1992 | Sutterlin et al. | |
| 5,164,960 A | 11/1992 | Wincn et al. | |
| 5,168,170 A | 12/1992 | Hartig | |
| 5,179,291 A | 1/1993 | Nishikawa et al. | |
| 5,179,710 A | 1/1993 | Coschieri | 713/300 |
| 5,181,240 A | 1/1993 | Sakuragi | |
| 5,189,409 A | 2/1993 | Okuno | 340/825.57 |
| 5,192,231 A | 3/1993 | Dolin, Jr. | 439/620.21 |
| 5,195,183 A * | 3/1993 | Miller et al. | 709/231 |
| 5,199,049 A | 3/1993 | Wilson | 375/351 |
| 5,200,743 A | 4/1993 | St. Martin et al. | |
| 5,200,877 A | 4/1993 | Betton et al. | 361/92 |
| 5,216,704 A | 6/1993 | Williams et al. | |
| 5,222,164 A | 6/1993 | Bass, Sr. et al. | 385/14 |
| 5,223,806 A | 6/1993 | Curtis et al. | 333/12 |
| 5,226,120 A | 7/1993 | Brown et al. | |
| 5,231,375 A | 7/1993 | Sanders et al. | |
| 5,235,599 A | 8/1993 | Nishimura et al. | 714/4 |
| 5,237,606 A | 8/1993 | Ziermann | |
| 5,241,160 A | 8/1993 | Bashan et al. | 235/380 |
| 5,243,328 A | 9/1993 | Lee et al. | |
| 5,249,183 A | 9/1993 | Wong et al. | |
| 5,255,962 A | 10/1993 | Neuhnus et al. | 303/188 |
| 5,257,287 A | 10/1993 | Blumenthal et al. | |
| 5,260,664 A | 11/1993 | Graham | |
| 5,264,777 A | 11/1993 | Smead | |
| 5,267,238 A | 11/1993 | Yano et al. | 370/452 |
| 5,270,896 A | 12/1993 | McDonald | 361/45 |
| 5,275,172 A | 1/1994 | Ives | 600/544 |
| 5,278,888 A | 1/1994 | Myllymaki | |
| 5,280,251 A | 1/1994 | Strangio | |
| 5,285,477 A | 2/1994 | Leonowich | 375/257 |
| 5,289,359 A | 2/1994 | Ziermann | |
| 5,289,458 A | 2/1994 | Taha | |
| 5,289,461 A | 2/1994 | de Nijs | |
| 5,297,141 A * | 3/1994 | Marum | 370/402 |
| 5,301,246 A | 4/1994 | Archibald et al. | |
| 5,302,889 A | 4/1994 | Marsh | 323/284 |
| 5,306,956 A | 4/1994 | Ikeda et al. | 307/125 |
| 5,311,114 A | 5/1994 | Sambamurthy et al. | |
| 5,311,518 A | 5/1994 | Takato et al. | |
| 5,313,642 A | 5/1994 | Seigel | 713/323 |
| 5,315,237 A | 5/1994 | Iwakura et al. | 324/754 |
| 5,321,372 A | 6/1994 | Smith | 333/1 |
| 5,323,461 A | 6/1994 | Rosenbaum et al. | 379/399.01 |
| 5,333,177 A | 7/1994 | Braitberg et al. | 455/559 |
| 5,333,192 A | 7/1994 | McGinn | |
| 5,345,422 A | 9/1994 | Redwine | 365/189.09 |
| 5,345,592 A | 9/1994 | Woodmas | 725/130 |
| 5,347,225 A | 9/1994 | Graham | |
| 5,351,272 A | 9/1994 | Abraham | 375/260 |
| 5,353,009 A | 10/1994 | Marsh | 340/505 |
| 5,365,515 A | 11/1994 | Graham | |
| 5,368,041 A | 11/1994 | Shambroom | 600/544 |
| 5,379,441 A | 1/1995 | Watanabe et al. | 710/317 |
| 5,381,804 A | 1/1995 | Shambroom | 600/544 |
| 5,384,429 A | 1/1995 | Bulson et al. | 174/102 R |
| 5,389,882 A | 2/1995 | l'Anson | 324/522 |
| 5,396,555 A | 3/1995 | Shibata | |
| 5,406,260 A | 4/1995 | Cummings et al. | |
| 5,408,669 A | 4/1995 | Stewart et al. | 713/300 |
| 5,414,708 A | 5/1995 | Webber et al. | 370/445 |
| 5,414,709 A | 5/1995 | Baze | |
| 5,422,519 A | 6/1995 | Russell | 307/104 |
| 5,424,710 A | 6/1995 | Baumann | |
| 5,438,606 A | 8/1995 | Cerulli | 379/24 |
| 5,440,335 A | 8/1995 | Beveridge | 725/106 |
| 5,441,520 A | 8/1995 | Olsen et al. | 607/6 |
| 5,444,184 A | 8/1995 | Hassel | 174/113 R |
| 5,450,486 A | 9/1995 | Maas et al. | |
| 5,452,344 A | 9/1995 | Larson | 340/538.11 |
| 5,455,467 A | 10/1995 | Young et al. | 307/104 |
| 5,457,629 A | 10/1995 | Miller et al. | 701/1 |
| 5,459,283 A | 10/1995 | Birdwell, Jr. | |
| 5,461,671 A | 10/1995 | Sakuragi et al. | 379/400 |
| 5,467,384 A | 11/1995 | Skinner, Sr. | 455/402 |
| 5,469,437 A | 11/1995 | Runaldue | |
| 5,477,091 A | 12/1995 | Fiorina et al. | |
| 5,483,574 A | 1/1996 | Yuyama | 379/32.04 |
| 5,483,656 A | 1/1996 | Oprescu et al. | 713/320 |
| 5,485,488 A | 1/1996 | Van Brunt et al. | |
| 5,488,306 A | 1/1996 | Bonaccio | |
| 5,491,463 A | 2/1996 | Sargeant et al. | |
| 5,493,684 A | 2/1996 | Gephardt et al. | 713/322 |
| 5,497,460 A | 3/1996 | Bailey | |
| 5,498,911 A | 3/1996 | Bossler | 307/10.1 |
| 5,513,370 A | 4/1996 | Paul | 709/249 |
| 5,514,859 A | 5/1996 | Seigel | |
| 5,515,303 A | 5/1996 | Cargin, Jr. et al. | 361/683 |
| 5,517,172 A | 5/1996 | Chiu | 340/5.7 |
| 5,519,882 A | 5/1996 | Asano et al. | 710/10 |
| 5,528,248 A | 6/1996 | Steiner et al. | 342/357.06 |
| 5,528,661 A | 6/1996 | Siu et al. | 379/29.01 |
| 5,532,898 A | 7/1996 | Price | 361/119 |
| 5,537,468 A | 7/1996 | Hartman | 379/221.01 |
| 5,540,235 A | 7/1996 | Wilson | 600/554 |
| 5,541,957 A | 7/1996 | Lau | 375/258 |
| 5,548,466 A | 8/1996 | Smith | 361/44 |
| 5,560,022 A | 9/1996 | Dunstan et al. | 713/300 |
| 5,560,357 A | 10/1996 | Faupel et al. | 600/345 |

| | | | |
|---|---|---|---|
| 5,563,489 A | 10/1996 | Murry | 318/778 |
| 5,570,002 A | 10/1996 | Castleman | 323/283 |
| 5,572,182 A | 11/1996 | De Pinho Filho | 340/855.4 |
| 5,574,748 A | 11/1996 | Vander Mey et al. | 375/139 |
| 5,578,991 A | 11/1996 | Scholder | |
| 5,581,772 A | 12/1996 | Nanno et al. | 713/340 |
| 5,594,332 A | 1/1997 | Harman et al. | 324/127 |
| 5,596,637 A | 1/1997 | Pasetti et al. | 379/399.02 |
| 5,608,545 A | 3/1997 | Kagawa | 358/468 |
| 5,608,792 A | 3/1997 | Laider | 379/386 |
| 5,617,418 A | 4/1997 | Shirani et al. | 370/465 |
| 5,623,184 A | 4/1997 | Rector | 315/102 |
| 5,630,058 A | 5/1997 | Mosley et al. | 726/35 |
| 5,631,570 A | 5/1997 | King | 324/718 |
| 5,635,896 A | 6/1997 | Tinsley et al. | 340/310.15 |
| 5,642,248 A | 6/1997 | Campolo et al. | 361/42 |
| 5,649,001 A | 7/1997 | Thomas et al. | 379/93.07 |
| 5,652,479 A | 7/1997 | LoCascio et al. | 315/225 |
| 5,652,575 A | 7/1997 | Pryor et al. | 379/29.11 |
| 5,652,893 A | 7/1997 | Ben-Meir et al. | 713/310 |
| 5,652,895 A | 7/1997 | Poisner | 713/322 |
| 5,655,077 A | 8/1997 | Johnes et al. | 726/8 |
| 5,659,542 A | 8/1997 | Bell et al. | 370/496 |
| 5,664,002 A | 9/1997 | Skinner, Sr. | 379/56.2 |
| 5,670,937 A | 9/1997 | Right et al. | 340/506 |
| 5,671,354 A | 9/1997 | Ito et al. | 726/3 |
| 5,675,321 A | 10/1997 | McBride | |
| 5,675,371 A | 10/1997 | Barringer | 725/148 |
| 5,675,811 A | 10/1997 | Broedner | 713/323 |
| 5,675,813 A | 10/1997 | Holmdahl | 713/310 |
| 5,678,547 A | 10/1997 | Faupel et al. | 600/409 |
| 5,678,559 A | 10/1997 | Drakulic | 600/544 |
| 5,679,987 A | 10/1997 | Ogawa | 307/147 |
| 5,684,826 A | 11/1997 | Ratner | 375/222 |
| 5,684,950 A | 11/1997 | Dare et al. | 726/10 |
| 5,686,826 A | 11/1997 | Kurtz et al. | 323/365 |
| 5,689,230 A | 11/1997 | Merwin et al. | 340/310.11 |
| 5,692,917 A | 12/1997 | Rieb et al. | |
| 5,696,660 A | 12/1997 | Price | 361/119 |
| 5,706,287 A | 1/1998 | Leimkoetter | 370/410 |
| 5,715,174 A | 2/1998 | Cotichini et al. | |
| 5,729,204 A | 3/1998 | Fackler et al. | 340/2.4 |
| 5,742,514 A | 4/1998 | Bonola | 700/286 |
| 5,742,833 A | 4/1998 | Dea et al. | 713/323 |
| 5,758,101 A | 5/1998 | Pemberton | 710/302 |
| 5,761,084 A | 6/1998 | Edwards | 700/293 |
| 5,764,647 A | 6/1998 | Riley | |
| 5,766,133 A | 6/1998 | Faisandier | 600/509 |
| 5,779,196 A | 7/1998 | Timar | 244/209 |
| 5,781,015 A | 7/1998 | Duffin et al. | 324/508 |
| 5,783,999 A | 7/1998 | Price et al. | 340/644 |
| 5,784,441 A | 7/1998 | Davis et al. | 379/106.01 |
| 5,790,363 A | 8/1998 | Chaudhry | 361/119 |
| 5,793,764 A * | 8/1998 | Bartoldus et al. | 370/390 |
| 5,796,185 A | 8/1998 | Takata et al. | 307/140 |
| 5,796,965 A | 8/1998 | Choi et al. | 713/300 |
| 5,799,040 A | 8/1998 | Lau | 375/258 |
| 5,799,194 A | 8/1998 | Allen | |
| 5,799,196 A | 8/1998 | Flannery | 713/320 |
| 5,802,042 A | 9/1998 | Natarajan et al. | 370/255 |
| 5,802,305 A | 9/1998 | McKaughan et al. | 709/227 |
| 5,805,597 A | 9/1998 | Edem | 370/445 |
| 5,805,904 A | 9/1998 | Jung | 713/300 |
| 5,808,846 A | 9/1998 | Holce et al. | 361/93.6 |
| 5,810,606 A | 9/1998 | Ballast et al. | 439/15 |
| 5,814,900 A | 9/1998 | Esser et al. | 307/104 |
| 5,815,665 A | 9/1998 | Teper et al. | 709/229 |
| 5,821,868 A | 10/1998 | Kuhling | |
| 5,828,293 A | 10/1998 | Rickard | 375/257 |
| 5,834,942 A | 11/1998 | De Angelis | 324/522 |
| 5,835,005 A | 11/1998 | Furukawa et al. | 370/400 |
| 5,836,785 A | 11/1998 | Lee | 439/505 |
| 5,841,203 A | 11/1998 | Chanbers et al. | 307/10.8 |
| 5,841,360 A | 11/1998 | Binder | |
| 5,842,955 A | 12/1998 | Wilkinson | 482/52 |
| 5,845,150 A | 12/1998 | Henion | 710/19 |
| 5,845,190 A | 12/1998 | Bushue et al. | 725/130 |
| 5,848,149 A | 12/1998 | Chen et al. | 379/399.01 |
| 5,854,824 A | 12/1998 | Bengal | |
| 5,854,839 A | 12/1998 | Chen et al. | 379/413 |
| 5,859,584 A | 1/1999 | Counsell et al. | 340/538 |
| 5,859,596 A | 1/1999 | McRae | 340/870.02 |
| 5,884,086 A | 3/1999 | Amoni et al. | 713/300 |
| 5,915,002 A | 6/1999 | Shimosako | 379/93.07 |
| 5,918,016 A | 6/1999 | Brewer et al. | 709/220 |
| 5,920,253 A | 7/1999 | Laine | 375/259 |
| 5,923,363 A | 7/1999 | Elberbaum | 348/156 |
| 5,929,624 A | 7/1999 | Ricq et al. | 324/67 |
| 5,929,778 A | 7/1999 | Asama et al. | |
| 5,933,073 A | 8/1999 | Shuey | 375/258 |
| 5,933,590 A | 8/1999 | Allen | 714/4 |
| 5,937,033 A | 8/1999 | Bellows | 379/29.01 |
| 5,939,801 A | 8/1999 | Bouffard | 307/65 |
| 5,944,659 A | 8/1999 | Flach et al. | 600/300 |
| 5,944,824 A | 8/1999 | He | 726/6 |
| 5,944,831 A | 8/1999 | Pate et al. | 713/324 |
| 5,946,180 A | 8/1999 | Simpson | 361/93.3 |
| 5,948,077 A | 9/1999 | Choi et al. | |
| 5,949,806 A | 9/1999 | Ness et al. | 372/38.07 |
| 5,953,314 A * | 9/1999 | Ganmukhi et al. | 370/220 |
| 5,960,208 A | 9/1999 | Obata et al. | 713/330 |
| 5,963,557 A | 10/1999 | Eng | |
| 5,991,311 A | 11/1999 | Long et al. | |
| 5,991,885 A | 11/1999 | Chang et al. | |
| 5,994,998 A | 11/1999 | Fisher et al. | |
| 5,995,348 A | 11/1999 | McCartan et al. | 361/42 |
| 5,995,353 A | 11/1999 | Cunningham et al. | 361/111 |
| 6,000,003 A | 12/1999 | Allen | |
| 6,005,760 A | 12/1999 | Holce et al. | 361/93.6 |
| 6,011,680 A | 1/2000 | Solleder et al. | 361/90 |
| 6,011,794 A | 1/2000 | Mordowitz | 370/389 |
| 6,011,910 A | 1/2000 | Chau et al. | 709/229 |
| 6,016,519 A | 1/2000 | Chida et al. | 710/19 |
| 6,018,452 A | 1/2000 | Meyerhoefer | 361/111 |
| 6,021,493 A | 2/2000 | Cromer et al. | |
| 6,021,496 A | 2/2000 | Dutcher et al. | 726/21 |
| 6,031,368 A | 2/2000 | Klippel et al. | 324/133 |
| 6,033,101 A | 3/2000 | Reddick et al. | 700/286 |
| 6,038,457 A | 3/2000 | Barkat | 455/556.1 |
| 6,047,376 A | 4/2000 | Hosoe | 726/5 |
| 6,049,139 A | 4/2000 | Nagaura | 307/10.1 |
| 6,049,881 A | 4/2000 | Massman et al. | 713/300 |
| 6,057,670 A | 5/2000 | Sink et al. | 320/117 |
| 6,064,305 A | 5/2000 | Lockyer | |
| 6,092,131 A | 7/2000 | Caldwell et al. | 710/100 |
| 6,092,196 A | 7/2000 | Reiche | 726/6 |
| 6,095,867 A | 8/2000 | Brandt et al. | 439/620.09 |
| 6,097,761 A | 8/2000 | Buhring et al. | 375/257 |
| 6,100,471 A | 8/2000 | Fouache | 174/72 C |
| 6,101,459 A | 8/2000 | Tavallaie | 702/152 |
| 6,111,936 A | 8/2000 | Bremer | |
| 6,115,468 A | 9/2000 | De Nicolo | |
| 6,121,778 A | 9/2000 | Moore | 324/619 |
| 6,125,448 A | 9/2000 | Schwan et al. | |
| 6,130,894 A | 10/2000 | Ojard et al. | |
| 6,134,666 A | 10/2000 | De Nicolo | 713/300 |
| 6,140,911 A | 10/2000 | Fisher et al. | |
| 6,141,763 A | 10/2000 | Smith et al. | 713/300 |
| 6,144,722 A | 11/2000 | Anderson et al. | 379/27.01 |
| 6,147,601 A | 11/2000 | Sandelman et al. | |
| 6,147,603 A | 11/2000 | Rand | |
| 6,147,963 A | 11/2000 | Walker et al. | |
| 6,169,475 B1 | 1/2001 | Browning | |
| 6,172,606 B1 | 1/2001 | Lockyer | |
| 6,175,556 B1 | 1/2001 | Allen, Jr. et al. | 370/293 |
| 6,178,458 B1 | 1/2001 | Wang | 709/232 |
| 6,178,514 B1 | 1/2001 | Wood | 713/300 |
| 6,181,140 B1 | 1/2001 | Vokey et al. | 324/523 |
| 6,205,137 B1 * | 3/2001 | Ariga | 370/360 |
| 6,218,930 B1 | 4/2001 | Katzenberg et al. | |
| 6,219,216 B1 | 4/2001 | Holce et al. | 361/94 |
| 6,233,689 B1 | 5/2001 | Allen et al. | 713/320 |
| 6,236,625 B1 | 5/2001 | Schell et al. | 369/13.22 |
| 6,243,394 B1 | 6/2001 | Deng | |
| 6,243,818 B1 | 6/2001 | Schwan et al. | 713/300 |
| 6,246,748 B1 | 6/2001 | Yano | |
| 6,252,878 B1 * | 6/2001 | Locklear et al. | 370/401 |
| 6,253,121 B1 | 6/2001 | Cline et al. | 700/300 |

| | | | |
|---|---|---|---|
| 6,272,219 B1 | 8/2001 | De Bruycker et al. | |
| 6,272,552 B1 | 8/2001 | Melvin et al. | |
| 6,275,498 B1* | 8/2001 | Bisceglia et al. | 370/438 |
| 6,278,357 B1 | 8/2001 | Croushore et al. | 375/259 |
| 6,278,665 B1 | 8/2001 | Schell et al. | 369/13.22 |
| 6,279,060 B1 | 8/2001 | Luke et al. | 710/64 |
| 6,292,901 B1 | 9/2001 | Lys et al. | 713/300 |
| 6,295,356 B1 | 9/2001 | De Nicolo | |
| 6,295,569 B1 | 9/2001 | Shimura et al. | 710/305 |
| 6,301,527 B1 | 10/2001 | Butland et al. | 700/286 |
| 6,314,102 B1 | 11/2001 | Czerwiec et al. | |
| 6,317,675 B1 | 11/2001 | Stolzl et al. | 701/76 |
| 6,329,810 B1 | 12/2001 | Reid | 324/117 H |
| 6,344,794 B1 | 2/2002 | Ulrich et al. | |
| 6,348,874 B1 | 2/2002 | Cole et al. | |
| 6,349,353 B1 | 2/2002 | Lewis et al. | 710/300 |
| 6,351,648 B1 | 2/2002 | Karapetkov et al. | 455/466 |
| 6,359,906 B1 | 3/2002 | Dyke et al. | |
| 6,366,143 B1 | 4/2002 | Liu et al. | 327/142 |
| 6,366,208 B1 | 4/2002 | Hopkins et al. | 340/650 |
| 6,373,851 B1 | 4/2002 | Dadario | |
| 6,377,874 B1 | 4/2002 | Ykema | 700/286 |
| 6,384,755 B1 | 5/2002 | Hayden | |
| 6,393,050 B1 | 5/2002 | Liu | 75/219 |
| 6,393,474 B1 | 5/2002 | Eichert et al. | 709/223 |
| 6,393,607 B1 | 5/2002 | Hughes et al. | 725/130 |
| 6,396,391 B1 | 5/2002 | Binder | 340/538.15 |
| 6,398,779 B1 | 6/2002 | Buysse et al. | 606/34 |
| 6,418,332 B1 | 7/2002 | Mastrototaro et al. | 600/316 |
| 6,449,348 B1 | 9/2002 | Lamb et al. | 379/93.36 |
| 6,456,625 B1 | 9/2002 | Itoi | 370/401 |
| 6,459,175 B1 | 10/2002 | Potega | 307/149 |
| 6,473,608 B1 | 10/2002 | Lehr et al. | |
| 6,480,510 B1 | 11/2002 | Binder | 370/502 |
| 6,496,103 B1 | 12/2002 | Weiss et al. | 375/257 |
| 6,504,825 B1 | 1/2003 | Atkins et al. | |
| 6,522,151 B2 | 2/2003 | Armistead et al. | |
| 6,526,516 B1 | 2/2003 | Ishikawa et al. | 713/340 |
| 6,529,127 B2 | 3/2003 | Townsend et al. | 340/505 |
| 6,535,983 B1 | 3/2003 | McCormack et al. | 713/310 |
| 6,546,494 B1 | 4/2003 | Jackson et al. | 713/300 |
| 6,587,454 B1 | 7/2003 | Lamb | 370/352 |
| 6,643,566 B1 | 11/2003 | Lehr et al. | |
| 6,658,108 B1 | 12/2003 | Bissell et al. | |
| 6,681,013 B1 | 1/2004 | Miyamoto | 379/413 |
| 6,701,443 B1 | 3/2004 | Bell | 713/300 |
| 6,744,888 B1 | 6/2004 | El-Kik et al. | 379/412 |
| 6,889,095 B1 | 5/2005 | Eidson et al. | 700/12 |

FOREIGN PATENT DOCUMENTS

| | | |
|---|---|---|
| DE | 42 03 304 A1 | 8/1992 |
| DE | 41 38 065 A1 | 5/1993 |
| EP | 0 357 482 A2 | 3/1990 |
| EP | 0 357 482 B1 | 3/1990 |
| EP | 0386659 | 9/1990 |
| EP | 0 415 312 A1 | 3/1991 |
| EP | 0 357 482 B1 | 7/1993 |
| EP | 0 639 916 A2 | 6/1994 |
| EP | 0 584 447 B1 | 6/1997 |
| EP | 0 852 018 B1 | 5/2003 |
| FR | 2 682 843 A1 | 10/1991 |
| GB | 2 249 919 A | 5/1992 |
| JP | 60-164289 | 8/1985 |
| JP | 63-018741 | 1/1988 |
| JP | 63-059144 | 3/1988 |
| JP | 64-16053 | 1/1989 |
| JP | 01-160198 | 6/1989 |
| JP | 1160198 | 6/1989 |
| JP | 02-087762 | 3/1990 |
| JP | 2087762 | 3/1990 |
| JP | 4-20192 | 1/1992 |
| JP | 4-180430 | 6/1992 |
| JP | 5-150854 | 6/1993 |
| JP | 06-075652 | 3/1994 |
| JP | 6-75652 | 3/1994 |
| JP | H6-244893 | 9/1994 |
| JP | H8-204782 | 8/1996 |
| JP | H8-307476 | 11/1996 |
| JP | 10-013576 | 1/1998 |
| JP | 1998013576 A | 1/1998 |
| WO | WO 92/17968 | 10/1992 |
| WO | 93/02510 | 2/1993 |
| WO | PCT/IB96/00223 | 1/1996 |
| WO | WO 96/23377 | 8/1996 |
| WO | WO 96/29638 | 9/1996 |
| WO | WO 97/09667 | 3/1997 |
| WO | WO 98/57248 | 12/1998 |
| WO | WO 99/34591 | 7/1999 |

OTHER PUBLICATIONS

Model 505 Chip Transceiver Schematic [3 pages] (Jun. 27, 1988).
Network World Article: "SynOptics touts FDDI products affordability" [2 pages] (Sep. 2, 1991).
Communication Week Article: "FDDI Spec Consortium" [2 pages] (May 27, 1991).
Network World Article: "DEC to show new FDDI, E-mail wares" [2 pages] (Jan. 28, 1991).
Network World Article: "Proposed groups eye alternate FDDI media" [3 pages] (Nov. 12, 1990).
H4000 Ethernet Transceiver Technical Manual [67 pages] (1982).
Worldwide History of Telecommunications by Anton A. Huurdeman [38 pages] (No date).
IBM Token-Ring Network Technology, # GA27-3832-0 [146 pages] (1986).
IBM—Technical Reference—Personal Computer Hardware Reference Library, # 69X7862 [476 pages] (Jun. 1986).
Token-Ring Network—Architecture Reference, # SC30-3374-02 [485 pages] (Sep. 1989).
Using the IBM Cabling System with Communication Products, # GA27-3620-1 [355 pages] (Apr. 1986).
Network World Article: "Token-ring sales take off" [3 pages] (Aug. 17, 1987).
Closeup Article—The LAN Inner Circle [15 pages] (Mar. 25, 1985).
Perspective Computer Systems News Article—Making Sure the Pieces Fit [7 pages] (Mar. 1988).
Data Communications—McGraw-Hill's Technology Magazine for Network Managers: "Multivendor token ring networks coming of age" [5 pages] (Nov. 21, 1989).
Understanding Token Ring Protocols and Standards by James T. Carlo, Robert D. Love, Michael S. Siegel and Kenneth T. Wilson—Artech House [4 pages] (1998).
IBM Token-Ring Network Operates on Telephone Twisted-Pair Media (Marketing Announcement) by IBM [4 pages] (Oct. 15, 1985).
Design of a Twisted Pair Cable for a Token Passing Local Area Network (Intl. Wire & Cable Symposium Proceedings) by Paul Abramson—IBM Corporation [3 pages] (1983).
IBM Cabling System Planning and Installation Guide, # GA27-3361-07 [344 pages] (Oct. 1987).
Local Area Network Station Connector (IBM Technical Disclosure Bulletin, vol. 27 No. 2) by E.J. Annunziata and T.E. Stammely [5 pages] (Jul. 1984).
Product and Price Schedule (SynOptics, Inc.—p. 18 of 25) [1 page] (Aug. 1, 1991).
Technical Report—"The Effect of Ethernet Behavior on Networks using High-performance Workstations and Servers" by Rich Seifert (Networks and Communications Consulting) [25 pages] (Mar. 3, 1995).
Technical Report—"Issues in LAN Switching and Migration from a Shared LAN Environment" by Rich Seifert (Networks and Communications Consulting) [28 pages] (Nov. 1995).
IBM Token-Ring Network—Introduction and Planning Guide, # GA27-3677-03 [241 pages] (Sep. 1990).
IBM—"International Technical Support Organization High-Speed Networking Technology: An Introductory Survey", # GG24-3816-02 [480 pages] (Jun. 1995).
IBM—"Local Area Network Concepts and Products: LAN Architecture", # SG24-4753-00 [262 pages] (May 1996).
IBM—"Local Area Network Concepts and Products: Adapters, Hubs and ATM", # SG24-4754-00 [326 pages] (May 1996).
"SynOptics supports FDDI over shielded twisted pair" by Local Networking [2 pages] (Jun. 18, 1990).

"SynOptics Distributes LAN Management" by LAN Magazine [4 pages] (May 1991).
Network World Article: "SynOptics supports FDDI over shielded twisted pair" [1 page] (Jun. 18, 199?).
"Lattisboot Server V1.0 for DOS" by SynOptics Communications, Inc. [5 pages] (Sep. 1, 1991).
"Model 2722 Local Token Ring Bridge" by SynOptics Communications, Inc. [10 pages] (Nov. 9, 1992).
"LattisEZ-View Version 2.0" by SynOptics Communications, Inc. [6 pages] (Nov. 9, 1992).
"LattisNet Model 3323S and 3324-ST High-Speed Local Ethernet Bridges" by SynOptics Communications, Inc. [11 pages] (Mar. 4, 1991).
"LattisNet Model 3386 Remote Ethernet Router" by SynOptics Communications, Inc. [16 pages] (Mar. 4, 1991).
The LOCALNetter Newsletter: "Special Report—SynOptics Networking Products", vol. 9, No. 10 [6 pages] (Oct. 1989).
"Lattis EZ-View" by SynOptics Communications, Inc. [19 pages] (Date: Unknown).
"LattisNet Model 822 10BASE-T-To-Type 1 Adapter Reference Sheet" by SynOptics Communications, Inc., # 893-029 [6 pages] (Date: Unknown).
"Network World—The Newsweekly of User Networking Strategies", vol. 7, No. 46 [78 pages] (Nov. 12, 1990).
Local Networking Article: "Interoperability top priority for vendors" by Susan Breidenback [2 pages] (Jun. 18, 1990).
Network World Article: "Coalition forming to advance FDDI on UTP" [2 pages] (Jul. 15, 1991).
Network World Article: "SynOptics to unveil FDDI components" [2 pages] (Aug. 19, 1991).
Network World Article: "Start-up offers FDDI adapters for shielded twisted-pair local nets" [8 pages] (Jun. 10, 1991).
Picture (Drawing) of FDDI/Twisted Pair Adaptor Card (Author Unknown) (Date: Unknown).
Info World Article: "100-MBPS FDDI Will Run in Twisted-Pair Wiring" by Margie Wylie and Barbara Darrow [1 page] (Jun. 18, 1990).
"Companies Cooperate to Publish Open Specification for FDDI on Shielded Twisted Pair Cable"—"Five Industry Leaders Demonstrate Interoperability of Products" (Author Unknown) [2 pages] (May 21, 1991).
"The Use of Scramblers with Anti Locking Circuit" by Michael P. Spratt, Hewlett Packard [16 pages] (Dec. 6, 1991).
"FDDI on STP" by Hank Foglia, IBM Communication Systems [19 pages] (Feb. 19, 1991).
Glossary—FDDI Fiber Module, Version b1.0a (Author & Reference Unknown) [7 pages] (May 1992).
"FDDI STP-PMD Proposal" (Author Unknown) [35 pages] (Date: Unknown).
"FDDI—UTP—Investigation" by Synoptics [6 pages] (Date: Unknown).
"A proposal for a Low-Cost FDDI UTP/STP PMD Standard" by Mario Mazzola, Crescendo Communications [31 pages] (Oct. 15, 1991).
"STP Proposal—Introduction" by AMD, Chipcom, DEC, IBM, Motorola, SynOptics [60 pages] (Oct. 15, 1991).
"The SUPERNET® Family for FDDI—Technical Manual" by Advanced Micro Devices, [112 pages] (Jul. 1989).
"The SUPERNET® Family for FDDI—1991/1992 World Network Data Book" by Advanced Micro Devices, [114 pages].
"Minutes—the Aug. 20, 1991 TP-PMD Meeting. Boulder, Colorado" by Author Unknown [2 pages] (Aug. 20, 1991).
"Alternate Copper Media for FDDI" by Chipcom Corporation, [33 pages] (Jun. 1990).
"Project Proposal" by Chipcom Corporation, [146 pages] (Oct. 17, 1989).
"Minutes of the Jun. 20 & 21, 1990 Meeting" by ASC Task Group X3T9.5, [3 pages] (Jun. 20/21, 1990).
"LattisNet Manager for UNIX 2.0", SynOptics Communications, Inc., Product Announcement [18 pages] (Sep. 23, 1991).
Advertisement for Watchdog Network Monitor, LAN Magazine,vol. 5, No. 6, 5 pages (Jun. 1990).

King, "A Survey of Commercially Available Secure LAN Products", IEEE, (1990) (pp. 239-247).
Colin et al, "Testing the LAN testers", Network World, Sep. 10, 1990 (pp. 39-40, 44-45,48, 74).
Bradley et al, "Unix-based Tracking Software", The Local Area Network Magazine 7.n9, p. 162(2) (Sep. 1992).
Bradley et al, "Track devices on a Mac network", The Local Area Network Magazine 7.n9, p. 162(1) (Sep. 1992).
Anonymous, "Theft Detection Means for Use with Coaxial Cables", 1 page (undated).
Herivel et al,"Security Alarm System", IBM Corporation, vol. 20, No. 8 (Jan. 1978) pp. 3237-3238.
Gaston, "Intruder Detection", IBM Technical Disclosure Bulletin, vol. 11, No. 12 (May 1969), pp. 1723-1724.
Yount, "Security Monitor for Office Equipment", IBM Technical Disclosure Bulletin, vol. 24, No. 1B (Jun. 1981) pp. 576-577.
Reddy, "Traffic Control: network monitors keep your LAN from going south.", The Local Area Network Magazine (May 1990), pp. 76(7).
Hill et al., "16Mb/s Token Ring on Unshielded Twisted Pair Cabling," IEEE (1991), pp. 67-72.
Van-Mierop, "Extending Ethernet/802.3 Over FDDI Using the FX 8000", High Speed Local Area Networks, II, Elsevier Science Publishers B. V. (North-Holland), IFIP (1990), pp. 259-267.
Mercier et al.,"Los Alamos National Laboratory's High-Performance Data System", 4 pages (Sep. 1991).
Mercier et al. "NFS as a User Interface to a High-Performance Data System", 9 pages (Oct. 1991).
IBM Technical Disclosure Bulletin, "Remote Powering" No. 01-78, pp. 3164-3165—published Jan. 1978.
"Attachment Module Guide for the IBM Token-Ring Network", IBM, Apr. 1992.
"Integrated Services Digital Network(ISDN)", International Telecommunication Union, vol. III, Fascicle III.8, pp. 175-176 and 204-209 (Nov. 14-25, 1988).
"Token Ring Access Method", The Institute of Electrical and Electronics Engineers, Inc., 1985, 80 pages.
An Interoperable Solution for FDDI Signaling Over Shielded Twisted Pair, Advanced Micro Devices, Inc., May 21, 1991, 9 pgs.
An Interoperable Solution for FDDI Signaling Over Shielded Twisted Pair, Advanced Micro Devices, May 21, 1991, 25 pages.
Chapter I LattisNet Operation, Ethernet Connectivity Guide, 145 pages.
FDDI Metallic Media—Shielded Twisted Pair Physical Layer Medium Dependent, British Telecom, Oct. 15, 1991.
FDDI on Copper with AMD PHY, Advanced Micro Devices, 1991, 8 pgs.
IEEE Network Magazine, vol. 1, No. 1, Jan. 1987, 30 pages.
IEEE-SA Standards Board Bylaws, 3 pages.
Information Processing Systems—Fibre Distributed Data Interface (FDDI) Part 1: Token Ring Physical Layer Protocol (PHY), Global Engineering Documents, 1989, 38 pgs.
Information Processing Systems—Fibre Distributed Data Interface (FDDI) Part 3: Physical Layer Medium Dependent, Global Engineering Documents, 1989, 55 pgs.
Information Processing Systems—Fibre Distributed Data Interface (FDDI) Part 2: Token Ring Media Access Control (MAC), Global Engineering Documents, 1989, 75 pgs.
Keller, R. et al, "Performance Bottlenecks in Digital Movie Systems", Proceedings of the 4th International Workshop on Network and Operating System Support for Digital Audio and Video, Lancaster, U.K., Nov. 1993, 13 pages.
LattisNet System 3000 Ethernet Connectivity Guide, Sep. 1991, 19 pages.
LattisNet System 3000 Ethernet Connectivity Guide, Sep. 1991, 7 pages.
LattisNet System 3000 Ethernet Connectivity Guide, SynOptics Communications, Inc., Sep. 1991, 19 pages.
LattisNet System 3000 Ethernet Connectivity Guide, SynOptics Communications, Inc., Sep. 1991, 12 pages.
Lavoisard, J.L. et al, Les Installations Terminales D'Abonnes, Commutation & Transmission No. 3, 1987, pp. 35-50.
Letter of Assurance Process Flowchart, IEEE, 2 pages.

Levine, Judity, FDDI Spec Consortium, 21 pages.
Local Area Networks, Managing the Physical Layer, International Data Corporation, Mar. 1990, 36 pages.
Reference Data for Engineers: Radio, Electronics, Computer and Communications, 1989, 17 pages.
Stallings, William, Local Networks (Second Edition), 435 pages.
Stallings, William, Local Networks, An Introduction.
System Consideration for Multisegment 10 Mb/s Baseband Networks, (Section 13) and Twisted Pair Medium Attachment Unit (MAU) and Baseband Medium, Type 10BASE-T (Section 14), 33 pages.
Technical Response Center, Technical Tip, Bay Networks, 2 pages.
Token Ring Network Architecture Reference, IBM, 15 pages.
Track-It for Windows, 3 pages.
Visual Audit Pro, 2 pages.
IEEE, "Twisted-Pair Medium Attachment Unit (MAU) and Baseband Medium, Type 10BASE-T" IEEE Std. 802.3i-1990 (section 14) (1990).
IEEE, "Media Access Control (MAC) Parameters Physical Layer, Medium Attachment Units, and Repeater for 100 Mb/s Operation, Type 100BASE-T (Clauses 21-30)" IEEE Std. 802.3u-1995.
IEEE, "Physical Coding Sublayer (PCS), Physical Medium Attachment (PMA) sublayer and baseband medium, type 1000BASE-T" IEEE Std. 802.3ab-1999.
EIA/TIA 568 Standard, "Commercial Building Telecommunications Wiring Standard", Jul. 1991.
EIA/TIA Bulletin, TSB-36, "Technical Systems Bulletin Additional Cable Specifications for Unshielded Twisted Pair Cables", Nov. 1991.
EIA/TIA Bulletin, TSB40, "Additional Transmission Specifications for Unshielded Twisted Pair Connecting Hardware", Aug. 1992.
Universal Serial Bus Specification, Revision 1.1, Sep. 23, 1998 (327 pages).
DECconcentrator 500 (Technical Description), Jul. 1992.
LattisNet Model 505 Transceiver Quick Reference Sheet (893-448-A) (2 pages) (date unknown).
LattisNet Model 505 Unshielded Twisted Pair Transceiver (Pictures) (5 pages) (date unknown).
SynOptics Series 3000 Hub Management Module Guide, Feb. 1998.
The Ethernet, A Local Area Network, Data Link Layer and Physical Layer Specifications, Version 1.0, Sep. 30, 1980.
The Ethernet, A Local Area Network, Data Link Layer and Physical Layer Specifications, Version 2.0, Nov. 1982.
LattisNet Model 3305 Ethernet UTP Host Module (Pictures) (8 pages) (date unknown).
SynOptics LattisNet System 3000 Ethernet Connectivity Guide (p. 4-2) (Sep. 1991).
MagicNet Hub (Models: ML 400x & Model 401x) (Pictures) (8 pages) (date unknown).
IBM Cabling System, Technical Interface Specification, GA27-3773-1 (2$^{nd}$ Edition, Oct. 1987).
Data Cabling—Still in the Melting Pot? (by The Cabling Partnership) (Jul. 21, 1998).
Electronic Industries Association, "Interface Between Data Terminal Equipment and Data Communication Equipment Employing Serial Binary Data Interchange" EIA Standard, EIA-232-C (Aug. 1969).
Electronic Industries Association, "Electrical Characteristics of Balanced Voltage Digital Interface Circuits" EIA Standard, RS-422 (Apr. 1975).
Electronic Industries Association, "Standard for Electrical Characteristics of Generators and Receivers for Use in Balanced Digital Multipoint Systems" EIA Standard, EIA-485 (Apr. 1983).
Telecommunications Industry Association, "Electrical Characteristics of Generators and Receivers for Use in Balanced Digital Multipoint Systems" TIA Standard, TIA-485-A (Mar. 1998).
The Institute of Electrical and Electronics Engineers, "IEEE Standard Digital Interface for Programmable Instrumentation", ANSI/IEEE Std 488-1978; Revision of ANSI/IEEE Std 488-1975—Includes supplement IEEE Std 488A-1980 (Jun. 9, 1978).
SynOptics Communications, Inc., "Model 2810-04 Features 'Local Load' Capability & Advanced LNMS Agent" Product Update (Aug. 15, 1991).

SynOptics Communications, Inc., "Model 955 & Model 956 Token Ring Integrated Media Filters" Product Announcement (Nov. 4, 1991).
SynOptics Communicatinos, Inc., "Model 2800 10BASE-T Workgroup Concentrator", Product Update (Oct. 24, 1991).
SynOptics Communications, Inc., "Model 3505A Unshielded Twisted Pair Host Module", Product Announcement (Nov. 11, 1991).
SynOptics Communications, Inc., "LattisNet Ethernet Bridge Manager", Product Announcement (Dec. 6, 1991).
SynOptics Communications, Inc., "Model 3301-75/3301-93 Ethernet Host Modules", Product Announcement (Dec. 30, 1991).
SynOptics Communications, Inc., "LattisSecure and the Model 3368 10BASE-T Host Module", Product Summary (Mar. 2, 1992).
SynOptics Communications, Inc. "Designing Highly Available FDDI Backbone Networks", Application Note (Mar. 25, 1992).
SynOptics Communications, Inc., "LattisTalk Model 3394 Router / Repeater", Product Announcement (Apr. 20, 1992).
SnyOptics Communications, Inc., "Model 3513 Token Ring Network Management Module", Product Announcement (May 5, 1992).
SynOptics Communications, Inc., "2700 Series Token Ring Workgroup Hubs", Product Announcement (May 5, 1992).
SynOptics Communications, Inc., "Lattis Views Network Management Solutions", Product Announcement (Apr. 27, 1992).
SynOptics Communications, Inc., "LattisSwitch System 3000", Product Announcement (Jun. 8, 1992) (pp. 1-23 of 25).
SynOptics Communications, Inc., "Ethernet Switching Engine (ESE)", Product Directions (Jun. 8, 1992).
SynOptics Communications, Inc., "Lattis EZ-View Version 1.1" Product Update, (Aug. 28, 1992).
SynOptics Communications, Inc., "LattisNet Manager for DOS 4.2", Product Update (Aug. 28, 1992).
SynOptics Communications, Inc., "Token Ring Network Management Agent 4.1", Product Update (Aug. 28, 1992).
SynOptics Communications, Inc., "LattisHub 10BASE-T Workgroup Hubs", Product Announcement (Oct. 5, 1992).
SynOptics Communications, Inc., "LattisSwitch System 3000 Network Management", Product Update (Oct. 16, 1992).
SynOptics Communications, Inc.,"Model 550B UTP Token Ring Lobe Media Filter", Product Announcement (Oct. 19, 1992).
SynOptics Communications, Inc., "Model 3313A & Model 3314A Ethernet Network Management Modules", Product Announcement (Oct. 19, 1992).
SynOptics Communications, Inc., "Model 3502B Token Ring Host Module", Product Announcement (Nov. 9, 1992).
SynOptics Communications, Inc., "Model 27x2 Token Ring Workgroup Concentrators", Product Announcement (Nov. 9, 1992).
SynOptics Communications, Inc., "Model 3307HD 10BASE-T Host Module", Product Announcement (Dec. 11, 1992).
SynOptics Communications, Inc., "Lattis EZ-View Version 2.0", Product Update, (Nov. 9, 1992).
SynOptics Communications, Inc., "LattisNet Basic Network Management Version 3.1", Internal Product Announcement (Jan. 21, 1991).
SynOptics Communications, Inc., "10BASE-T Host Modules, Transceivers and Network Interface Cards", Internal Product Announcement (Feb. 15, 1990).
SynOptics Communications, Inc., "System 3000 Network Configuration", Management, Interconnectivity, Technical Support Training (Date Unknown).
SnyOptics Communications, Inc., "The Model 2810 and SynOptics' Value Added", (Date Unknown).
SynOptics Communications, Inc., "SynOptics Introduces the Industry's Most Powerful and Complete FDDI Solution", Product Announcement (Jul. 30, 1991).
AT&T Technologies, "Telecommunications Transmission Engineering", vol. 1, Principles (1975).
Advanced Micro Devices, "Implementing FDDI Over Copper—The ANSI X3T9.5 Standard—Application Note", Pub. #18258, Rev. A (Nov. 1993).
Digital Equipment Corporation, Intel Corporation and Xerox Corporation, "The Ethernet, A Local Area Network, Data Link Layer and Physical Layer Specifications" (Version 1.0, pp. 53-57, Sep. 30, 1980).

SynOptics Communications, Inc., "Token Ring Tutorial", (Jan. 1990).
SynOptics Communications, Inc. "SynOptics Readies Twisted Pair FDDI Technology for Presentation AT ANSI Meeting This Month", News Release, (Jun. 11, 1990).
Schmidt, Dr. Ronald V., "Developing Ethernet Capability on Unshielded Twisted Pair", Telecommunications, (Jan. 1988).
Haskin, Denis W., "Twisted-Pair Ethernet for Everyone", Digital Review, (Jul. 25, 1988).
SynOptics Communications, Inc., "LattisNet Product Overview" (Apr. 1990).
SynOptics Communications, Inc., "The Importance of FDDI Interoperability", Sales Note, (Aug. 14, 1990).
SynOptics Communications, Inc., "What Is FDDI's Station Management (SMT)?", Sales Note, (Oct. 16, 1990).
SynOptics Communications, Inc., "IBM and SynOptics Business Alliance Update", Sales Note, (Feb. 24, 1992).
SynOptics Communications, Inc., "Shielded Twisted Pair Token Ring Modules, Patch Cables and System 3000 Ethernet / Token Ring Concentrators", Product Announcement, (Mar. 19, 1990).
Wekler, Joanie M., "Don't Yank Those Wires Out Just Yet" Computer World, (Jun. 18, 1990).
Haight, Timothy, "A Twisted Future", Communications Week (Jun. 18, 1990).
SynOptics Communications, Inc., "The Inside Story About Twisted Pair FDDI Technology", Technology Update, (Jun. 29, 1990).
SynOptics Communications, Inc., "Phase II LattisNet Token Ring Products Include High Performance Support for Unshielded Twisted Pair Wire At 4 Mb/s & 16 Mb/s, Up to 144 Stations on a single Ring", Product Announcement (Aug. 27, 1990).
SynOptics Communications, Inc., "Model 508A 10BASE-T Transceiver", Product Announcement, (Jan. 14, 1991).
SynOptics Communications, Inc., "Model 518 10BASE-T Transceiver for Apple Ethernet", Product Announcement, (Jan. 16, 1991).
SynOptics Communications, Inc., "SynOptics' System 2000 Featuring the Model 2810", Product Announcement, (Feb. 12, 1991).
SynOptics Communications, Inc., "LattisNet Model 3000-04-R Concentrator With Redundant Power Supplies", Product Announcement, (Mar. 4, 1991).
SynOptics Communications, Inc., "LattisNet Basic Network Management for Ethernet and Token Ring", Product Announcement, (Mar. 4, 1991).
Lebar, Michael Kip; Sarles, F. Williams and Polhemus, Gary, "FDDI—Shielded Twisted Pair and Data Grade Unshielded Twisted Pair Physical Layer Medium Dependent—(STP/DTP-PMD)—Draft Proposal", Cabletron Systems, Inc., FWS Engineering and National Semiconductor, (Aug. 15, 1991).
Stewart, Mary, "Chipcom Unveils Twisted Pair/FDDI Technology", Press Release, Chipcom, (Jun. 14, 1990).
SynOptics Communications, Inc., "SynOptics FDDI Solution" (Date Unknown).
AMD, Chipcom, DEC, IBM, Motorola and SynOptics, "Wire Fault Detect Function", ANSI X3T9.2 FDDI TP-PMD Working Group, (Oct. 15, 1991).
SynOptics Communication, Inc., "FDDI—UTP—Investigation", (Date Unknown).
Crescendo Communications, Mazzola, Mario; "A Proposal for a Low-Cost FDDI UTP/STP PMD Standard" (Oct. 15, 1991).
TCL Incorporated, "Ethernet / IEEE 802.3 Segment to Segment Connection—The TCL Repeater Model 2210" (1987).
TCL Incorporated, "Ethernet / IEEE 802.3 Installation Tester—The TCL Installation Tester Model 2011" (1986).
TCL Incorporated, "The Connection to Ethernet—Transceiver or MAU Models 2010EB, 2010EBS, 2010I & 2010IS" (1987).
TCL Incorporated, "The Connection to Ethernet / IEEE 802.3 Local Area Networks—Transceiver or Mau Model 2010DM" (1988).
TCL Incorporated, "The Multiconnection to Ethernet Versions 1 & 2, and IEEE 802.3—The Dual-Mode Multiport Transceiver Model 2110-DM" (1988).
TCL Incorporated, "The Multiconnection to Ethernet / IEEE 802.3—The TCL Multiport Transceiver Model 2110" (1987).
Markov, J.D.; Strole, N.C.; "Token-Ring Local Area Networks: A Perspective", International Business Machines Corporation, (1982).

Dixon, R.C.; Strole, N.C.; Markov, J.D., "A Token-Ring Network for Local Data Communications", IBM Systems Journal, vol. 22, Nos. 1/2, (1983).
Kummerie, K.; Reiser, M., "Local-Area Communication Networks—An Overview", Journal of Telecommunications Networks, Winter 1982, vol. 1, No. 4 (1982).
See, Michael, "Transmission—The IBM Token Ring Will Handle Up to 72 Stations At the Full 4-Mbit/s Data Rate" IBM Corp., Data Communications, (Mar. 1986).
Dixon, Roy C., "Lore of the Token Ring", IEEE Network Magazine, (Jan. 1987, vol. 1, No. 1, pp. 11-38).
Warter, Jamie, Chipcom Corporation, "FDDI—TPDDI White Paper" (Sep. 19, 1991, Version 1.2).
Schommer, Nick; Vogt, Jim, SynOptics Company, "FDDI Workgroup Hub Project Proposal" (Jan. 21, 1991).
Howard W. Sams & Co., Inc., "Reference Data for Engineers: Radio, Electronics, Computer, and Communications" Seventh Edition, Fifth Printing (1989).
SynOptics Communications, Inc., "LattisNet Product Overview—A Comprehensive Description of the LattisNet Product Family" (Date Unknown).
SynOptics Communications, Inc., "Low-Cost 10BASE-T Connectivity Products", Product Update Announcement, (May 23, 1990).
Cook, John, "Line Codes for FDDI Over Copper" BT Laboratories, Copper Access Systems Section (Date Unknown).
Mazzola, Mario, "Evaluating PR-4 as a FDDI / UTP PMD Coding Scheme", Crescendo Communications, Inc., (Feb. 19, 1991).
SynOptis Communications, Inc., "Internetworking Product Directions Announcement", Product Directions, (Mar. 4, 1991).
Thorngate, Kristina, "SynOptics Introduces Industry's Most Powerful FDDI Solution" (Sep. 9, 1991).
Smith, Tom, "Chipcom's Wire Hub Boasts Support for Range of LANs", Network World, vol. 7, No. 4, (Feb. 5, 1990).
Darrow, Barbara, "Chipcom LAN Concentrator Spans Multiple Protocols, Cabling Schemes", Info World, (Jan. 29, 1990).
Hutchison, Jerry, "Update on ASC X3T9.5 FDDI", Digital Equipment, Tutorial, (Jul. 11, 1988).
Warter, Jamie, "FDDI—TPDDI White Paper", Chipcom Corporation, Version 1.2, (Sep. 19, 1991).
SynOptics Communications, Inc., "FDDI Networking on Twisted Pair", Version 0.2 (Date Unknown).
Stewart, Mary, "Chipcom Unveils Twisted Pair/FDDI Technology", Press Release, (Jun. 14, 1990).
Chipcom, "Jan. 1992—FDDI Product Direction—FDDI Connectivity".
Mancour, Tim; "MAC-Less FDDI Concentrator Command Summary" (Mar. 10, 1992).
Chipcom Corporation, "FDDI—An Introduction to Fiber Distributed Data Interface" (Date Unknown).
SynOptics Communications, Inc., "Lattis EZ-View" IS505-036US-A (Date Unknown).
Bay Networks Public Information, "LattisNet (Pre-10BaseT Versus 10BaseT", Technical Response Center, Technical Tip (Date Unknown).
SynOptics Communications, Inc., "Model 505 Unshielded Twisted Pair Transceiver" Circuit Design (Jun. 27, 1988; Jan. 17, 1990—9 Pages).
Strole, Norman C., "The IBM Token Ring Network—A Functional Overview" IEEE Network Magazine, vol. 1, No. 1, pp. 23-30 (Jan. 1987).
Advanced Micro Devices, Inc., Chipcom Corporation, Digital Equipment Corporation, Motorola Inc., and SynOptics Communications, Inc., "Shielded Twisted Pair Proposal for the TP-PMD Working Group" (Jun. 1991).
Miligan, Gene; Ross, Floyd; Cooper, Stephen W.; Ater, Dan; "FDDI—Metallic Media—Unshielded Twisted Pair Physical Layer Medium Dependent (UTP-PMD)—Draft Proposed American National Standard" (Jun. 10, 1991).
Lebar, M.K.; Sarles, F.W.; "A Low Cost Integratable Solution for FDDI Signaling Over Twisted Pair", National Semiconductor & Cabletron Systems, (Jun. 1991).
FER; "FFOL—The FDDI Follow-On LAN" (Jul. 1991).

Ross, Floyd E., "FDDI—A 100 Megabit Per Second Local Area Network" Timeplex—Systems Engineering (Jul. 1991).
SynOptics Communications, Inc., "Low-Cost 10BASE-T Connectivity Products", Product Update Announcement (May 23, 1990).
National Semiconductor Corporation, "DP83220 CDL Twisted Pair FDDI Transceiver Device" Advance Information (Oct. 1992).
SynOptics Communications, Inc., "Systems 2000 10BASE-T Concentrators", Product Announcement, (Sep. 14, 1990).
SynOptics Communications, Inc., "Model 3307 50-Pin 10BASE-T Host Module" Product Announcement, (Nov. 9, 1990).
SynOptics Communications, Inc., "LattisNet Basic Network Management for Ethernet and Token Ring" Product Announcement, (Mar. 4, 1991).
SynOptics Communications, Inc., "10BASE-T Host Modules, Transceivers and Network Interface Cards" Internal Product Announcement, (Feb. 15, 1990).
SynOptics Communications, Inc., "LattisNet Model 955 & Model 956 Token Ring Integrated Media Filters for Unshielded Twisted Pair Lobe Connection", Product Announcement, (Nov. 4, 1991).
Rissow, Beverly; Johnson, Beth, "SynOptics Signs Technology Agreements to Speed the Development of Twisted Pair FDDI Products—CMC, Interphase, Network Peripherals and Silicon Graphics Join SynOptics in Effort to Reduce Cost of FDDI to the Desktop", Press Release (Sep. 24, 1990).
M&T Publishing, "King Tut Expands Ethernet", LAN Technology, (Nov. 1992).
ZD Net, "Bucking the Trend: A Low-Cost Ethernet LAN", Computer Shopper, (Oct. 1991).
M&T Publishing, "Tutankhamon Electronics Inc., The Assistant Network Manager, Cable Diagnostic Tools, Product Announcement", LAN Technology, (Oct. 15, 1992).
T.H.E. Journal, "School Buildings Linked Via Existing Phone Wire" (May 1992).
Electronic Engineering Times, "Startups Launch Twisted-Pair Networks" (May 4, 1992).
L.AN Technology, "Tut Cuts Thinnest" (Jun. 1992).
LAN Times, "Tutankhamon Raises Level-2 UTP From the Tomb" (Mar. 22, 1993).
Newsbytes, "Tutankhamon Electronics Intros MagicNet LAN" (Nov. 7, 1991).
Electronic Design, "FDDI Rides Twisted Pair to the Desktop" (Sep. 16, 1993).
Electronic News, "Firms Agree on Twisted Pair Fast Data" (May 18, 1992).
Network World, Spec Details Use of FDDI Over Shielded Twisted Pair (May 27, 1991).
PC Week, "Microdyne Introduces 100M-bps FDDI board" (Dec. 9, 1991).
PC Week, "4 Vendors' FDDI Managers Pass Interoperability Tests" (Feb. 17, 1992).
LAN Times, "3Com Is Betting on FDDI for LANs; Ships FDDILink NICs" (Jan. 25, 1993).
LAN Computing, "Network Adapters" (Nov. 1991).
PC Week, "Vendor Eyes FDDI Adapter Support for Twisted Pair" (Jun. 10, 1991).
PC Week, "ANSI Rejects Plan for Alternate FDDI Media" (Oct. 28, 1991).
PC Week, "Group Proposes New FDDI Wiring Scheme: UTP Solution Would Slash Costs" (Aug. 5, 1991).
LAN Times, "FDDI Over STP? Sounds Great, But Where Is It?" (Jun. 3, 1991).
PC Week, "Digital Leads Drive to Twisted-Pair FDDI" (May 27, 1991).
CSN, "Hub Makers Seek FDDI Link" (Oct. 14, 1991).
Fiber Optics News, "Digital Equipment Corp. And Network Peripherals Make FDDI News . . . Working on FDDI Over Copper Specification, Leonard Says" (Jun. 24, 1991).
LAN Times, "Network Peripherals Cuts FDDI Prices by 50 Percent" (Dec. 21, 1992).
Computerworld, "Vendors Back Next-Generation FDDI; Unshielded Twisted-Pair Products for High-Speed Nets Leapfrog Draft Standard" (May 3, 1993).
Computerworld, "Network Peripherals Cuts FDDI Prices" (Dec. 7, 1992).
Communications Week, "Crescendo Preps PC CDDI Card" (Oct. 26, 1992).
PC Week, "Companies Pool Proposals for Copper-Based FDDI Network Standard" (Jun. 29, 1992).
PC Week, "FDDI Vendors Hope to Stir Market With Hubs, Cards" (May 25, 1992).
Newsbytes, "3Com Shows a Bevy of New Products At InterOp" (May 20, 1992).
Coilcraft, "10 BASE T Transformers—Dual Transformer Package" (Jun. 1989).
Valor, "Ethernet / Cheapernet Lan Coupling Transformers" (Oct. 1989).
Pulse Engineering Inc., "10BASE T and Ethernet Surface Mount Transformers" (Jun. 1991).
Chipcom Corporation, "Online FDDI Media Modules Release Notes" (Apr. 14, 1994).
SynOptics Communications, Inc., "TP-PMD Adaptation for STP Cable Plants" (Apr. 26, 1994).
SynOptics Communications, Inc., "LattisLink 2800A 10BASE-T Workgroup Concentrator Users Guide" (Aug. 1992).
SynOptics Communications, Inc., "System 3000 FDDI Host Module—Functional Specification" (Apr. 19, 1991).
Technical Committee X3T9, "FDDI STP-PMD Proposal" I/O Interface (Date Unknown).
AMD, Chipcom, DEC, IBM, Motorola, SynOptics, "STP Proposal—Introduction", (Oct. 15, 1991).
AMD, Chipcom, Digital, IBM, Motorola and SynOptics, "Report on Action Item to Merge STP-PMD Proposals", (Aug. 20, 1991).
Foglia, Hank, "FDDI on STP", IBM Communication Systems (Feb. 19, 1991).
Shah, Amit; Staddon, Don; Rubin, Izhak; Ratkovic, Aleksandar, "Multimedia Over FDDI", Conference Paper Reprint (Sep. 13, 1992).
"Introduction to Telephones and Telephone Systems" {Book} (Author: A. Michael Noll, Second Edition, 1991).
"Implementation and Applications of DSL Technology" {Book} (Authors: Golden, Dedieu & Jacobsen, Auerbach Publications, 2008}.
"Subscriber Loop Signaling and Transmission Handbook—Analog" {Book} (Author: Whitham D. Reeve, IEEE Press, 1992).
"Old-Time Telephones! Design, History and Restoration" {Book} (Author: Ralph O Meyer, A Schiffer Book With Price Guide for Collectors, 2005).
"Telephones—Antiques to Modern" {Book} (Author: Kate E. Dooner, A Schiffer Book for Collectors, 1997).
"100 Years of Bell Telephones" {Book} (Author: Richard Mountjoy, A Schiffer Book, 1995).
"Universal Service Ordering Codes" (pp. 47-57) {Date Unknown}.
"TIA/EIA-568-A"—"Commercial Building Telecommunications Cabling Standard" (Oct. 6, 1995).
"TIA/EIA-568-A-1"—"Propagation Delay and Delay Skew Specifications for 100 ohm 4-Pair Cable" (Aug. 20, 1997).
"TIA/EIA-568-A-2"—"Corrections and Additions to TIA/EIA-568-A" (Jul. 28, 1998).
"TIA/EIA-568-A-3"—"Addendum No. 3 to TIA/EIA-568-A" (Dec. 10, 1998).
"TIA/EIA-568-A-4"—"Production Modular Cord Next Loss Test Method and Requirements for Unshielded Twisted-Pair Cabling" (Nov. 29, 1999).
"TIA/EIA-568-A-5"—"Transmission Performance Specifications for 4-Pair 100 ohm Category 5e Cabling" (Jan. 27, 2000).
"IEEE Std. 802.5c-1991"—"Supplement to Token Ring for Dual Access Method and Physical Layer Specifications"—"Recommended Practice for Dual Ring Operation with Wrapback Reconfiguration" (Mar. 21, 1991).
"ANSI INCITS 229-1994 (R1999)"—"For Information Systems—Fibre Distributed Data Interface (FDDI)—Station Management (SMT)" (1994).
"ANSI X3.263-1995"—"For Information Technology"—Fibre Distributed Data Interface (FDDI)—Token Ring Twisted Pair Physical Layer Medium Dependent (TP-PMD) (1995).

"ANSI/IEEE Std 802.2"—"IEEE Standard for Information technology—Telecommunications and information exchange between systems—Local and metropolitan area networks—Specific requirements—Part 2: Logical Link Control" (1998 Edition).
"ISO/IEC 9314-4"—"Information technology—Fibre distributed data interface (FDDI)—Part 4: Single-mode fibre physical layer medium dependent (SMF-PMD)" (First edition Oct. 1999).
"ISO/IEC 14709-2"—"Information technology—Configuration of Customer Premises Cabling (CPC) for Applications—Part 2: Integrated Services Digital Network (ISDN) primary rate" (First edition May 1998).
"ISO/IEC 8877"—"Information technology—Telecommunications and information exchange between systems—Interface connector and contact assignments for ISDN Basic Access Interface located at reference points S and T" (Second edition Nov. 15, 1992).
"IEEE Std 1802.3-1991"—"Carrier Sense Multiple Access with Collision Detection (CSMA/CD) Access Method and Physical Layer Specifications"—"Currently Contains Attachment Unit Interface (AUI) Cable (Section 4)" (Aug. 9, 1991).
"IEEE Std 802-1990"—"IEEE Standards for Local and Metropolitan Area Networks: Overview and Architecture" (Nov. 20, 1990).
"100 Mb/s data Transmission on UTP and STP Cabling for Demand Priority Networks" (by Hewlett Packard, HP Laboratories Bristol, HPL-94-88, Oct. 1994).
"Medium Attachment Unit and baseband medium specifications, type 10BASE5" (IEEE 802.3-1985 within IEEE Std 802.3, 2000 Edition).
"Medium attachment unit and baseband medium specifications, type 10BASE2" (IEEE 802.3a within IEEE 802.3 2000 Edition).
"Physical Coding Sublayer (PCS), Physical Medium Attachment (PMA) sublayer and baseband medium, type 100BASE-T4" (within IEEE 802.3u within IEEE Std 802.3, 1998 Edition).
"Physical signaling, medium attachment, and baseband medium specifications, type 1BASE5" (IEEE 802.3e-1987 within IEEE Std 802.3, 2000 Edition).
"ANSI/IEEE 802.4-1990"—"Information processing systems—Local area networks—Part 4: Token-passing bus access method and physical layer specifications" (1990).
"ANSI/IEEE Std 802.5-1985—ISO/DP 8802/5"—Local area Networks—ANSI/IEEE Standard ISO Draft Proposal—Token Ring Access Method (1985).
"ANSI/IEEE Std 802.5-1998E"—Information technology—Telecommunications and information exchange between systems—Local and metropolitan area networks—Specific requirements—Part 5: Token ring access method and Physical Layer specifications (1998).
"ITU-T I.430"—"Integrated Services Digital Network (ISDN)—ISDN User-Network Interfaces"—"Basic User-Network Interface—Layer 1 Specification" (Nov. 1995).
"Ansi X3.166-1990"—"For Information Technology"—Fibre Distributed Data Interface (FDDI)—Token Ring Twisted Pair Physical Layer Medium Dependent (TP-PMD) (1990).
"SynOptics Distributes LAN Management" (LAN Magazine, May 1991).
"10BaseT Takes Off" (LAN Magazine, May 1991).
"Tutankhamon Electronics, Inc. Presents: MagicNet" {Date Unknown}.
"MagicNet Installation Guide" (Jan. 1, 1991).
Tut Systems "Technical Overview" {Date Unknown}.
"E/O Networks aims to bring 'fiber to the farm'" (Electronic Engineering Times, Mar. 6, 1995).
"ATM: Ready for Lift-Off" (Information Week, Feb. 6, 1995).
"You Haven't Heard the Last of 'Dirty, Noisy' Copper" (America's Network, Jan. 16, 199?).
"Bear Sterns New Age Media II" (By Cliff Friedman) {Date Unknown}.
"$500 Per Seat ATM?" (Business Communications Review, Jan. 1995).
"Daisy-Chain Ethernet" (BYTE, Jan. 1995).
"Cards to Handle Fast ATM on Standard Wire" (Communications Week, Nov. 14, 1994).
"Prepare Ye the Way: Install Cable Now for Data Transmissions of Tomorrow" (Communications Week) {Date Unknown}.
"Fast ATM Comes to Copper" (Communications Week, Jan. 23, 1995).
"ATM to run over copper wire" (Computer World, Jan. 23, 1995).
"ATM takes to twisted-pair" (Electronic Engineering Times, Dec. 19, 1994).
"Data Net" (Electronic News, Jan. 23, 1993).
"Tut Transceivers Target Telcos, ATM" (Electronic News) {Date Unknown}.
"Broadband to Homes" (Interactive Age, Dec. 12, 1994).
"Tut Claims 155Mbps on Cat 3 Cable" (LAN Times, Jan. 9, 1995).
"UB signs up Tut for ATM on copper" (MacWeek, Jan. 30, 1995).
"Cheap transceivers vault Tut into ATM, rural I-way markets" (MacWeek, Dec. 12, 1994).
"UB, Tut, ODS prep high-speed LAN Gear" (Network World, Jan. 23, 1995).
"ComNet focuses on routing, ATM" (PC Week, Jan. 23, 1995).
"The Ethernet evolution" (The Network Report, Jan. 1992).
"Tut Systems Receives Byte Magazine's Award of Distinction" (Tut Systems, Jan. 3, 1994).
"Tut Systems Company Backgrounder" {Date Unknown}.
"Tut Systems Cuts the Cost of High-Speed Networking for Education Community" (May 24, 1994).
"Tut Systems Announces Localtalk-To-Ethernet Printer Solution for Silver Streak Product Family" (Tut System News, Nov. 2, 1994).
"Tut Systems Introduces Industry-Standard PCMCIA Ethernet Card for Portables" (Tut System News, Nov. 2, 1994).
"Tut Systems Announces parallel Port Ethernet Connector That Makes Networking a Snap for Mobile and Desktop Users" (Tut System, Nov. 2, 1994).
"Tut Systems Appoints New President to Expand Opportunities for Company's Technology" (Tut System News, Nov. 2, 1994).
"Tut Systems Announces Partnership With E/O Networks That Will Marry High-Speed Copper to Fiber Telephony Infrastructure" (Tut System, Dec. 12, 1994).
"UB Networks and Tut Systems Bring the First Implementation of ATM to Desktop At 155Mbps Over UTP/3" (Tut System, Jan. 23, 1995).
"Tut Systems Brings ATM to Desktops With Revolutionary Fast Copper Technology Converter and PMD Transceiver" (Tut System, Jul. 11, 1995).
"EIA Interim Standard Omnibus Specification—Local Area Network Twisted Pair Data Communications Cable—NQ-EIA/IS-43" (EIA, Sep. 1987).
Original Style Phone (6 Pictures) {Date Unknown}.
Second Style Phone (3 Pictures) {Date Unknown}.
Third Style Phone (1 Picture) {Date Unknown}.
IEEE—P802.9f, D7, 1997, DS5554—"P802.9f Draft Standard Local and Metropolitan Area Networks—Supplement to Integrated Services (IS) LAN Interface at the Medium Access Control (MAC) and Physical (PHY) Layers," (1997), 36 pages.
Ross, F., et al., "IsoEthernet: An Integrated Services LAN," (Aug. 1996), IEEE Communications Magazine, vol. 34, Issue 8, pp. 74-84.
Platt, R., "Why IsoEthernet Will Change the Voice and Video Worlds," (Apr. 1996), IEEE Communications Magazine, vol. 34, No. 4, pp. 55-59.
Platt, R., "New Standard Helps Multimedia Get Off the Ground," (Summer 1996), IEEE Multimedia, vol. 3, No. 2, pp. 78-82.
Evans, G., "The EIA Consumer Electronic Bus Twisted Pair Network," (May 1991), IEEE Transactions on Consumer Electronics, vol. 37, No. 2, pp. 101-107.
"Copper Cable with HDSL"—A Technology Brief from PairGain Technologies, Inc., (Date Unknown), 5 pages.
"Digital Subscriber Line Access Multiplexer (DSLAM)," by Freescale Semiconductor, (Dec. 2004), 4 pages.
"Digital Subscriber Line Access Multiplexer (DSLAM)," (Date Unknown), The International Engineering Consortium, 20 pages.
"DSLAM: Digital Subscriber Line Access Multiplexer," (Date Unknown), NetworkDictionary, 1 page.
"Digital Subscriber Line," (Jun. 1999), Cisco—Internet Technology Overview, Chapter 15, pp. 15-1-15-12.
"HDSL"—Introduction, (Date Unknown), Cisco, 1 page.
"HDSL Basics," (Oct. 1997), by TTC, 10 pages.

HiGain—User Manual—"H2TU-C-319 List 2E Line Unit," (Apr. 21, 2000), 152-319-125-02, Issue 2, 74 pages.
HiGain—HDSL2 Modules by ADC—Feb. 2003, 2 pages.
HiGain HMU-319-L81 Quick Installation Guide by ADC, (Sep. 29, 2006), 12 pages.
HiGain—Technical Practice—HXU-358 V1.04 Multiplexer Unit by ADC, (Apr. 6, 2001), 76 pages.
HiGain Wideband 3190 Integrated SONET/DS3 Multiplexer for HDSL/HDSL2/HDSL4—Spec Sheet—by ADC—Jun. 2007, 8 pages.
EtherPhone 220 Line Unit—Model EPH-220—PairGain—Revision History of This Practice—Rev. 1, (Nov. 1, 1997), 80 pages.
EtherPhone RT Network Interface Device—Model EtherPhone RT by PairGain Technologies, Inc.—Revision History of This Practice—Rev. 1, (Nov. 7, 1997), 24 pages.
EtherPhone RT Network Interface Device—Model EPH-RT by PairGain Technologies, Inc.—Revision History of This Practice—Rev. 1 (Feb. 7, 1997), 26 pages.
HiGain Doubler Unit—Model HDU-451 by PairGain Technologies, Inc. (1998), 46 pages.
PairGain Technologies HiGain Doubler Unit Model HDU-451, Issue 1, List 3B—Section 150-451-132-01—Rev. 2, (Nov. 13, 1997), 22 pages.
HiGain Line Unit—Model HLU-231 by PairGain Technologies, Inc., (1999), 78 pages.
HiGain—HLU-231, List 8E Line Unit—Quick Installation Guide by PairGain, 8 pages.
HiGain Line Unit—Quick Installation Guide—Model HLU-231 by PairGain Technologies, Inc.—350-231-165-01—Rev. 1, (Sep. 15, 1998), 28 pages.
HiGain Line Unit—Model HLU-319 by PairGain Technologies, Inc.—Rev. 1, (Dec. 22, 1997), 56 pages.
HiGain Line Unit—Quick Installation Guide—Model HLU-319 by PairGain Technologies, Inc.—350-319-153-01—Rev. 1, (Apr. 30, 1999), 20 pages.
HiGain Line Unit—Quick Installation Guide—Model HLU-819 by PairGain Technologies, Inc.—350-819-200-01—Rev. 1, (Nov. 12, 1999), 42 pages.
HiGain Remote Unit—Model HRU-412 by PairGain Technologies, Inc.—150-412-181-01, (Mar. 31, 1998), 42 pages.
HiGain Remote Unit—Model HRU-412 by PairGain Technologies, Inc.—150-412-107-03, (Nov. 19, 1999), 38 pages.
PairGain Technologies HiGain-2 Remote Unit, Model HRU-612 by PairGain—Section 150-612-100—Rev. 02, (Aug. 21, 1996), 19 pages.
PairGain Technologies HiGain-2 Remote Unit, Model HRU-612 by PairGain Technologies, Inc.—Section 150-612-102—Rev. 03, (Jan. 30, 1996), 19 pages.
AccessHub Line Unit—Model MMH-220 by PairGain Technologies, Inc.—Rev. 01, (Jul. 30, 1997), 20 pages.
"PairGain Extends HDLS2 Product Leadership, Announces HDSL2 Product Availability; HiGain Solitaire: Truly Interoperable HDSL2 Solutions for t1 Access," by PairGain Technologies, Inc., (1999), Business Wire, 3 pages.
SonePlex Wideband System 3190—Installation and Verification Guide by ADC—Section 800-357-104-01—Rev. 1, (Sep. 2000), 112 pages.
Cisco for All—"What is DSL and its Different Flavors?" (Date Unknown), 3 pages.
Wireline Service Delivery Products, First Edition, ADC, (Sep. 2004), 18 pages.
Vox Technologies—ADTRAN D448N ISDN CU—1430020L1—D448 ISDN CU (Date Unknown), 1 page.
Adtran—Model ADTRAN D448 U-BR1TE II ISDN 2B1Q Interface for ALCATEL D448 Channel Banks Installation/Maintenance—Section 61430020I2-5—Issue 1, (Jul. 1997), 7 pages.
EEE Std 802.9-1994—IEEE Standards for Local and Metropolitan Area Networks: Integrated Services (IS) LAN Interface at the Medium Access Control (MAC) and Physical (PHY) Layers, 436 pages.
"Merlin 206, 410, 820 & Plus—Classic Mail Design Package 1.6—Site Survey," (Date Unknown), 21 pages.
"Merlin 206, 410, 820 & Plus—Classic Mail Design Package—Site Survey," (Date Unknown), 22 pages.
Lucent Technologies, "Merlin® Plus Communications System," Release 2, Customization Chart, 999-503-148, Issue 3, Nov. 1989, 6 pages.
Avaya Communication, "Intuity Messaging Solutions Release 5 Integration with Merlin Legend® and Merlin Magix™ Communications Systems," Jan. 2001, 585-310-748, Issue 2, Chapter 4, pp. 4-1-4-29.
AT&T, "Merlin® Plus Communications System—Training Manual," Dec. 1986, 999505-144, Issue 1, 80 pages.
"AT&T Merlin" (Wikipedia—Web Document), 3 pages.
"AT&T Merlin Phones," (Web Document), 3 pages.
AT&T, "Merlin® Plus Communications System—System Planner," Sep. 1988, 999-501-141, Issue 1, 18 pages.
AT&T, "Merlin® Plus Communications System—Release 1—Customization Chart," Nov. 1988, 999-503-146, Issue 1, 6 pages.
Lucent Technologies, "Merlin® Plus Communications System CF/RLA Card," 1989, 999-502-148, Issue 3, 2 pages.
Avaya, "Merlin Magix® Integrated System—Installation Release 3.0 and Earlier," 555-730-140, Issue 1, May 2003, 329 pages.
Lucent Technologies, "Merlin® Plus Communications System—Release 2—System Manual," 999-507-148, Issue 3, Aug. 1990, 337 pages.

* cited by examiner

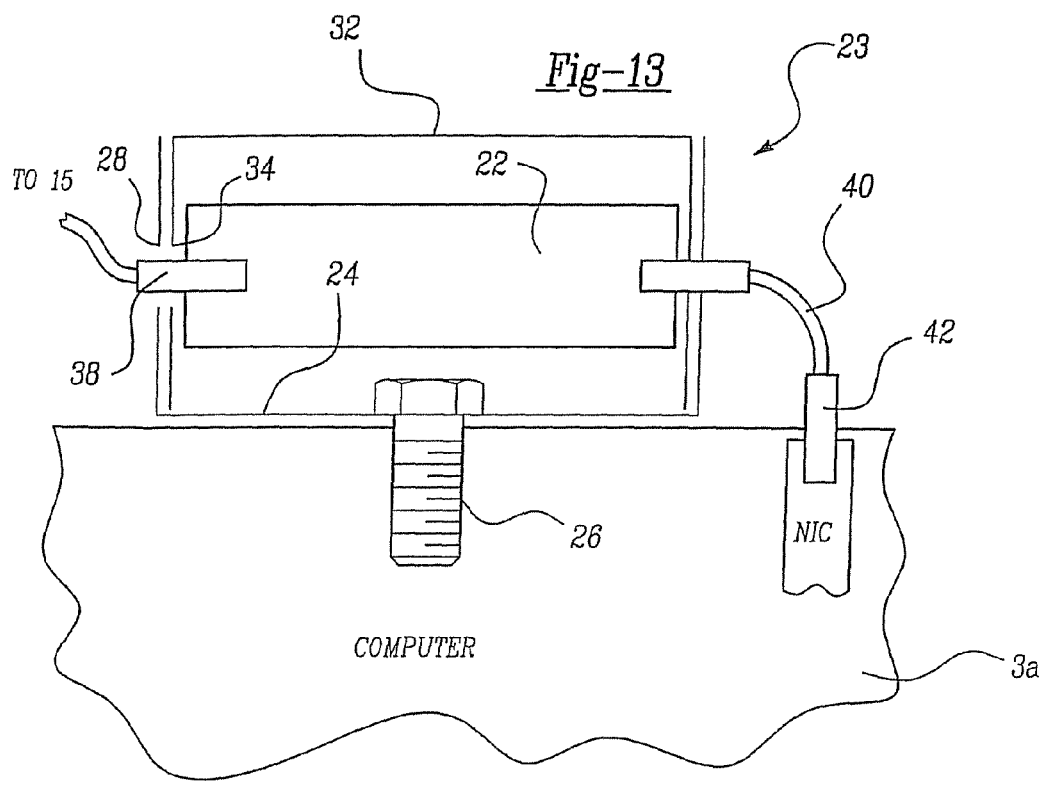
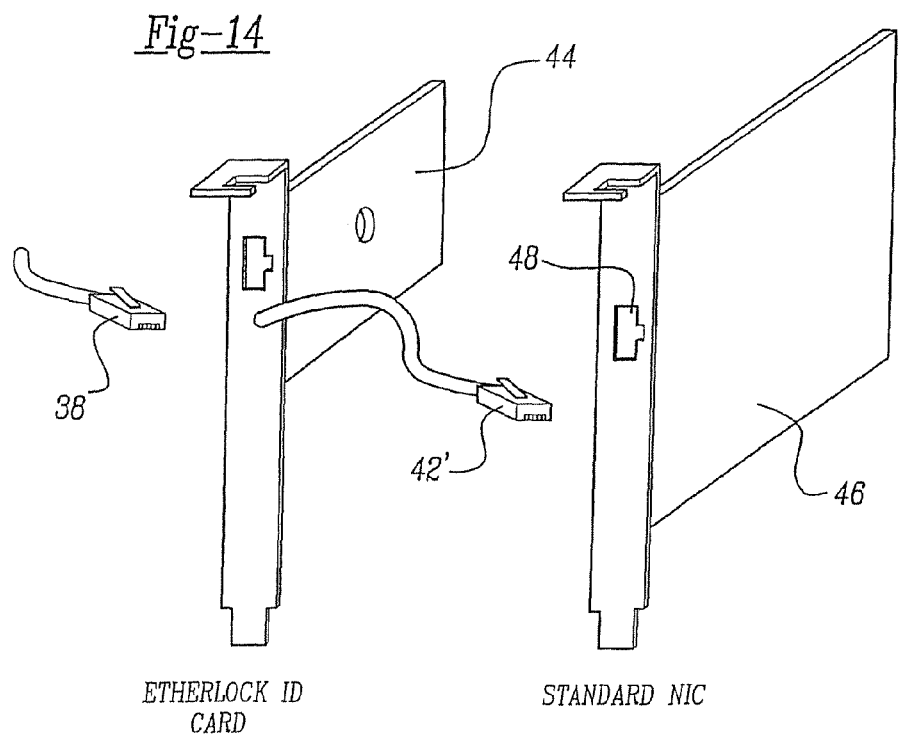

SYSTEM AND METHOD FOR ADAPTING A PIECE OF TERMINAL EQUIPMENT

CROSS REFERENCE TO RELATED APPLICATIONS

This application is a continuation application of U.S. Ser. No. 10/668,708 filed Sep. 23, 2003, now U.S. Pat. No. 7,457,250, issued Nov. 25, 2008, which is a continuation of U.S. patent application Ser. No. 09/370,430 filed Aug. 9, 1999, now U.S. Pat. No. 6,650,622 issued Nov. 18, 2003, which is a continuation-in-part under 35 U.S.C. §111 and §120 of international application PCT/US99/07846, filed Apr. 8, 1999, designating, inter alia, the United States, and which claims the benefit of U.S. provisional application No. 60/081,279 filed Apr. 10, 1998. The entire content of each of the above mentioned applications and patents are incorporated herein by reference.

BACKGROUND OF THE INVENTION

1. Technical Field

This invention relates generally to computer networks and, more particularly, to a network management and security system for managing, tracking, and identifying remotely located electronic equipment on a network.

2. Discussion

Over the last several years, one of the largest problems in managing the computerized office environment has been identified as controlling the Total Cost of Ownership, or TCO, of the office computer. Controlling TCO includes not only the cost of the asset but also all costs associated with that asset, such as support costs, software costs, and costs due to loss or theft, including hardware, software, and most importantly, information.

An aspect of the support costs of TCO is asset movement. Today, many employees have more than one computer. When that employee is moved to another location, the assets must be moved as well. A typical organization can have as much as 40% of its employees move from one location to another over the course of a year. When these movements occur daily, tracking each asset over time is nearly impossible. There is also the unauthorized movement of assets, such as moving an asset from an employee's office to his or her associated lab area. In addition to these physical movements, the asset may also be changed over time through hardware and software modifications. Even if an asset is successfully tracked over a period of time, the asset may not be the same at the end of the period. Due to this constant asset relocation and reorganization, an organization may not always know where all of its assets are located. In fact, it is very likely that a company may not even know how many assets they own or if those assets are still in their possession. Additionally, an organization that desires to send a message to all of the assets within a particular physical area is limited to relying on databases that correlate the network identification of an asset to where that asset should be located, not where the asset actually is located. Previous attempts to provide asset tracking and management have relied on software solutions that have proven to be fundamentally flawed. Asset tracking and management software is limited in a number of important areas. It is generally incapable of detecting the electrical connection status of equipment, it cannot detect the physical location of equipment, the identifying name of equipment is not permanent, and the monitored assets must be powered-up.

Therefore, a method for permanently identifying an asset by attaching an external or internal device to the asset and communicating with that device using existing network wiring or cabling is desirable. Also, it is desirable to communicate with an asset based upon the physical location of the asset. Additionally, a method of determining when an asset is being removed or added to the network is desirable. It would also be desirable to communicate with the device without requiring the device or the asset to be connected to alternating current (AC) power. Such a device would allow a company to track its assets, locate any given asset, and count the total number of identified assets at any given time, thus significantly reducing its TCO of identified assets.

One method that attempted to control the hardware theft aspect of TCO is disclosed in U.S. Pat. No. 5,406,260 issued to Cummings et. al, (hereby incorporated by reference) which discusses a means of detecting the unauthorized removal of a networked device by injecting a low current power signal into each existing communications link. A sensor monitors the returning current flow and can thereby detect a removal of the equipment. This method provides a means to monitor the connection status of any networked electronic device thus providing an effective theft detection/deterrent system.

It would, however, be desirable to provide a further means in which a networked device may also be identified by a unique identification number using the existing network wiring or cabling as a means of communicating this information back to a central location. More particularly, it is desirable to provide a means for identification that feasibly employs the same cable (and, if desired, the same wires in the cable) that normally carries high frequency data communications in an existing network. In addition, it is desirable to provide an identification system that is easily and inexpensively implemented in an existing network system.

The theft of information is a further aspect of TCO. Today, the most important resources a company has are its employees and the information that they create and accumulate. Information that is available on a company's internal network can range from personnel files and corporate business plans to research and development efforts related to new products. Restricting access to sensitive or confidential information such as personnel files is a high priority for all companies. The use of passwords and limiting access to certain types of information to particular computer stations are typical methods that companies employ to protect information. These passive methods of protecting company information are sufficient to prevent technically unknowledgeable people from gaining access to protected information. However, these methods are usually unable to protect information from a technically knowledgeable person with specialized electronic equipment. The existence of an unauthorized device connected to the company network may indicate the presence of someone with electronic equipment that has the capability to defeat a company's internal security measures. A method of blocking communications with such a device connected to a network is desirable. Further, automatically blocking communications with an unauthorized device is desirable. An active system that interrogates the devices connected to a network and blocks communications with unauthorized devices would provide enhanced security for sensitive information.

A further aspect of support costs is the cost associated with utilization of network bandwidth. Today, the bandwidth of most networks is being constantly increased to meet the increasing need to transmit large quantities of data. In order to provide the required bandwidth costly hardware upgrades must be purchased resulting in an increase in the TCO. To reduce the need for hardware upgrades the use of available network bandwidth is dedicated to data that is required for the operation of application programs. Using valuable network bandwidth to provide a means of identifying assets would either limit the availability of bandwidth for application programs or require the purchase of new hardware. Additionally, using network bandwidth for asset identification would limit the identification system to operating only when the asset has AC power applied. Assemblies within the asset would have to be operational in order to transmit data over the network. Requiring power to be applied to every monitored asset would limit the capability to identify all the assets connected to a network at any particular time. Therefore, it is desirable to provide a means for asset identification that does not use existing network bandwidth. Such a device would more fully utilize existing network resources without increasing the TCO associated with network bandwidth.

SUMMARY OF THE INVENTION

In accordance with the teachings of the present invention, a communication system is provided for generating and monitoring data over a pre-existing wiring or cables that connect pieces of networked computer equipment to a network. The system includes a communication device or remote module attached to the electronic equipment that transmits information to a central module by impressing a low frequency signal on the wires of the cable. A receiver in the central module monitors the low frequency data to determine the transmitted information from the electronic equipment. The communication device may also be powered by a low current power signal from the central module. The power signal to the communication device may also be fluctuated to provide useful information, such as status information, to the communication device. Relocation of the electronic equipment with the attached communication device to another location on the network is detected immediately and may be used to update a database. This invention is particularly adapted to be used with an existing Ethernet communications link or equivalents thereof.

BRIEF DESCRIPTION OF THE DRAWINGS

Other objects and advantages of the present invention will become apparent to those skilled in the art upon reading the following detailed description and upon reference to the drawings in which:

FIG. 13 is a cross-sectional view of the hardware shown mounted to a computer;

FIG. 14 is a perspective view of an alternative embodiment of the hardware for the remote module;

DETAILED DESCRIPTION OF THE PREFERRED EMBODIMENT

Figure 1:
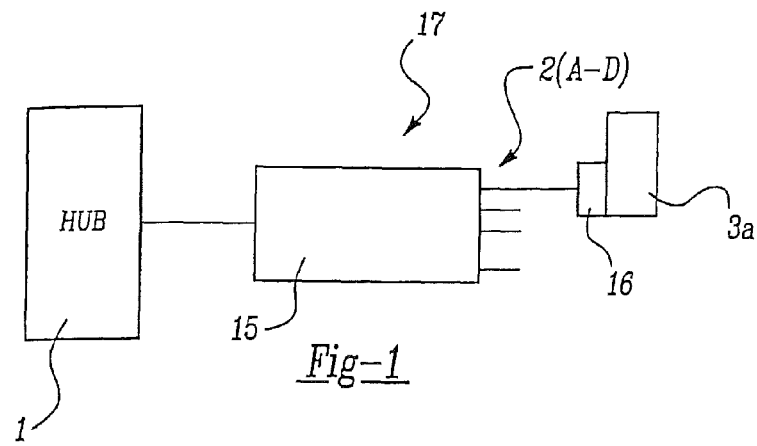
FIG. 1 is a general block diagram that illustrates a network that includes a communication system in accordance with a first embodiment of the present invention.
Figure 2:
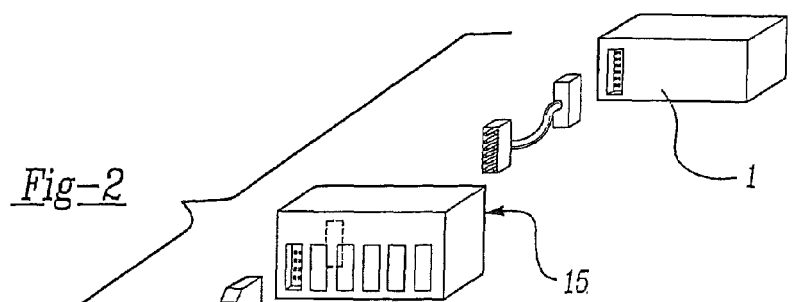
FIG. 2 is an exploded perspective view that illustrates installation of the central module into an existing computer network in accordance with the first embodiment of the present invention.
Figure 3:
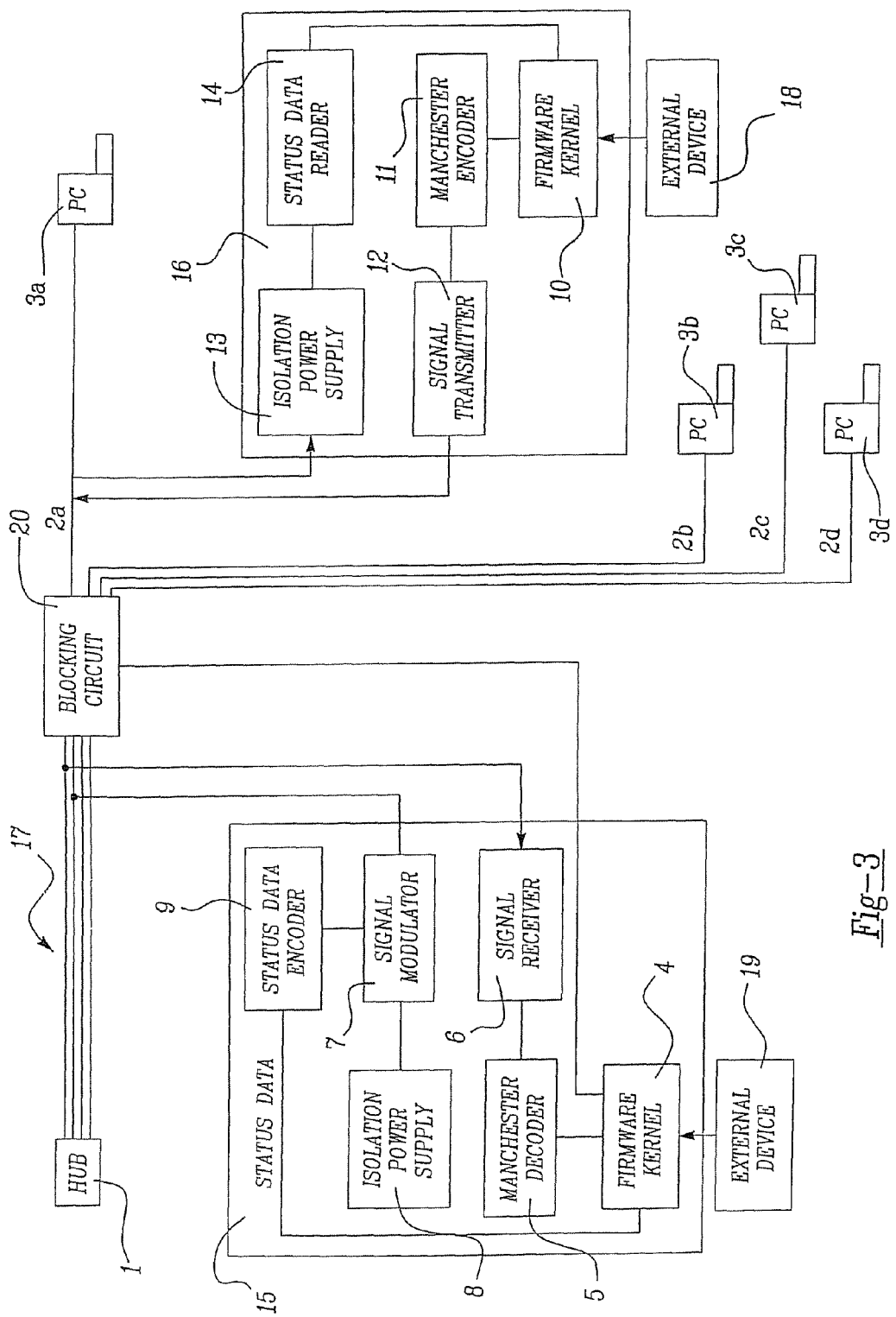
FIG. 3 is a block diagram that illustrates the first embodiment of the present invention.

Four embodiments of the invention are illustrated within this specification. The first embodiment illustrates the general teachings of the invention, whereas the second, third, and fourth embodiments depict specific implementations of the teachings. Turning now to FIGS. 1, 2 and 3, a first embodiment of a central module 15 and remote module 16 system is provided therein for achieving identification of electronic computer equipment associated with a computer network 17. Although, the first embodiment depicts merely communicating equipment identification information, the principles of the invention may be readily extended to include the communication of more general information such as identification of the equipment processor type and the equipment hard drive capacity. In general, the central module 15 monitors remote module circuitry 16 that may be permanently attached to remotely located electronic workstations such as personal computers 3A through 3D over the computer network 17. The communication system 15 and 16 described herein is particularly adapted to be easily implemented in conjunction with an existing computer network 17 while realizing minimal interference to the computer network. In addition to being implemented from the hub of a network to remotely located PCs, the invention can be applied to other elements of an office environment such as telephones, fax machines, robots, and printers. The invention is particularly suitable for being incorporated into a patchpanel. The asset aware patchpanel would then be capable of identifying the existence and location of network assets without power being applied to the assets.

Remotely located personal computers 3A through 3D are each connected to the computer network 17 so as to provide widespread remote user access to the computer network 17. The remotely located personal computers 3A through 3D are shown connected to hub 1 via data communication links 2A through 2D. Data communication links 2A through 2D are, for example, conventional multi-wire cables that include a plurality of transmit and receive data communication links (sometimes referred to herein as wires or lines) for communicating information between each of remotely located computers 3A through 3D and other communication devices on the network such as other computers and file servers (not shown).

The invention described herein is particularly suited to be implemented in conjunction with a computer network 17 which preferably employs a conventional wiring approach of the type which may include twisted pair wiring such as Ethernet, Token Ring, or ATM. Wiring schemes similar to Ethernet are commonly employed to provide data communication links for electronic computer equipment. In accordance with conventional wiring or cabling approaches, data communication links 2A-2D generally include a pair of transmit wires (not shown) as well as a pair of receive wires (not shown) connected to each of personal computers 3A through 3D. The cable may include other wires, as well. Each pair of transmit and receive wires are internally coupled to an associated personal computer via two windings of an internally located isolation transformer (not shown). Each pair of transmit wires and each pair of receive wires thereby form a current loop through one of the personal computers 3A through 3D which is advantageously employed in accordance with the approach described herein.

The central module 15 includes an isolation power supply 8 (see FIG. 3) which supplies a continuous direct current (DC) power supply to each of current loops 2A through 2D. The DC power supply has a low current preferably on the order of magnitude of about 1 mA. The isolation power supply 8 includes an input terminal for receiving a low voltage signal $V_{LV}$ which has a magnitude of approximately fifteen (15) volts. The present embodiment of the invention sources DC current from the 15 volt source to the remote modules 16. However, it is within the scope of the invention to provide other voltage levels such as 3V dc, and 20V dc. Although the present embodiment sources current for the immediate power needs of the remote module, it is also within the scope of the invention to supply current to charge a battery, capacitor bank, or other energy storage device that powers the remote module. Additionally, powering the remote module from some other source such as a primary battery, rechargeable battery or capacitor bank that receives energy from a source other than the central module is within the scope of the invention.

The power generated by isolation power supply 8 is passed through signal modulator 7 which can slightly alter the voltage supplied by isolation power supply 8 based upon status data provided by the status data encoder 9. Status data encoder 9 receives its status data from the firmware kernel 4. Signal modulator 7 inserts this low power supply across the transmit and receive lines or into either the transmit lines or the receive lines in order to supply the remote module 16 with both status information and power. The scope of the invention includes transmitting status information as a single bit or as a pulse train. Types of transmitted status information include whether the protection circuit is active, date, time, and port location. It is also within the scope of the invention to encode the status data using methods such as single bit on/off, Manchester, 4B/5B, and Frequency Shift Keying (FSK).

Isolation power supply 13 draws power for the remote module 16 and provides status information that was encoded into the power supply signal by signal modulator 7 within the central module 15. This status information is in turn passed over to the firmware kernel 10 of the remote module 16 by way of the status data reader 14.

Firmware kernel 10 provides a preprogrammed unique identification number to Manchester encoder 11 in order to reliably traverse the data communication link or cable 2A. The Manchester encoder then passes this encoded number to signal transmitter 12 which sends the encoded number across the data communication link 2A by altering the total current draw of the remote module 16. Although the present embodiment of the invention uses Manchester encoding, the principles of the invention may be readily extended to other encoding techniques such as Frequency Shift Keying, 4B/5B, PAM5×5, 8B/6T, Polar NRZ, and Bipolar. Additionally, waveshaping the encoded signal with techniques such as MLT-3 is within the scope of the invention. In addition to transmitting an identification number the firmware kernel 10 may also elect to send additional information such as confirmation of the status information or additional data provided by an external device 18, such as the computer 3A to which the remote module 16 is attached.

The information sent from the remote module 16 is received by the signal receiver 6 within the central module 15, decoded by Manchester decoder 5, and passed on to the firmware kernel 4. The firmware kernel may now pass this received information on to an external device 19, such as a computer responsible for asset tracking.

Figure 9:
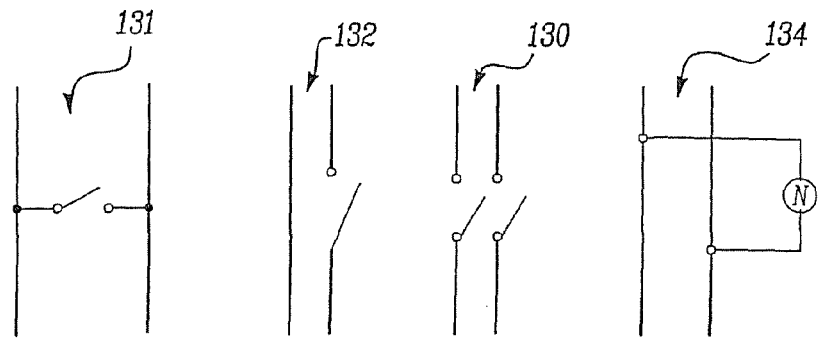
FIG. 9 is a diagram that illustrates alternate circuits for blocking communications in accordance with an embodiment of the present invention.

Kernel 4 may optionally provide a blocking signal to blocking circuit 20 to deny, to an unauthorized computer, access to the network information via hub 1. For example, if someone uses a laptop to attempt to plug into the network, the central module 15 detects the absence of the proper identification code from the laptop and, as noted before, kernel 4 would issue a suitable signal to blocking circuit 20 to prevent access to the network information and also generate an alarm. Furthermore, if the potential thief later disconnects protected equipment from the network, this action is also detected and an alarm can be generated. Although the present embodiment illustrates the blocking function as shorting the data lines together 131 (see FIG. 9), it is within the scope of the invention to implement blocking by other means, such as opening both lines of the transmit or receive data lines 130, opening one of the data lines 132, and transmitting noise onto the data lines 134.

Figure 4:
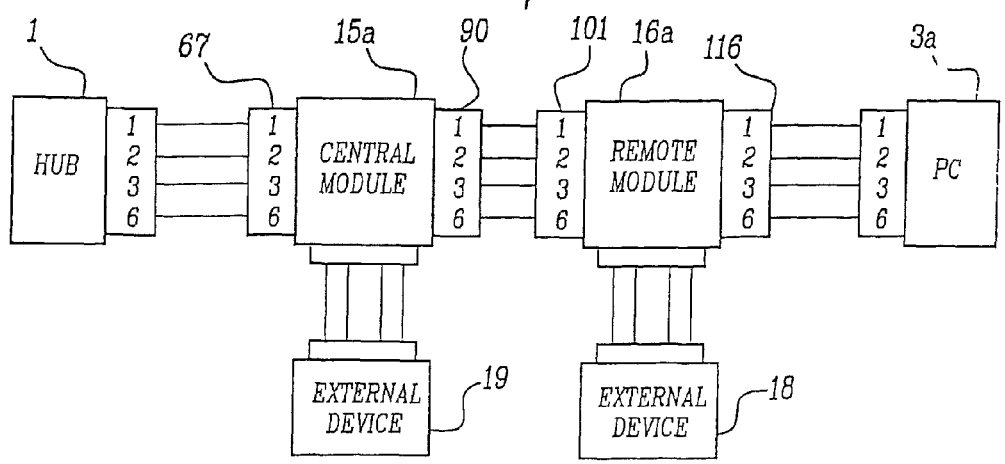
FIG. 4 is an interconnection diagram that illustrates a second embodiment of the present invention.

FIGS. 4-8 illustrate a second embodiment of the invention which generally differs from the first embodiment by having circuitry that transmits a modulated signal directly to central module 15a from remote module 16a. In the first embodiment current sourced from central module 15 to remote module 16 is modulated within remote module 16 and then returned to central module 15. In addition, the second embodiment does not have a status data reader 14 in remote module 16a, but does additionally include test voltage source 64 and test voltage monitor 66 and 84 pairs in the central module 15a. Referring to FIG. 4 a network 17a that includes the communication system is shown. Hub 1 connects to central module 15a, which connects to remote module 16a, which connects to PC 3A. Also connected to central module 15a and remote module 16 are external devices 19 and 18. Although the central module 15a and remote module 16a are each shown connected to a single external device it is within the scope of the invention to connect multiple external devices to the modules 15a and 16a. Some of the external devices that are envisioned include motion detectors and glass breakage detectors.

Figure 5:
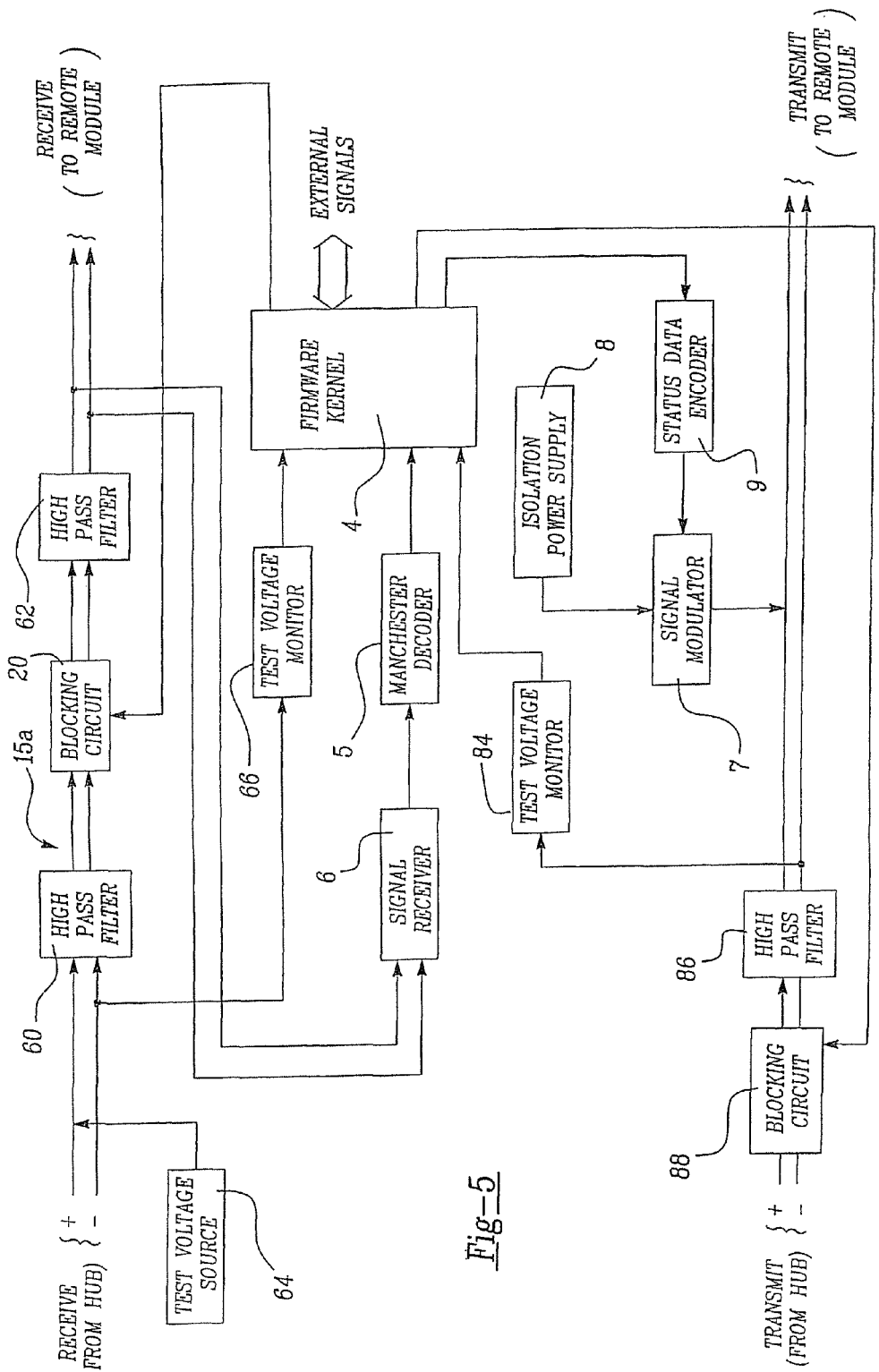
FIG. 5 is a block diagram that illustrates a central module made in accordance with the teachings of the present invention.
Figure 6:
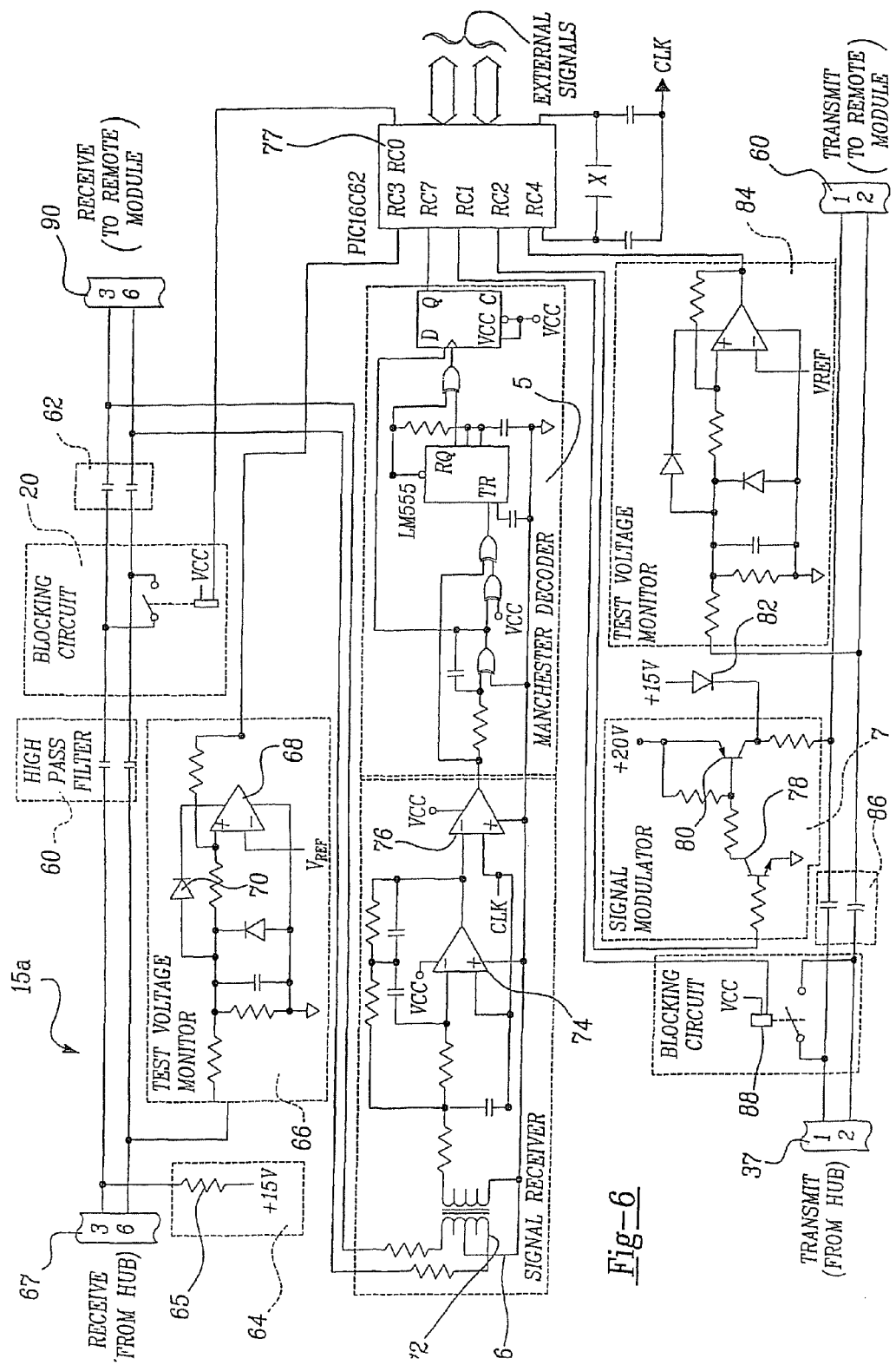
FIG. 6 is a detailed schematic diagram of the central module in accordance with the second embodiment of the present invention.

Referring to FIGS. 5 and 6, the central module 15a is depicted. A receive pair of conductors from the hub 1 pass through connector 67 (FIG. 6) and connect to blocking circuit 20, test voltage source 64, and test voltage monitor 66. A +15 volt source with series resistor 65 comprises test voltage source 64. A comparator 68 with a resistor divider circuit comprises the test voltage monitor 66. Diode 70 connects from the divider circuit to the power input of comparator 68 to suppress voltage transients at the input to comparator 68. A low power TLC2274ACD is employed for comparator 68 of the present embodiment. The test voltage source 64 and test voltage monitor 66 pair monitor the receive conductors to ensure the hub 1 is connected to central module 15. Blocking circuit 20 includes high pass filter 60, relay 61, and high pass filter 62 which connects to a receive pair of conductors from the remote module 16. High pass filter 62 also connects internally to signal receiver 6. High pass filters 60 and 62 block DC current flow and isolate the relay 61 from driver circuits of hub 1 and PC 3A to enable the central module 15a to continue to monitor the conductors from the remote module 16a. Signal receiver 6 comprises an isolation transformer 72, low pass active filter 74, and comparator 76. The output of comparator 76 is decoded by Manchester decoder 5 and then sent to firmware kernel 4. A processor 77 is employed to implement the kernel 4 and status data encoder 9 functions. The processor 77 in the illustrated embodiment is a Microchip PIC16C62. Internal to the processor 77 data received from internal and external signals is encoded and then outputted to signal modulator 7 which comprises NPN transistor 78 and PNP transistor 80 arranged in a level shifter configuration. The output of signal modulator 7 is diode OR'd with the output of isolation power supply 8 and then connects to one of the transmit data lines that connect to remote module 16. The return path for current from PC 3A is the pair of receive data lines. Test voltage monitor 84 operates in a manner similar to test voltage monitor 66 to ensure PC 3A is physically attached to the network 17. Firmware kernel 4 controls the operation of blocking circuit 88 which is connected across the transmit data lines that connect to hub 1. High pass filter 86 blocks DC current from flowing to hub 1 from signal modulator 7 and additionally provides isolation between blocking circuit 88 and the drivers of PC 3A. Connector 90 provides the interface for signals from central module 15a to the cable that interfaces with remote module 16a.

Figure 7:
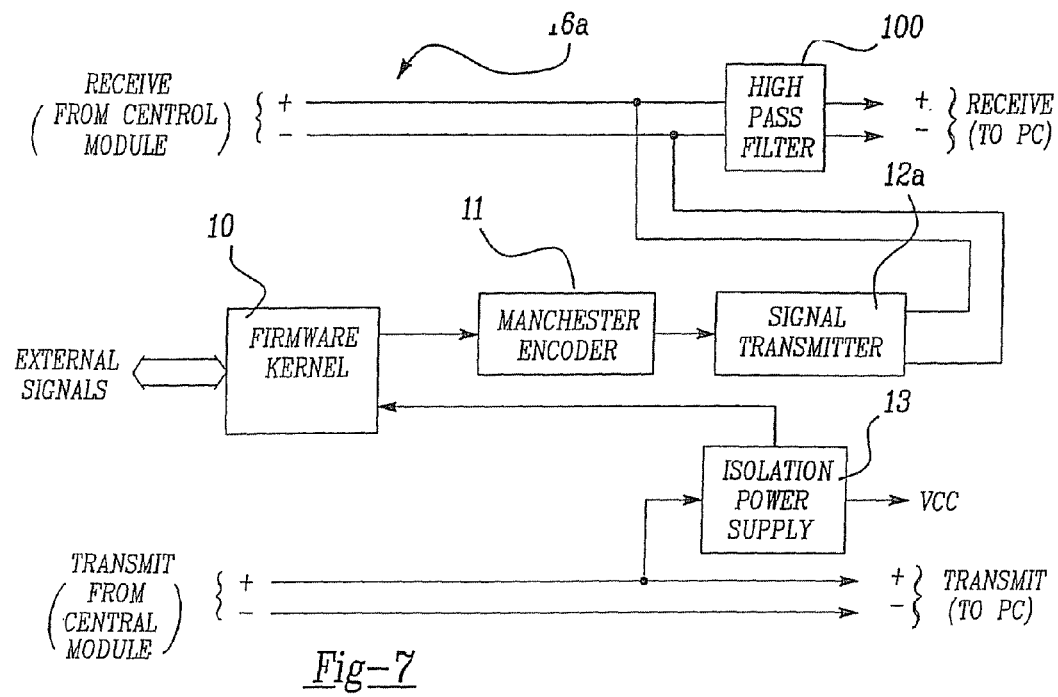
FIG. 7 is a block diagram that illustrates a remote module made in accordance with the teachings of the present invention.
Figure 8:
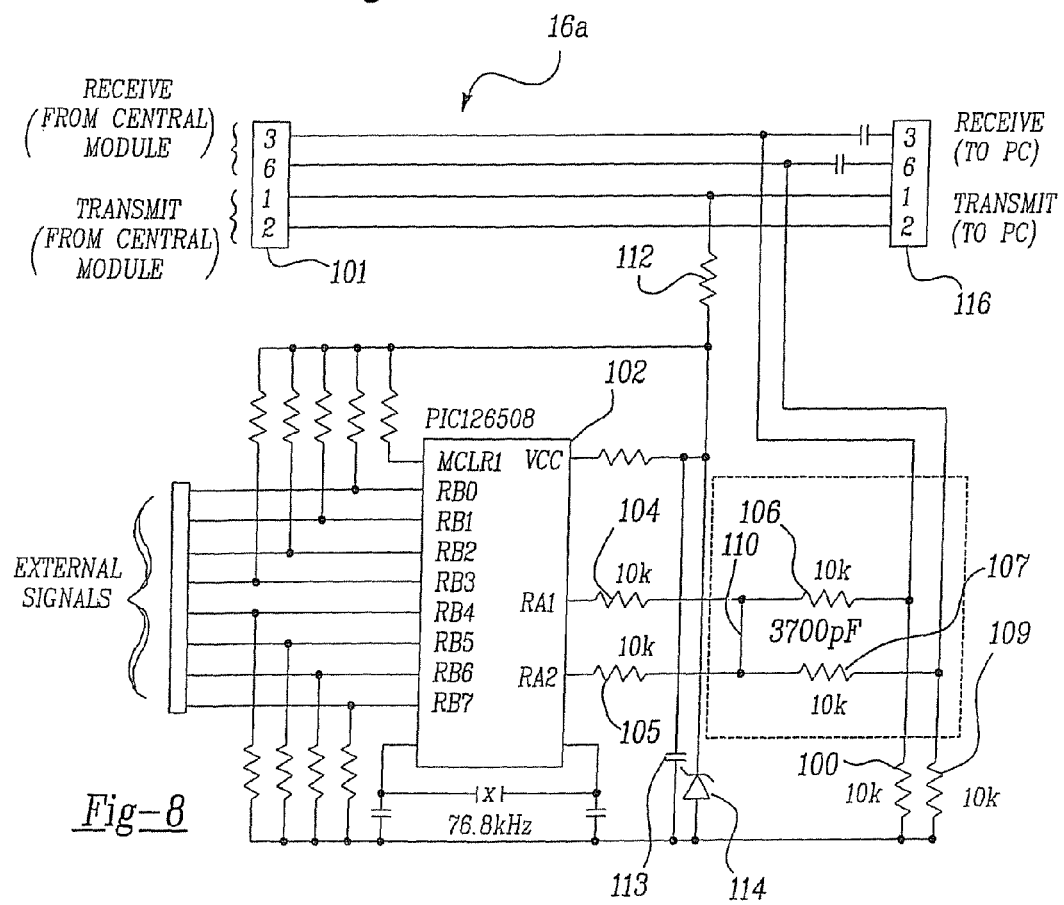
FIG. 8 is a detailed schematic diagram that illustrates a central module in accordance with the second embodiment of the present invention.

Referring to FIGS. 7 and 8, the remote module 16a of the second embodiment is illustrated. The receive data lines from central module 15a pass through connector 101 (FIG. 8) and connect to high pass filter 100 and signal transmitter 12. High pass filter 100 blocks the DC current that flows from central module 15a from flowing into the input circuit of PC 3A. Signal transmitter 12a, which comprises resistors 104 through 109 and bypass capacitor 110, impresses across the receive data lines a variable current source that is controlled by firmware kernel 10. Connected to a transmit line is isolation power supply 13 which receives power from central module 15a. The isolation power supply 13 comprises resistor 112, filter capacitor 113, and zener diode 114. The regulated voltage developed across zener diode 114 provides power for firmware kernel 10 as well as a number of pull-up resistors. Although a Microchip PIC12C508 processor is employed for firmware kernel 10 in the illustrated embodiment, there are numerous other devices from manufacturers such as SGS Thompson and Burr-Brown that may be employed. The outputs from remote module 16a pass through connector 116 which connects to PC 3A.

Referring to FIGS. 4 and 5, the operation of the second embodiment will be described. The existence of a connection between hub 1 and central module 15a is monitored by test voltage source 64 and test voltage monitor 66 through a pair of receive data lines. Current from test voltage source 64 flows through a data line to an isolation transformer within hub 1. The current flows through the primary winding of the isolation transformer and returns on the other receive data line to the test voltage monitor 66. An interruption in the flow of current is detected by the test voltage monitor 66. A detailed description of the operation of test voltage source 64 and test voltage monitor 66 is provided in U.S. Pat. No. 5,406,206 which is hereby incorporated by reference. Similarly, current sourced onto a transmit line from signal modulator 7 and isolation power supply 8 through remote module 16a to the isolation transformer of PC 3A which returns on the other transmit line is monitored by test voltage monitor 84 to verify that both remote module 16a and PC 3A are connected to central module 15a. Signal modulator 7 additionally supplies power to remote module 16a. A signal from firmware kernel 4 controls NPN transistor 78 which likewise controls level-shifting PNP transistor 80. When PNP transistor 80 is ON, 20 volts is sourced onto the transmit line. When transistor 80 is OFF, 15 volts is sourced onto the transmit line. Referring to FIG. 8, the sourced power from central module 15a flows through resistor 112 and into zener diode 114 and capacitor 113 which provide a regulated voltage to the circuit. In this embodiment the status data transmitted from the central module 15a is not decoded. However, it is within the scope of the invention to receive the encoded data by monitoring various signals, such as the voltage amplitude of the data line relative to ground, the voltage across resistor 112, and the current through resistor 112.

In response to external signals as well as internally programmed routines, the firmware kernel 10 outputs a signal to Manchester encoder 11. A processor 102 incorporates both the kernel 10 and Manchester encoder 11 functions. In the illustrated embodiment a Motorola PIC12C508 is employed as processor 102. The output of the processor 102 is a Manchester encoded signal that drives the balanced resistor network that comprises signal transmitter 12a. A capacitor 110 and resistors 106 and 107 can be added to signal transmitter 12a to provide increased filtering of high frequency components. However, the embodiment does not require their addition as firmware control and line capacitance provide sufficient attenuation to prevent the encoded signal from interfering with normal network communications. The encoded signal flows through resistors 104 and 105 onto the receive data lines to central module 16. High pass filter 100 prevents the encoded signal from being conducted through the receive data lines to PC 3A. Although the encoded signal in the present embodiment transmits the encoded signal from the remote module 16a, it is within the scope of the invention to source current from the central module and alter the flow of current from within the remote module 16a by changing the impedance of a circuit connected across the data communication link 2A. Examples of such circuits include an RC network connected directly to the data link 2A and reflecting an impedance change across an isolation transformer.

Referring again to FIG. 6, the encoded signal is received in the central module 15a by signal receiver 6. Within central module 15a, high pass filter 62 prevents the encoded signal from being conducted through the data lines to hub 1. The signal couples through transformer 72 to low pass active filter 74 which filters out normal network communications signals. The filtered signal is squared-up by comparator 76 and outputted to Manchester decoder 5. The decoded signal is inputted to firmware kernel 4 which evaluates the information. If the signal represents the port ID or wall jack location, the kernel 4 outputs a signal to external device 19. If the signal provides identification of remote module 16, the kernel 4 compares the received identification with the expected identification. If an invalid identification is received, the firmware kernel 4 sends signals to blocking circuits 20 and 88 commanding them to short the receive data lines together and the transmit data lines together. The kernel 4 additionally sends an alarm notifying external device 19 that an invalid identification has been received. Although the embodiment passes a single signal through the decoder circuit, it is within the scope of the invention to feed encoded signals from multiple sources through a multiplexer into a single decoder circuit, or to implement the decode function in firmware or software, or to multiplex the outputs of multiple decoder circuits. It is also within the scope of the invention to couple the signal from the receiver data lines through an isolating device into a microprocessor wherein the low pass filtering and decoding functions are implemented. Envisioned isolating devices include devices such as transformers, opto-isolators, and balanced operational amplifier circuits. Additionally, it is within the scope of the invention to integrate all the functions of the remote module into a processor that interfaces either directly to the data lines or through an isolating device.

Figure 10:
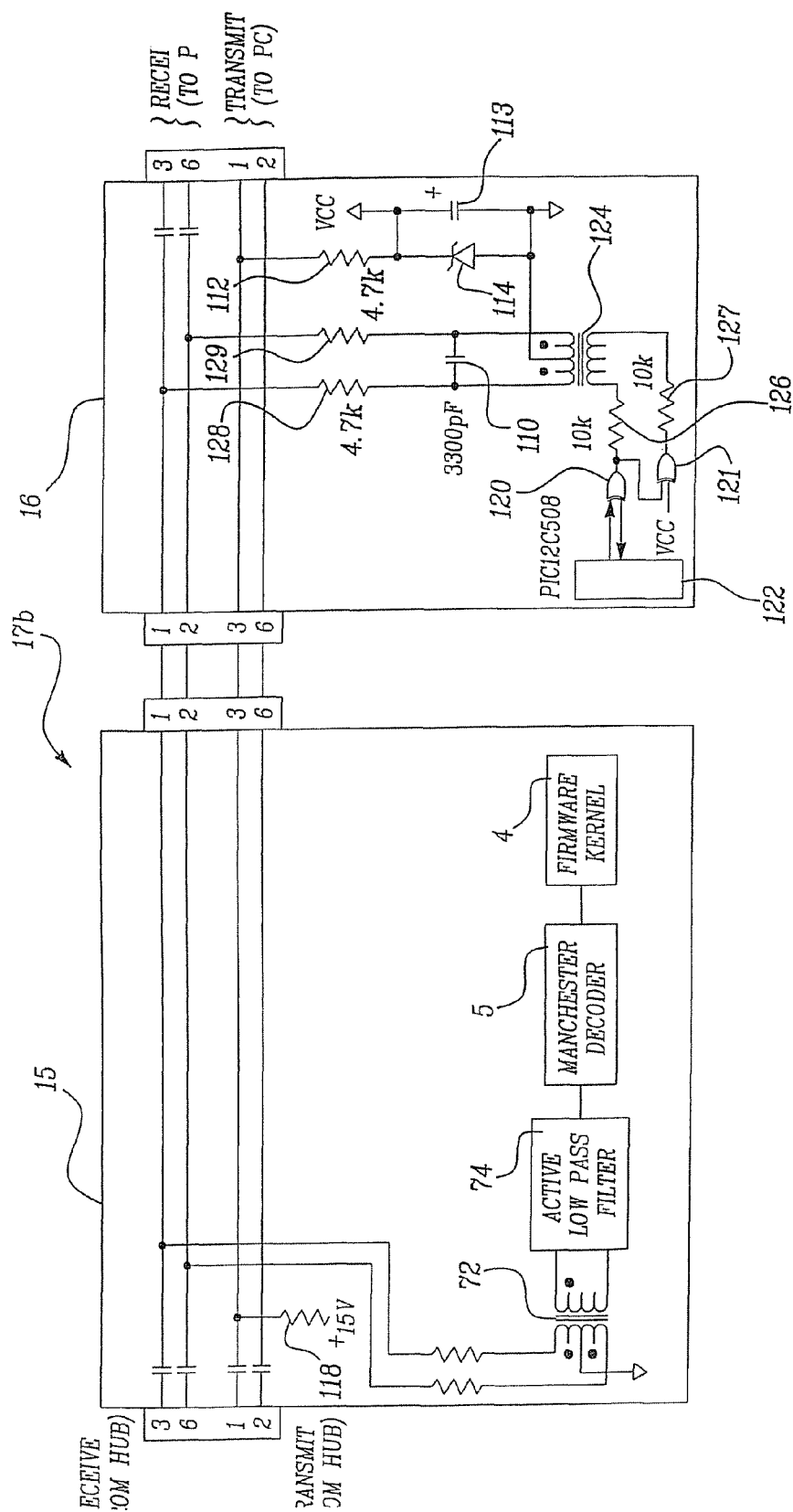
FIG. 10 is a detailed schematic diagram which illustrates a remote module and a central receiver module coupled to a network in accordance with the third embodiment of the present invention.

A third embodiment of the invention is illustrated in FIG. 10 which generally differs from the earlier described embodiments by illustrating in detail a circuit as described in the first embodiment wherein current that is sourced through a current loop extending from central module 15b to remote module 16b is modulated in remote module 16b and then decoded in central module 15b. The embodiment comprises a central module 15b and remote module 16b that are connected within an existing network 17b. The central module 15b comprises a test voltage source 117 and a receiver circuit 119. The test voltage source 117 includes a +15 volt source with series resistor 118 for sourcing current onto a transmit data line. The receiver circuit 119 comprises a signal receiver 6, a Manchester decoder 5, and firmware kernel 4b, for receiving and decoding the return current from the receive data lines.

Remote module 16b includes an isolation power supply 13 that regulates and filters power that is received from central module 15b over a pre-existing cable. The isolation power supply 13 supplies regulated power to a processor 122 and circuitry that comprises the signal transmitter 12b. The processor 122 employed in the illustrated embodiment is a Microchip PIC12C508. The processor 122 and exclusive OR gates 120 and 121 implement both the firmware kernel 10 and Manchester decoder 11 functions. An isolation transformer 124, bypass capacitor 110, and resistors 126-129 comprise the signal transmitter 12b which modulates the current from isolation power supply 13 that returns to central module 15b. Capacitors 130 and 132 comprise a high pass filter that blocks the transmitted signal from interfering with normal network communications.

Continuing to refer to FIG. 10, the operation of the third embodiment will be described. Within central module 15b, power flows from the +15 volt source through series resistor 118 and a transmit data line, to the isolation power supply 13 in remote module 16b. Within remote module 16b, power from the transmit data line is regulated by zener diode 114 and filter capacitor 113. The current which flows through resistor 112 splits, with a portion flowing through processor 122 and the exclusive OR gates, and the remainder flowing through zener diode 114. The return current flowing out of zener diode 114 and the circuit ICs, flows into the secondary winding center-tap of isolation transformer 124. The current splits between the windings with the reflected primary impedance controlling the magnitude of the current that flows in each winding. The primary impedance is controlled by processor 122, the exclusive OR gates 120 and 121, and the two 10 k resistors 126 and 127. A high logic level output from exclusive OR 120 results in current flowing through resistor 126, the primary of isolation transformer 124, resistor 127, and into exclusive OR 121. The current flowing through the transformer primary is reflected to the secondary where it adds with current flowing through one winding and subtracts from current flowing through the other winding. The direction of the current flowing through the primary changes as the output of exclusive OR 120 alternates between a logic level high and low in response to the Manchester encoded stream from processor 122. The variation in primary current flow direction added to the secondary current flowing into the center-tap results in a modulated current signal. The high frequency components of the resulting secondary winding current flow through bypass capacitor 110. The low frequency components flow through resistors 128 and 129, onto the receive data lines, to the central module 15b, and through isolation transformer 72 to signal ground. Resistors 128 and 129 provide a buffer to prevent the bypass capacitor 110 from loading down the data lines.

Within central module 15b, the modulated current is reflected from the primary to the secondary of isolation transformer 72. Low pass active filter 74 filters out high frequency network communication components and passes a squared-up output to the Manchester decoder 5. The decoded data stream is inputted to the firmware kernel 4 which evaluates the data stream to ensure a valid identification number was transmitted.

Figure 18:
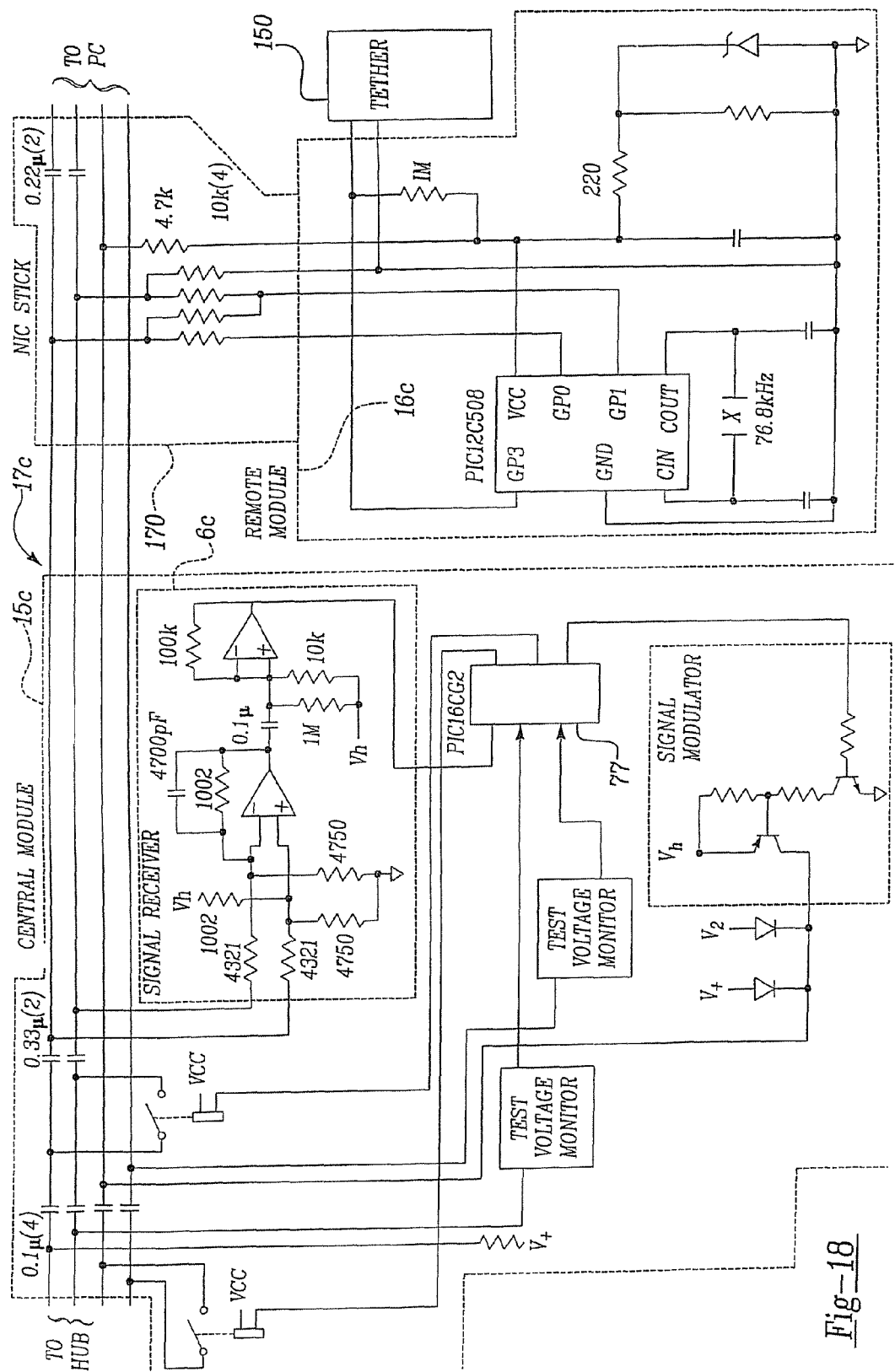
FIG. 18 is a schematic representation of circuitry for the fourth embodiment.

Referring to FIG. 18, a presently preferred embodiment, the fourth embodiment, of the invention is illustrated. The fourth embodiment differs from the earlier described embodiments by employing an interface amplifier for the signal receiver 6c in place of an isolation transformer, adding a third source voltage to central module 15c, adding a NIC Stick 170, reconfiguring the signal transmitter of the remote module 16c, and adding an electronic tether 150. The signal receiver interface amplifier is configured as a bandpass filter using design techniques that are well known in the art. The output of the interface amplifier is connected to the processor 77 wherein the signal is decoded. The NIC Stick 170 provides an improved method of interconnecting the signals that flow between the various modules of the preferred embodiment. The NIC Stick 170 and remote module 16c are integrated into a connector assembly for interconnect to a PC. The purpose and function of the tether 150 is provided in a subsequent section of this specification.

Figure 11:
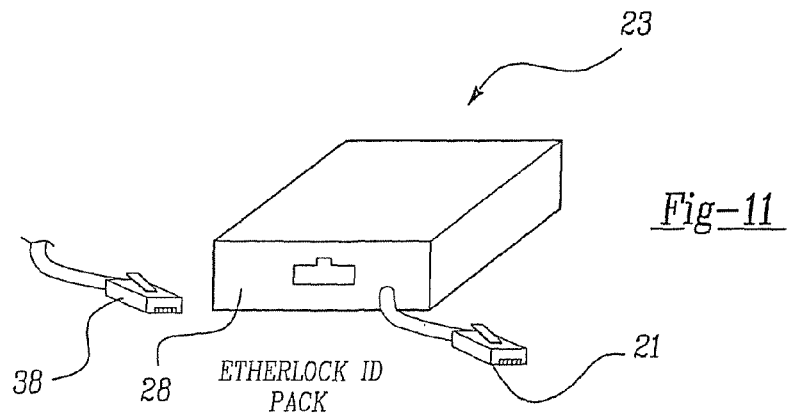
FIG. 11 is a perspective view of one embodiment of the hardware for the remote module.
Figure 12:
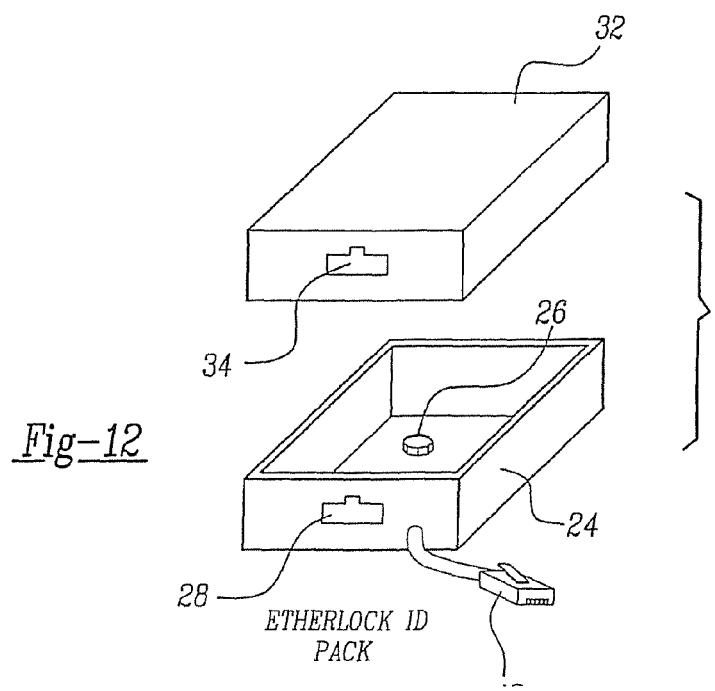
FIG. 12 is an exploded perspective view of the hardware of FIG. 11.

Turning now to FIGS. 11-13 the remote module 16 is illustrated as being contained in a special box-like housing 23. The electronics are mounted on a suitable card 22 within the confines of a container 24. The container 24 is mounted to the computer 3A using the existing fasteners normally found on the back of the computer. Such a fastener is illustrated at 26. The fastener 26 is chosen to be one that is required to be removed in order to gain access to the hardware inside the computer. Therefore, the potential thief must remove fastener 26 to steal the mother board, network identification card (NIC), etc. Lid 32 likewise contains opening 34. When the lid is closed as shown in FIG. 13, the opening 28 is aligned with opening 34. These openings allow the normal network wire connector 38 to pass through the openings in housing 23 and engage the electronics card 22. Housing 23 includes an output cord 40 with a connector 42 which engages the standard network interface card (NIC) found in the computer. This construction is designed to require the potential thief to disconnect connector 38 from housing 23 in order to gain access to the fastener 26 which must be unscrewed in order to remove the internal computer parts. When the connector 38 is removed, the computer 3A becomes, likewise, disconnected from the network. This causes the current in loop 2A to drop below a threshold level which causes the system 15 to cause a system alarm or the like to be activated. Thus this housing configuration deters theft of the internal parts of the computer since fastener 26 must be removed to gain access to them, as well as deterring removal of the entire computer terminal.

Figure 15:
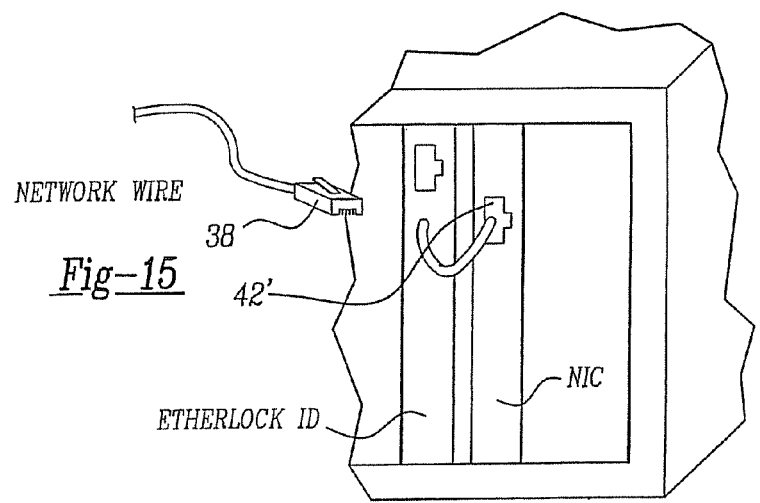
FIG. 15 illustrates the installation of the hardware of FIG. 14 into a computer.

FIGS. 14-15 show an alternative embodiment in which the electronics for network identification circuitry 16 are instead placed upon a card 44 which can be inserted into an adjacent slot in the computer next to the standard NIC card 46. The network wire connector 38 is connected to the input of card 44 and the output of identification card 44 is then connected to the normal input receptacle 48 of NIC card 46. It is also envisioned that the electronics of the network identification circuitry can be placed on a motherboard within the computer or as part of the circuitry on the NIC card.

Figure 16:
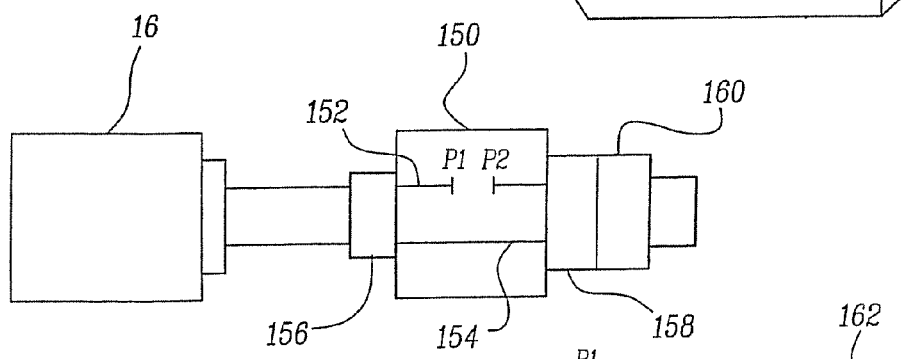
FIG. 16 is a schematic representation of an electronic tether in accordance with the fourth embodiment.

FIG. 16 shows a schematic of another implementation in which the electronic tether 150 extending from the remote module 16 is attached to equipment to be protected. The remote module 16 monitors the status of the tether 150 and notifies the central module 15 if the tether 150 is removed or the electrical connection interrupted. The central module then sets a system alarm either centrally or locally. The tether 150 includes two conductive lines 152 and 154 coupled between a pair of connectors 156 and 158. An attachment status signal is conducted through the conductive lines 152 and 154 for indicating whether the tether 150 remains attached to the protected equipment. The first conductive line 152 includes pads P1 and P2 inline to provide a means of shorting a break in the line. The second conductive line 154 is coupled directly between the connectors. An external jumper 160 is connected to the output connector 158 of the tether 150 to complete the electrical connection.

Figure 17:
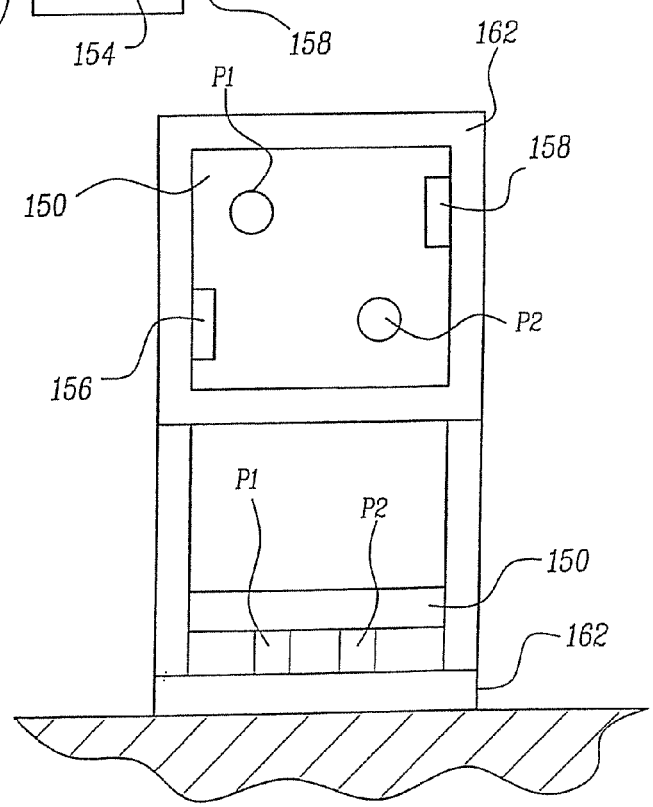
FIG. 17 is a cross-sectional view of an electronic tether used in connection with the fourth embodiment.

FIG. 17 illustrates the electronic tether 150 mounted to the surface of equipment to be protected. A conductive pad 162 having conductive adhesive on both sides is bonded to the equipment surface. The adhesive on the side facing the equipment has greater strength than the adhesive on the side facing the tether. The relative strength of the adhesive on either side of the conductive pad 162 is chosen to ensure that if the tether 150 is removed the conductive pad 162 will remain bonded to the equipment, not to the tether. The tether 150 is bonded to the conductive pad 162 so that the pads, P1 and P2, make electrical contact with the conductive pad 162.

In operation, the tether 150 is bonded to a piece of equipment to be protected such as monitors, printers, fax machines, and chairs. Multiple tethers can be connected in series to provide protection for more than one piece of equipment. The remote module 16 monitors the status of the attachment status signal from the tether 150 to determine that an electrical short is maintained. An interrupted attachment status signal indicates that either a tether 150 is no longer connected to its associated piece of equipment or the electrical connection to the tether 150 has been interrupted. Upon detecting an interrupted attachment status signal, the remote module 16 sets a bit of the identification number that is transmitted to the central module 15. The central module 15 then sets an alarm either locally or centrally.

From the foregoing it will be understood that the invention provides a system for communicating with electronic equipment on a network. The system transmits a signal over pre-existing network wiring or cables without disturbing network communications by coupling a signal that does not have substantial frequency components within the frequency band of network communications. The system is particularly suitable for high-frequency networks such as Ethernet operating at speeds of 10 megabits per second (Mb/s) and higher. For purposes of this invention the term "high frequency information" means the band of frequencies needed to carry data at 10 Mb/s or more. Coupling a lower frequency signal to the data lines of such a network permits increased utilization of the available transmitting medium without a commensurate increase in the cost of the network. To ensure that the added lower frequency signal does not interfere with normal network communications the added signal must not contain frequency components that interfere with the network signals. For example, when the invention is used with an Ethernet 10BASE-T network, the specifications for that network method place stringent restrictions on the behavior of the medium for frequencies from 5 MHz to 10 MHz with some parameters specified to frequencies as low as 1 MHz. In the present embodiment a simple highpass circuit at 150 kHz formed by adding capacitors into each wire of the medium is employed to isolate the injected signal from normal network communications, resulting in substantially no disruption of the high frequency network information. Additionally, employing a higher order high pass filter would permit operation with less disruption than a lower order high pass filter at the same corner frequency. For the purposes of the invention, the term "low frequency signal" means signals in which the energy representing the data can be reliably carried in the band of frequencies made available by this filtering. Typically, this means that the low frequency signals operate at a bit rate which is less than about 1% of the bit rate of the high frequency signals which carry the network communication data. By way of a specific example, the high frequency information in the embodiment of FIGS. 4-8 operates in the range of about 10 Mb/s while the encoded signal sent from remote module 16a to central module 15a operates in the range of about 1200 bits per second. In other words, the altered current flow has changes and each change is at least 833 microseconds in duration ($1/1200=0.000833$ seconds). Although the present embodiment operates in the range of about 1200 bits per second, it is within the scope of the invention to operate at bit rates up to 57.6 kb/s by increasing the filter frequencies, operating in a lower noise environment, or increasing the degradation of network communications. Further suppression of harmonics results from the lowpass filtering provided by the resistors used to couple the low frequency signal to the data lines acting with the capacitors used for the highpass function mentioned above.

Additionally, the system provides a means for permanently identifying the location of network assets without applying power to the assets. Also, the system can be employed to determine asset inventory, i.e. when an asset is being removed or added to the network. The system permits a company to track its assets, locate any given asset, and count the total number of identified assets at any given time. In addition, the system provides a means of blocking communications with an unauthorized device that is connected to the network. Furthermore, the system allows the automatic blocking of communications with an unauthorized device. Additionally, the system is particularly suitable to be integrated into an asset aware patchpanel in order to provide a means for identifying the location of network assets.

Figure 19:
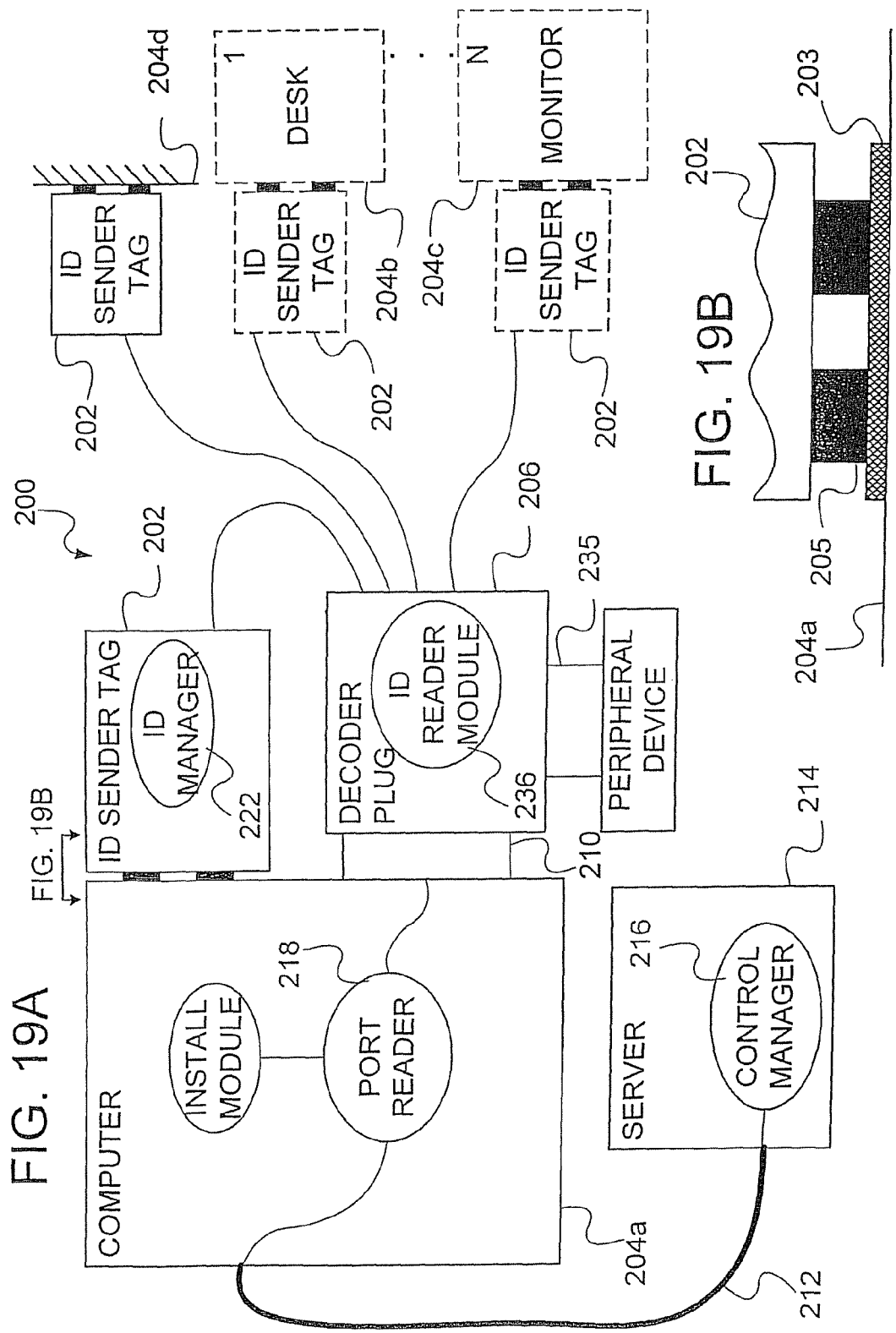
FIG. 19a is a block diagram that illustrates a system for electronically identifying an object made in accordance with the teachings of the present invention.
FIG. 19b is a cross-sectional view of an ID sender tag used in connection with the system for electronically identifying an object.
Figure 21:
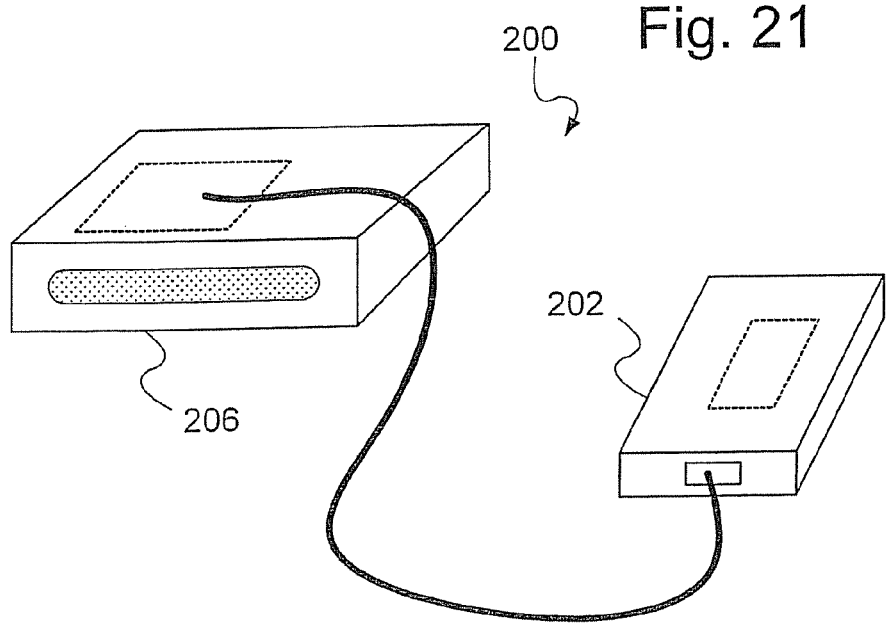
FIG. 21 is a perspective view that illustrates installation of an ID sender tag and decoder plug.
Figure 22:
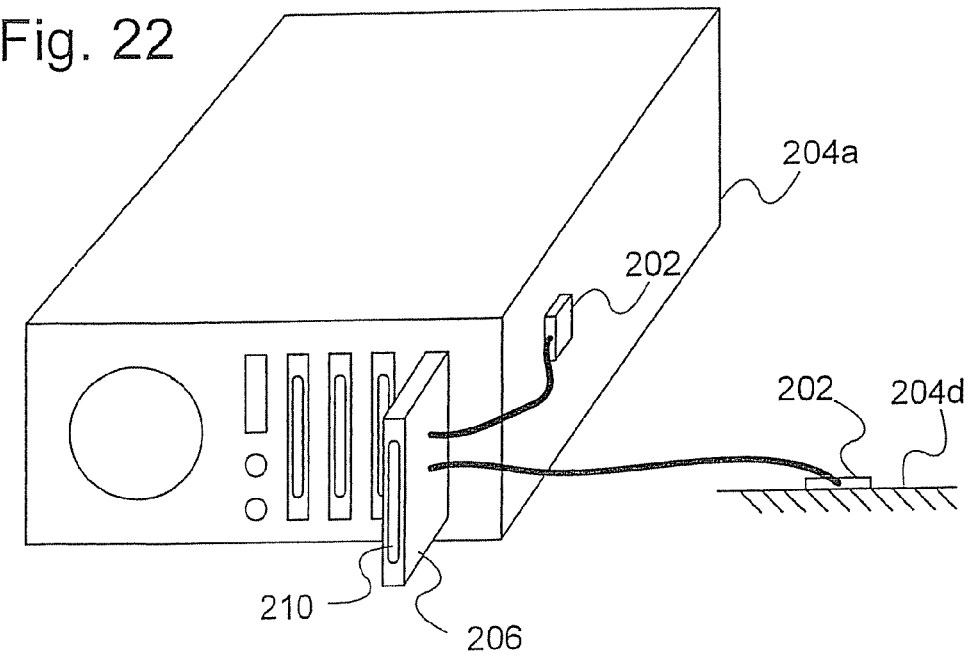
FIG. 22 is a perspective view that illustrates an ID sender tag and decoder plug interconnected by a serial bus.

Referring to FIGS. 21 and 22, a system 200 for communicating with equipment is illustrated. The system provides a means of assigning a permanent electronic identification number to an object. The object electronic number is used to monitor the configuration of the object, to control access to network entities such as programs and servers, and to provide network management information. The initial configuration of a network device is stored and referenced in a network database by the object identification number, permitting subsequent comparisons between the initial configuration and the subsequent configuration of the network device. Another permanent electronic number may be assigned to the physical location of the object. The location electronic number combined with the object electronic number provides simultaneous references for location and configuration of an object. The network database further includes the location associated with the location identification number, thereby permitting between the initial location and configuration, and the subsequent location and configuration of an object. The system 200 includes an ID sender tag 202 that has a unique identification number and is physically attached to an object 204. In the preferred embodiment the identification number is programmed at manufacture and is not changeable. Once the ID sender tag 202 is attached to an object, the identification number becomes associated with that object 204. In the presently preferred embodiment of the invention, a first sender tag 202 is attached to a computer 204a and a second sender tag 202 is attached to a wall 204d near the computer 204a. However, other objects are within the scope of the invention, such as desks 204b, monitors 204c, computer pointing devices, other computers (powered and unpowered), and clothing. The first sender tag 202 provides identification information and the second sender tag 202 provides location information. Each sender tag 202 transmits a serial stream that includes a unique identification number corresponding respectively to the computer 204a and the wall 204d. A decoder plug 206 attached to a computer port is electronically coupled to the sender tag 202. The decoder plug 206 receives the serial stream, and then converts the serial stream into a signal format that is compatible with the port to which the decoder plug 206 is connected. Although, in the presently preferred embodiment the decoder plug 206 is connected to a computer parallel port 210, the principles of the invention may be readily extended to other types of ports, such as USB, Firewire, keyboard, and serial ports. In addition, the scope of the invention includes coupling multiple ID senders 202 to a single decoder plug 206 so that multiple objects can be monitored with the decoder plug 206. Also, connecting multiple decoder plugs 206 in series is within the scope of the invention. The decoder plug 206 includes an identification number, thereby permitting the interconnected decoder plugs 206 and ID sender tags 202 to be logically linked together. The parallel port 210 is included within the computer 204a, which is connected to a network 212. Referring to FIG. 19a, a port reader 218 in the computer 204a reads the converted serial stream at the parallel port 210 and sends the communicated information over the network 212. The scope of the invention includes employing pre-existing collector software as an interface to the port reader for communicating with the decoder plug 206. A server 214 connected to the network 212, includes a control manager 216 that receives and analyzes the communicated information. The control manager 216 includes a database for storing communicated information such as initial and subsequent locations and configurations for identified objects. Although the presently preferred embodiment of the invention includes a port reader 218 and a control manager 216, the principles of the invention may be practiced with merely an ID sender tag 202 electronically coupled to a decoder plug 206.

Referring to FIG. 19b in addition to FIG. 19a, the mounting configuration of the sender tag 202 is illustrated. A mounting arrangement similar to that of the electronic tether 150 described in an earlier section of this specification is employed to mount the sender tag 202 to the surface of an object. The sender tag 202 includes pads 205 for mounting. A conductive pad 203 having conductive adhesive on both sides is bonded to the pads 205 for attaching the sender tag 202 to an equipment surface. The adhesive on the side facing the equipment has greater strength than the adhesive on the side facing the pads 205. The relative strength of the adhesive on either side of the conductive pad 203 is chosen to ensure that if the sender tag 202 is removed the conductive pad 203 will remain bonded to the equipment, not to the pads 205 of the sender tag 202. With the conductive pad 203 attached to the sender tag 202 an electrical connection is established between the pads 205.

Figure 20:
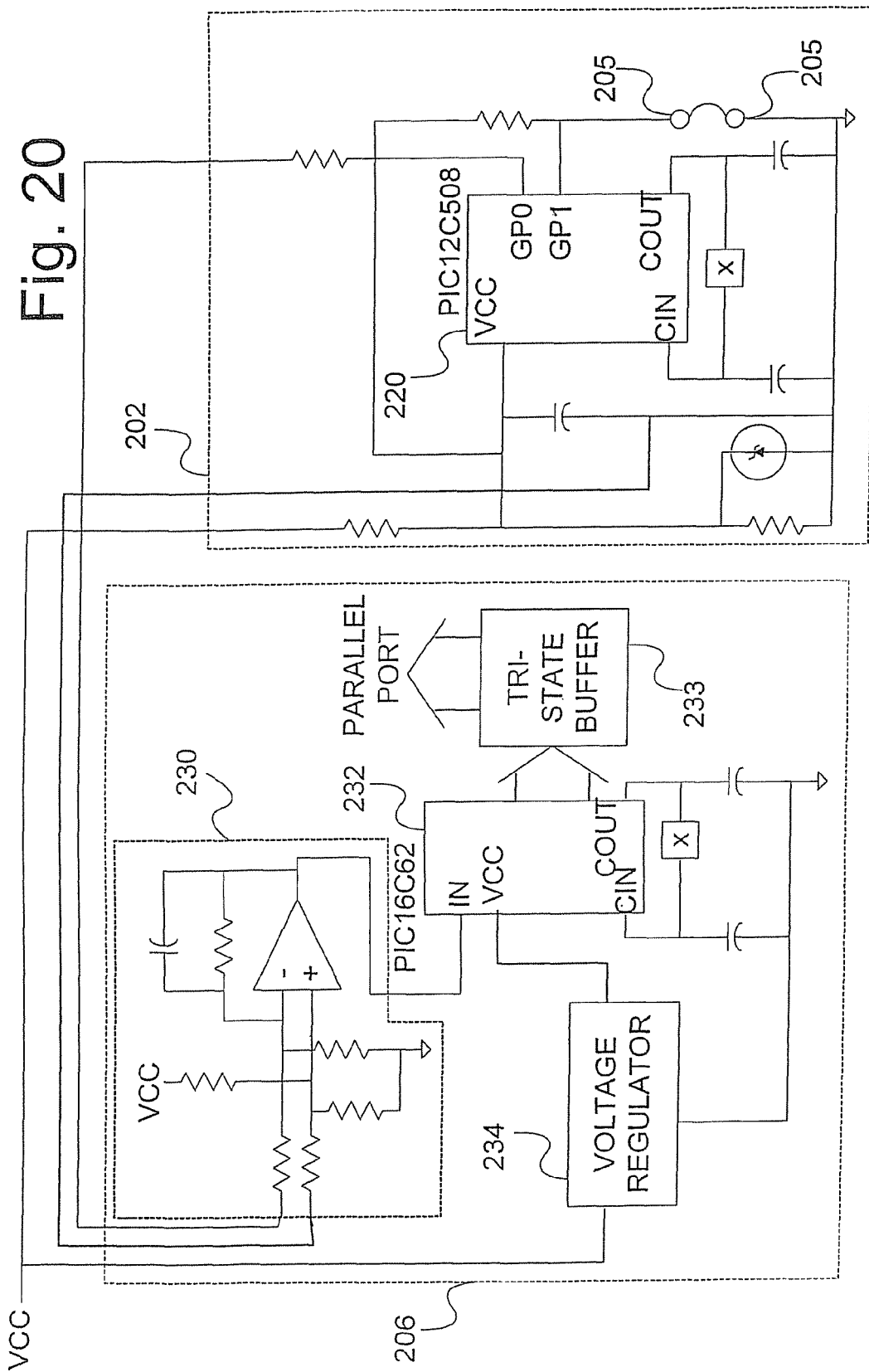
FIG. 20 is a schematic representation of circuitry used in a system for electronically identifying an object.

Referring to FIG. 20 in addition to FIG. 19a, the ID sender tag 202 of the presently preferred embodiment is illustrated. The ID sender tag 202 is a physical identifier that has an identification number that is programmed at manufacture. The identification number is remotely readable through a communication interface that is continuously operable and parasitically powered. The ID sender tag 202 includes a processor 220 for Manchester encoding and sending the identification number over the attached serial bus. Although, Manchester encoding is employed in the preferred embodiment, other forms of transmitting a serial stream are within the scope of the invention, such as single bit on/off, 4B/5B, Frequency Shift Keying (FSK), and techniques that result in a DC bias on the line. Regulating and filtering the power for the processor 220 is provided by circuitry that is configured using design techniques that are well known in the art. Additionally, a set of resistors is selected using design techniques that are well known in the art to buffer the output of the processor 220 from the serial bus. The firmware of processor 220 is programmed to provide an ID manager 222 function. The ID manager 222 generates an identification packet using procedures for Manchester encoding and RS232 framing of a unique identification number. Table I includes pseudocode of the procedures carried out by the ID manager 222.

TABLE I

Pseudocode for ID Manager

Retrieve the data words containing the identification number.
Load the data words containing the identification number into RAM.
Begin Encode Loop.
  Begin transmitting information.
  Set the start bit to begin the first half of the Manchester cycle.
  Load a data word.
  Pad out time and set the end bit.
  Set the start bit to begin the second half of the Manchester cycle.
  Load a data word.
  Pad out time and set the end bit.
  Set RS-232 framing.
Loop until the packet is complete.

Referring to FIG. 20 in addition to FIG. 19a, the decoder plug 206 of the presently preferred embodiment is illustrated. The decoder plug 206 is a physical reader that has an identification number that is programmed at manufacture. The continuously operable and parasitically powered communication interface permits the decoder plug 206 to remotely read the identification number of an attached ID sender 202. The decoder plug 206 includes a signal receiver 230, a processor 232, and a voltage regulator 234. The signal receiver 230 provides a balanced impedance on the serial bus for receiving the serial stream from the sender tag 202. The buffered serial stream is coupled from the output of the signal receiver 230 to an input of the processor 232 which converts it into a parallel stream. Firmware in the processor 232 implements an ID reader module 236 to provide the conversion function. A tri-state buffer 233 coupled to the processor 232 permits unobstructed passthrough communication from the interface port 210 to a peripheral device coupled to the decoder plug 204 through a connector 235. Power, Vcc, from the parallel port is regulated by the voltage regulator 234 and used to power the processor 232 and signal receiver 230. Table II provides pseudocode of the ID reader module 236.

TABLE II

Pseudocode for ID Reader Manager

Load the Manchester encoded data.
Perform a majority sample decode (converts the Manchester symbols to a bit stream).
Strip the start and end bits.
Output a series of bytes.
Assemble the bytes into a message.
Perform error and checksum testing.
Store the message.

In operation, the communication system has multiple operating modes, such as asset control mode, network management information mode, and license control mode. In asset control mode the system provides external identifiers as a guaranteed reference for computer change control including change of location and change of configuration. During network management information mode the system automates the physical management and inventory of equipment. In license control mode the system trades access to the computer in exchange for a physical inventory of the connected identifiers.

With reference to FIGS. 19*a* and 20, during asset control mode the control manager 216 located in the server 214 sends an asset identifier request to the port reader 218 requesting the identification number of equipment that is monitored by the computer 204*a*. The asset identifier request is passed through the decoder plug 206 to each of the ID sender tags 202 that are associated with the computer 204*a*. The ID manager 222 in each ID sender tag 202 Manchester encodes a predefined identification number and transmits the encoded number to the decoder plug 206 as a serial stream with RS-232 framing. The ID reader module 236 in the decoder plug 206 performs a majority sample decode to convert the Manchester symbols to a bit stream. In addition, the reader module 236 provides the equivalent of a UART by stripping the start and end bits and outputting a series of bytes. The bytes are then assembled into an ID sender message and stored after appropriate error and checksum testing. The decoder plug 206 then formats the stored sender messages for transmission to the interface port 210. First, a decoder message is assembled, consisting of identification information related to the decoder plug 206, status information, and the stored sender messages. Second, a MAC/physical layer which handles the interface and handshaking to the interface port 210 is constructed. The decoder plug 206, then transmits the assembled decoder information to the interface port 210. The port reader 218 receives the assembled decoder information, reformats the enclosed messages and transmits the reformatted messages to the control manager 216. The control manager 216 evaluates the response from the computer 204*a*. The evaluation by the control manager 216 includes comparing and updating the configuration and location information of the queried objects with previously stored information in the associated database. The initial physical identity and initial physical location of an object is input to the database during setup of an ID sender tag 202 by an operator such as a user. Information related to the object is also inputted to the database. Related object information includes the object serial number, physical attributes, physical configuration, electronic attributes, software configuration, network attributes, and date of entry.

Continuing to refer to FIGS. 19*a* and 20, during network management information mode a network manager determines the location or configuration of assets that are coupled to the network by interrogating ID senders 202 and decoder plugs 206 attached to assets. The system is especially useful for token ring and fiber optic networks since the location information related to an object is provided by an ID sender tag 202 attached to a relatively immobile surface rather than reading a port address associated with a network device. The method of interrogating the ID sender tags 202 is similar to that employed during asset control mode except asset configuration information is requested instead of merely identification of attached objects.

During license control mode a key manager located in server 214 limits access to selected programs to predetermined assets or a quantity of assets rather than to predetermined users or a quantity of users. In response to a user attempting to open a controlled program, the key manager ascertains the asset the user is employing and the identification number assigned to the asset in a similar manner to that described for asset control mode. The key manager then employs access criteria to determine whether to grant access to the controlled program.

Although, in the preferred embodiment the comparison function of the control manager and database is executed on a network server electronically coupled through a network to an ID sender tag 202, the scope of the invention includes conducting the comparison locally on a computer that is being scanned, in a central database over a network, over a corporate intranet, and over the world wide Internet.

In operation, an application which runs "Java" through a standard browser is provided. A requestor connected to the Internet selects a button to request related object information from an Internet connected object. In response to the request, an ActiveX (Java) control gets pulled down onto a computer connected to the object, runs and reads the object identification number and the object location identification number from ID sender tags 202. The computer reports the related object information back to the requester over the Internet.

From the foregoing it will be understood that the invention provides a system and method for remotely detecting and reading an asset identity and location. Additionally, the system and method can be employed to automate collection and validation of asset identity and location. The system and method provide a means for communicating with an asset based on identity or location. In addition, the system and method permit the automated comparison and storage of asset configuration and location information. Also, the system and method can be employed to automate asset change control. Additionally, the system and method provide a means to perform asset management, remote identification, and remote access security over the Internet in a guaranteed fashion.

The attachment of a remote module 16 or an ID sender tag 202 to an object provides an identification number corresponding to the object. The location of an object with an attached remote module 16 is provided by the corresponding port address associated with the object. The location of an object with an attached ID sender tag 202 is provided by an associated ID sender tag 202 that is attached to a surface of a wall, floor, or other relatively immobile object.

It should be understood that while this invention has been described in connection with particular examples thereof, no limitation is intended thereby since obvious modifications will become apparent to those skilled in the art after having the benefit of studying the foregoing specification, drawings and following claims.

What is claimed is:

1. A method for adapting a piece of Ethernet data terminal equipment, the piece of Ethernet data terminal equipment having an Ethernet connector, the method comprising:
   selecting contacts of the Ethernet connector comprising a plurality of contacts, the selected contacts comprising at least one of the plurality of contacts of the Ethernet connector and at least another one of the plurality of contacts of the Ethernet connector;
   coupling at least one path across the selected contacts of the Ethernet connector; and
   associating distinguishing information about the piece of Ethernet data terminal equipment to impedance within the at least one path.

2. The method according to claim 1 wherein the piece of Ethernet data terminal equipment is a personal computer.

3. The method according to claim 1 wherein the associating distinguishing information about the piece of Ethernet data terminal equipment to impedance within the at least one path comprises associating identifying information about the piece of Ethernet data terminal equipment to impedance within the at least one path.

4. The method according to claim 1 wherein the Ethernet connector comprising the plurality of contacts is an RJ45 jack comprising the contact 1 through the contact 8.

5. The method according to claim 1 wherein the impedance within the at least one path is part of a detection protocol.

6. The method according to claim 1 wherein the piece of Ethernet data terminal equipment is a piece of BaseT Ethernet data terminal equipment.

7. The method according to claim 1 wherein the at least one of the plurality of contacts of the Ethernet connector comprises two of the plurality of contacts of the Ethernet connector.

8. The method according to claim 1 wherein the at least another one of the plurality of contacts of the Ethernet connector comprises two of the plurality of contacts of the Ethernet connector.

9. The method according to claim 1 wherein the Ethernet connector is an RJ45 jack comprising the contact 1 through the contact 8, the at least one of the plurality of contacts of the Ethernet connector comprises two of the plurality of contacts of the Ethernet connector and the two of the plurality of contacts comprise the contact 3 and the contact 6.

10. The method according to claim 1 wherein the coupling at least one path across the selected contacts comprises coupling at least one path having at least one resistor.

11. The method according to claim 1 wherein the coupling at least one path across the selected contacts comprises coupling two paths across the selected contacts.

12. The method according to claim 1 wherein the coupling at least one path across the selected contacts comprises coupling two paths across the selected contacts, at least one of the two paths having a zener diode.

13. The method according to claim 1 wherein the coupling at least one path across the selected contacts comprises coupling at least one path having a controller across the selected contacts.

14. The method according to claim 1 wherein the Ethernet connector is an RJ45 jack comprising the contact 1 through the contact 8 and the piece of Ethernet data terminal equipment is a piece of BaseT Ethernet terminal data equipment.

15. The method according to claim 1 wherein the Ethernet connector is an RJ45 jack comprising the contact 1 through the contact 8 and the associating distinguishing information about the piece of Ethernet data terminal equipment to impedance within the at least one path comprises associating identifying information about the piece of Ethernet data terminal equipment to impedance within the at least one path.

16. The method according to claim 1 wherein the piece of Ethernet data terminal equipment is a piece of BaseT Ethernet data terminal equipment.

17. The method according to claim 1 wherein the Ethernet connector is an RJ45 jack comprising the contact 1 through the contact 8 and the piece of Ethernet data terminal equipment is a piece of BaseT Ethernet data terminal equipment.

18. The method according to claim 1 wherein the associating distinguishing information about the piece of Ethernet data terminal equipment to impedance within the at least one path comprises associating distinguishing information related to an electrical aspect of the piece of Ethernet data terminal equipment to impedance within the at least one path.

19. The method according to claim 1 wherein the associating distinguishing information about the piece of Ethernet data terminal equipment to impedance within the at least one path comprises associating distinguishing information related to a physical aspect of the piece of Ethernet data terminal equipment to impedance within the at least one path.

20. The method according to claim 1 wherein the associating distinguishing information about the piece of Ethernet data terminal equipment to impedance within the at least one path comprises associating distinguishing information about the piece of Ethernet data terminal equipment to impedance within the at least one path having at least one predetermined duration.

21. The method according to claim 20 wherein the impedance within the at least one path is between 10 k Ohms and 15 k Ohms.

22. The method according to claim 1 wherein the impedance within the at least one path is a function of voltage across the selected contacts.

23. The method according to claim 1 wherein the at least one path includes the center tap of at least one isolation transformer.

24. The method according to claim 1 further comprising physically connecting the adapted piece of Ethernet data terminal equipment to a network.

25. The method according to claim 1 wherein the selected contacts are the same contacts used for normal network communication.

26. The method according to claim 25 wherein the normal network communication is BaseT Ethernet communication.

27. The method according to claim 1 wherein the at least one path coupled across the selected contacts is formed through the piece of Ethernet data terminal equipment.

28. The method according to any one of claims 1 through 26 wherein the at least one path coupled across the selected contacts is formed through the piece of Ethernet data terminal equipment.

29. The method according to any one of claims 1 through 24 and claim 27 wherein the selected contacts are at least some of the same contacts used for normal network communication.

30. The method according to claim 29 wherein the normal network communication is BaseT Ethernet communication.

31. An adapted piece of Ethernet data terminal equipment comprising:
   an Ethernet connector comprising a plurality of contacts; and
   at least one path coupled across selected contacts, the selected contacts comprising at least one of the plurality of contacts of the Ethernet connector and at least another one of the plurality of contacts of the Ethernet connector, wherein distinguishing information about the piece of Ethernet data terminal equipment is associated to impedance within the at least one path.

32. The piece of Ethernet data terminal equipment according to claim 31 wherein the piece of Ethernet data terminal equipment is a personal computer.

33. The piece of Ethernet data terminal equipment according to claim 31 wherein the distinguishing information about the piece of Ethernet data terminal equipment associated to impedance within the at least one path comprises identifying information about the piece of Ethernet data terminal equipment.

34. The piece of Ethernet data terminal equipment according to claim 31 wherein the Ethernet connector is an RJ45 jack and the plurality of contacts comprises the contact 1 through the contact 8 of the RJ45 jack.

35. The piece of Ethernet data terminal equipment according to claim 31 wherein the impedance within the at least one path is part of a detection protocol.

36. The piece of Ethernet data terminal equipment according to claim 31 wherein the piece of Ethernet data terminal equipment is a piece of BaseT Ethernet data terminal equipment.

37. The piece of Ethernet data terminal equipment according to claim 31 wherein the at least one of the plurality of contacts of the Ethernet connector comprises two of the plurality of contacts of the Ethernet connector.

38. The piece of Ethernet data terminal equipment according to claim 31 wherein the at least another one of the plurality of contacts of the Ethernet connector comprises two of the plurality of contacts of the Ethernet connector.

39. The piece of Ethernet data terminal equipment according to claim 31 wherein the Ethernet connector is an RJ45 jack comprising the contact 1 through the contact 8, the at least one of the plurality of contacts of the Ethernet connector comprises two of the plurality of contacts of the Ethernet connector and the two of the plurality of contacts comprise the contact 3 and the contact 6.

40. The piece of Ethernet data terminal equipment according to claim 31 wherein the at least one path comprises at least one resistor.

41. The piece of Ethernet data terminal equipment according to claim 31 wherein the at least one path comprises two paths.

42. The piece of Ethernet data terminal equipment according to claim 41 wherein one of the two paths comprises a zener diode.

43. The piece of Ethernet data terminal equipment according to claim 31 wherein the at least one path comprises a controller.

44. The piece of Ethernet data terminal equipment according to claim 31 wherein the Ethernet connector is an RJ45 jack comprising the contact 1 through the contact 8 and the piece of Ethernet data terminal equipment is a piece of BaseT Ethernet data terminal equipment.

45. The piece of Ethernet data terminal equipment according to claim 31 wherein the Ethernet connector is an RJ45 jack comprising the contact 1 through the contact 8 and the distinguishing information about the piece of Ethernet data terminal equipment associated to impedance within the at least one path comprises identifying information about the piece of Ethernet data terminal equipment.

46. The piece of Ethernet data terminal equipment according to claim 31 wherein the piece of Ethernet data terminal equipment is a piece of BaseT Ethernet data terminal equipment.

47. The piece of Ethernet data terminal equipment according to claim 31 wherein the Ethernet connector is an RJ45 jack comprising the contact 1 through the contact 8 and the piece of Ethernet data terminal equipment is a piece of BaseT Ethernet data terminal equipment.

48. The piece of Ethernet data terminal equipment according to claim 31 wherein the distinguishing information is related to an electrical aspect of the piece of Ethernet data terminal equipment.

49. The piece of Ethernet data terminal equipment according to claim 31 wherein the distinguishing information is related to a physical aspect of the piece of Ethernet data terminal equipment.

50. The piece of Ethernet data terminal equipment according to claim 31 wherein the distinguishing information about the piece of Ethernet data terminal equipment associated to impedance within the at least one path comprises distinguishing information about the piece of Ethernet data terminal equipment associated to impedance within the at least one path having a predetermined time duration.

51. The piece of Ethernet data terminal equipment according to claim 50 wherein impedance within the at least one path is between 10 k Ohms and 15 k Ohms.

52. The piece of Ethernet data terminal equipment according to claim 31 wherein the impedance within the at least one path is a function of voltage across the selected contacts.

53. The piece of Ethernet data terminal equipment according to claim 31 wherein the at least one path includes the center tap of at least one isolation transformer.

54. The piece of Ethernet data terminal equipment according to claim 31 wherein the adapted piece of Ethernet data terminal equipment is physically connected to a network.

55. The piece of Ethernet data terminal equipment according to claim 31 wherein the selected contacts are the same contacts used for normal network communication.

56. The piece of Ethernet data terminal equipment according to claim 55 wherein the normal network communication is BaseT Ethernet communication.

57. The piece of Ethernet data terminal equipment according to claim 31 wherein the at least one path coupled across the selected contacts is formed through the piece of Ethernet data terminal equipment.

58. The piece of Ethernet data terminal equipment according to any one of claims 31 through 56 wherein the at least one path coupled across the selected contacts is formed through the piece of Ethernet data terminal equipment.

59. The piece of Ethernet data terminal equipment according to any one of claims 31 through 54 and claim 57 wherein the selected contacts are at least some of the same contacts used for normal network communication.

60. The piece of Ethernet data terminal equipment according to claim 59 wherein the normal network communication is BaseT Ethernet communication.

61. The method according to claim 1 wherein the piece of Ethernet data terminal equipment is powered-on.

62. The method according to any one of claims 1 through 27 and claim 61 wherein the at least one path permits use of the selected contacts for Ethernet communication.

63. The method according to claim 62 wherein the selected contacts are used for Ethernet communication.

64. The piece of Ethernet data terminal equipment according to claim 31 wherein the piece of Ethernet data terminal equipment is powered-on.

65. The piece of Ethernet data terminal equipment according to any one of claims 31 through 54 and claim 64 wherein the at least one path permits the use of the selected contacts for Ethernet communication.

66. The piece of Ethernet data terminal equipment according to claim 65 wherein the selected contacts are used for Ethernet communication.

67. A method for adapting a piece of terminal equipment, the piece of terminal equipment having an Ethernet connector, the method comprising:
coupling at least one path across specific contacts of the Ethernet connector, the at least one path permits use of the specific contacts for Ethernet communication, the Ethernet connector comprising the contact 1 through the contact 8, the specific contacts of the Ethernet connector comprising at least one of the contacts of the Ethernet connector and at least another one of the contacts of the Ethernet connector; and
arranging impedance within the at least one path to distinguish the piece of terminal equipment.

68. The method according to claim 67 wherein the piece of terminal equipment is a personal computer.

69. The method according to claim 67 wherein the arranging impedance within the at least one path to distinguish the piece of terminal equipment comprises arranging impedance within the at least one path to uniquely distinguish the piece of terminal equipment.

70. The method according to claim 67 wherein the arranging impedance within the at least one path to distinguish the piece of terminal equipment comprises arranging impedance within the at least one path to identify the piece of terminal equipment.

71. The method according to claim 67 wherein the arranging impedance within the at least one path to distinguish the piece of terminal equipment comprises arranging impedance within the at least one path to uniquely identify the piece of terminal equipment.

72. The method according to claim 67 wherein the piece of terminal equipment has a particular electrical aspect and the arranging impedance within the at least one path to distinguish the piece of terminal equipment comprises arranging impedance within the at least one path to distinguish that the piece of terminal equipment has the particular electrical aspect.

73. The method according to claim 67 wherein the arranging impedance within the at least one path comprises arranging impedance within the at least one path to be part of a detection protocol.

74. The method according to claim 67 wherein the arranging impedance within the at least one path comprises arranging impedance within the at least one path to be variable.

75. The method according to claim 67 wherein the arranging impedance within the at least one path comprises arranging impedance within the at least one path to be continuously variable.

76. The method according to claim 67 wherein the arranging impedance within the at least one path comprises arranging the impedance within the at least one path to draw DC current.

77. The method according to claim 67 wherein the arranging impedance within the at least one path comprises arranging the impedance within at least one path to have at least one predetermined duration.

78. The method according to 77 wherein the predetermined duration is between 17 and 833 microseconds.

79. The method according to claim 67 wherein the arranging impedance within the at least one path comprises arranging impedance within the at last one path to be between 10 k Ohms and 15 k Ohms.

80. The method according to claim 67 wherein the arranging impedance within the at least one path comprises arranging impedance within the at least one path to be a function of voltage across the specific contacts.

81. The method according to claim 67 wherein the arranging impedance within the at least one path comprises arranging impedance within at least one path to have a first impedance followed by a second impedance.

82. The method according to claim 67 wherein the arranging impedance within the at least one path comprises arranging impedance within the at least one path to have a first impedance for a first condition applied to the specific contacts followed by a second impedance for a second condition applied to the specific contacts.

83. The method according to claim 82 wherein the first and second conditions applied to the specific contacts are voltage conditions.

84. The method according to claim 83 wherein the voltage conditions are DC voltage conditions.

85. The method according to claim 82 wherein the first and second conditions applied to the specific contacts are current conditions.

86. The method according to claim 85 wherein the current conditions are DC current conditions.

87. The method according to claim 67 wherein the piece of terminal equipment is powered-on.

88. The method according to claim 67 wherein the coupling at least one path across the specific contacts comprises coupling a controller across the specific contacts.

89. The method according to claim 67 wherein the coupling at least one path across the specific contacts comprises coupling a zener diode across the specific contacts.

90. The method according to claim 67 wherein the coupling at least one path across the specific contacts comprises coupling an energy storage device across the specific contacts.

91. The method according to claim 67 wherein the coupling at least one path comprises coupling the at least one path internal to the piece of terminal equipment.

92. The method according to claim 67 wherein the Ethernet connector is an RJ45 jack comprising the contact 1 through the contact 8.

93. The method according to claim 67 wherein the specific contacts are used for Ethernet communication.

94. The method according to claim 67 wherein the specific contacts are used for Ethernet communication and at least some of the specific contacts are actually carrying Ethernet signals.

95. The method according to claim 67 wherein the specific contacts are used for Ethernet communication and at least some of the specific contacts are actually carrying DC current.

96. The method according to claim 67 wherein the specific contacts are used for Ethernet communication and at least some of the specific contacts are actually carrying Ethernet signals and DC current.

97. The method according to claim 67 wherein the at least one path includes the center tap of at least one isolation transformer.

98. The method according to claim 67 further comprising physically connecting the adapted piece of terminal equipment to a network.

99. The method according to claim 67 further comprising at least one electrical condition applied to the specific contacts.

100. The method according to claim 99 wherein the at least one electrical condition comprises a voltage applied across the specific contacts.

101. The method according to claim 100 wherein the voltage is a DC voltage.

102. The method according to claim 99 wherein the at least one electrical condition comprises a current applied to the specific contacts.

103. The method according to claim 102 wherein the current is a DC current.

104. The method according to claim 67 wherein Ethernet communication is BaseT Ethernet communication.

105. The method according to claim 67 wherein the at least one of the specific contacts comprises the contact 1 and the contact 2 and the at least another one of the specific contacts comprises the contact 3 and the contact 6.

106. The method according to any one of claims 67 through 104 wherein the piece of terminal equipment is a piece of Ethernet data terminal equipment.

107. The method according to claim 106 wherein the at least one of the specific contacts comprises the contact 1 and the contact 2 and the at least another one of the specific contacts comprises the contact 3 and the contact 6.

108. An adapted piece of terminal equipment having an Ethernet connector, the piece of terminal of equipment comprising:
at least one path coupled across specific contacts of the Ethernet connector, the at least one path permits use of the specific contacts for Ethernet communication, the Ethernet connector comprising the contact 1 through the contact 8, the specific contacts comprising at least one of the contacts of the Ethernet connector and at least another one of the contacts of the Ethernet connector, impedance within the at least one path arranged to distinguish the piece of terminal equipment.

109. The piece of terminal equipment according to claim 108 wherein the piece of terminal equipment is a personal computer.

110. The piece of terminal equipment according to claim 108 wherein the impedance within the at least one path is arranged to uniquely distinguish the piece of terminal equipment.

111. The piece of terminal equipment according to claim 108 wherein the impedance within the at least one path is arranged to identify the piece of terminal equipment.

112. The piece of terminal equipment according to claim 108 wherein the impedance within the at least one path is arranged to uniquely identify the piece of terminal equipment.

113. The piece of terminal equipment according to claim 108 wherein the piece of terminal equipment has a particular electrical aspect and the impedance within the at least one path is arranged to distinguish that the piece of terminal equipment has the particular electrical aspect.

114. The piece of terminal equipment according to claim 108 wherein the impedance within the at least one path is arranged to be part of a detection protocol.

115. The piece of terminal equipment according to claim 108 wherein the impedance within the at least one path is arranged to be variable.

116. The piece of terminal equipment according to claim 108 wherein the impedance within the at least one path is arranged to be continuously variable.

117. The piece of terminal equipment according to claim 108 wherein the impedance within the at least one path is arranged to draw DC current.

118. The piece of terminal equipment according to claim 108 wherein the impedance within the at least one path is arranged to have at least one predetermined duration.

119. The piece of terminal equipment according to claim 118 wherein the predetermined duration is between 17 and 833 microseconds.

120. The piece of terminal equipment according to claim 108 wherein the impedance within the at least one path is arranged be between 10 k Ohms and 15 k Ohms.

121. The piece of terminal equipment according to claim 108 wherein the impedance within the at least one path is arranged to be a function of voltage across the specific contacts.

122. The piece of terminal equipment according to claim 108 wherein the impedance within the at least one path is arranged to have a first impedance followed by a second impedance.

123. The piece of terminal equipment according to claim 108 wherein the impedance within the at least one path is arranged to have a first impedance for a first condition applied to the specific contacts followed by a second impedance for second condition applied to the specific contacts.

124. The piece of terminal equipment according to claim 123 wherein the first and second conditions applied to the specific contacts are voltage conditions.

125. The piece of terminal equipment according to claim 124 wherein the voltage conditions are DC voltage conditions.

126. The piece of terminal equipment according to claim 123 wherein the first and second conditions applied to the specific contacts are current conditions.

127. The piece of terminal equipment according to claim 126 wherein the current conditions are DC current conditions.

128. The piece of terminal equipment according to claim 108 wherein the piece of terminal equipment is powered-on.

129. The piece of terminal equipment according to claim 108 wherein a controller is coupled across the specific contacts.

130. The piece of terminal equipment according to claim 108 wherein a zener diode is coupled across the specific contacts.

131. The piece of terminal equipment according to claim 108 wherein an energy storage device is coupled across the specific contacts.

132. The piece of terminal equipment according to claim 108 wherein the at least one path is internal to the piece of terminal equipment.

133. The piece of terminal equipment according to claim 108 wherein the Ethernet connector is an RJ45 jack connector comprising the contact 1 through the contact 8.

134. The piece of terminal equipment according to claim 108 wherein the specific contacts are used for Ethernet communication.

135. The piece of terminal equipment according to claim 108 wherein the specific contacts are used for Ethernet communication and at least some of the specific contacts are actually carrying Ethernet signals.

136. The piece of terminal equipment according to claim 108 wherein the specific contacts are used for Ethernet communication and at least some of the specific contacts are actually carrying DC current.

137. The piece of terminal equipment according to claim 108 wherein the specific contacts are used for Ethernet communication and at least some of the specific contacts are actually carrying Ethernet signals and DC current.

138. The piece of terminal equipment according to claim 108 wherein the at least one path includes the center tap of at least one isolation transformer.

139. The piece of terminal equipment according to claim 108 wherein the adapted piece of terminal equipment is physically connected to a network.

140. The piece of terminal equipment according to claim 108 wherein at least one electrical condition is applied to the specific contacts.

141. The piece of terminal equipment according to claim 140 wherein the at least one electrical condition comprises a voltage applied across the specific contacts.

142. The piece of terminal equipment according to claim 141 wherein the voltage is a DC voltage.

143. The piece of terminal equipment according to claim 140 wherein the at least one electrical condition comprises a current applied to the specific contacts.

144. The piece of terminal equipment according to claim 143 wherein the current is a DC current.

145. The piece of terminal equipment according to claim 108 wherein Ethernet communication is BaseT Ethernet communication.

146. The piece of terminal equipment according to claim 108 wherein the at least one of the specific contacts comprises the contact 1 and the contact 2 and the at least another one of the specific contacts comprises the contact 3 and the contact 6.

147. The piece of terminal equipment according to any one of claims 108 through 145 wherein the piece of terminal equipment is a piece of Ethernet data terminal equipment.

148. The piece of terminal equipment according to claim 147 wherein the at least one of the specific contacts comprises the contact 1 and the contact 2 and the at least another one of the specific contacts comprises the contact 3 and the contact 6.

* * * * *

UNITED STATES PATENT AND TRADEMARK OFFICE
CERTIFICATE OF CORRECTION

PATENT NO. : 8,155,012 B2  
APPLICATION NO. : 12/239001  
DATED : August 21, 2012  
INVENTOR(S) : Austermann, III et al.

Page 1 of 1

It is certified that error appears in the above-identified patent and that said Letters Patent is hereby corrected as shown below:

Title Page, No. (56), Other Publication, Page 7, Column 2, Reference No. 2, "Communicatinos" should be --Communications--.

Title Page, No. (56), Other Publication, Page 7, Column 2, Reference No. 28, "SnyOptics" should be --SynOptics--.

Title Page, No. (56), Other Publication, Page 8, Column 2, Reference No. 12, "SynOptis" should be --SynOptics--.

Title Page, No. (56), Other Publication, Page 8, Column 2, Reference No. 20, After "Connectivity", insert --(January 1992)--.

Column 21, Line 66, Claim 78, "according to 77" should be --according to Claim 77--.

Column 22, Line 3, Claim 79, "at last one" should be --at least one--.

Column 23, Line 29, Claim 108, After "terminal" delete "of".

Column 24, Line 12, Claim 120, After "arranged" insert --to--.

Signed and Sealed this  
Second Day of October, 2012

David J. Kappos  
*Director of the United States Patent and Trademark Office*

UNITED STATES PATENT AND TRADEMARK OFFICE
CERTIFICATE OF CORRECTION

PATENT NO. : 8,155,012 B2  
APPLICATION NO. : 12/239001  
DATED : April 10, 2012  
INVENTOR(S) : Austermann, III et al.

Page 1 of 1

It is certified that error appears in the above-identified patent and that said Letters Patent is hereby corrected as shown below:

In the Claims:

Column 17, Line 65, Claim 14, "terminal data equipment" should be --data terminal equipment--.

Column 18, Line 6, Claim 16, After "wherein" insert --the associating distinguishing information about the piece of Ethernet data terminal equipment to impedance within the at least one path comprises associating identifying information about the piece of Ethernet data terminal equipment to impedance within the at least one path and--.

Column 18, Line 11, Claim 17, After "contact 8" delete "and" insert --,--.

Column 18, Line 12, Claim 17, After "equipment" insert --and the associating distinguishing information about the piece of Ethernet data terminal equipment to impedance within the at least one path comprises associating identifying information about the piece of Ethernet data terminal equipment to impedance within the at least one path--.

Column 20, Line 2, Claim 46, After "wherein" insert --the distinguishing information about the piece of Ethernet data terminal equipment associated to impedance within the at least one path comprises identifying information about the piece of Ethernet data terminal equipment and--.

Column 20, Line 7, Claim 47, After "contact 8" delete "and" insert --,--.

Column 20, Line 9, Claim 47, After "equipment" insert --and the distinguishing information about the piece of Ethernet data terminal equipment associated to impedance within the at least one path comprises identifying information about the piece of Ethernet data terminal equipment--.

Signed and Sealed this  
Twentieth Day of August, 2013

Teresa Stanek Rea  
*Acting Director of the United States Patent and Trademark Office*